(12) United States Patent
Coignet et al.

(10) Patent No.: US 11,717,806 B2
(45) Date of Patent: Aug. 8, 2023

(54) ADSORBER

(71) Applicants: L'Air Liquide, Societe Anonyme pour l'Etude et l'Exploitation des Procedes Georges Claude, Paris (FR); Air Liquide Advanced Technologies U.S. LLC, Houston, TX (US)

(72) Inventors: Philippe A. Coignet, Wilmington, DE (US); Dean W. Kratzer, Warwick, MD (US); Antoine Pruvot, Claymont, DE (US); Matthew Metz, Newport, DE (US)

(73) Assignees: L'Air Liquide, Société Anonyme pour l'Etude et l'Exploitation des Procédés Georges Claude, Paris (FR); Air Liquide Advanced Technologies U.S. LLC, Houston, TX (US)

( * ) Notice: Subject to any disclaimer, the term of this patent is extended or adjusted under 35 U.S.C. 154(b) by 374 days.

(21) Appl. No.: 16/926,692

(22) Filed: Jul. 11, 2020

(65) Prior Publication Data

US 2021/0031168 A1    Feb. 4, 2021

Related U.S. Application Data

(60) Provisional application No. 62/873,280, filed on Jul. 12, 2019, provisional application No. 62/873,284, (Continued)

(51) Int. Cl.
*B01D 53/02* (2006.01)
*B01J 20/30* (2006.01)
(Continued)

(52) U.S. Cl.
CPC .......... *B01J 20/3035* (2013.01); *B01D 53/02* (2013.01); *B01D 53/0431* (2013.01); (Continued)

(58) Field of Classification Search
CPC .......... B01D 2221/10; B01D 2253/102; B01D 2253/104; B01D 2253/106; (Continued)

(56) References Cited

U.S. PATENT DOCUMENTS 4,081,402 A * 3/1978 Levy ............... B01J 20/261 502/7
4,421,531 A * 12/1983 Dalton, Jr. ........... C01B 23/00 95/138

(Continued)

FOREIGN PATENT DOCUMENTS

| EP | 0 159 698 | 10/1985 |
|---|---|---|
| EP | 0 218 348 | 4/1987 |

(Continued)

OTHER PUBLICATIONS

International Search Report and Written Opinion for PCT/2020US/041733, dated Nov. 3, 2020.
(Continued)

*Primary Examiner* — Christopher P Jones
(74) *Attorney, Agent, or Firm* — Christopher J. Cronin; Elwood L. Haynes

(57) ABSTRACT

An adsorbent bed, including at least one elementary composite structure that includes adsorbent particles in a polymer matrix, wherein the adsorbent bed has a bed packing, $\rho_{bed}$, defined as a volume occupied by the at least one elementary composite structure $V_{ecs}$ divided by a volume of the adsorbent bed $V_{bed}$ where $\rho_{bed}$ is greater than 0.60.

5 Claims, 40 Drawing Sheets

Related U.S. Application Data filed on Jul. 12, 2019, provisional application No. 62/873,289, filed on Jul. 12, 2019.

(51) Int. Cl.

| | | |
|---|---|---|
| *B01J 20/18* | (2006.01) | |
| *B01J 20/28* | (2006.01) | |
| *B01D 53/04* | (2006.01) | |
| *B01D 53/047* | (2006.01) | |
| *B01J 20/08* | (2006.01) | |
| *B01J 20/26* | (2006.01) | |

(52) U.S. Cl.
CPC ..... *B01D 53/0462* (2013.01); *B01D 53/0476* (2013.01); *B01J 20/08* (2013.01); *B01J 20/18* (2013.01); *B01J 20/262* (2013.01); *B01J 20/2803* (2013.01); *B01J 20/28023* (2013.01); *B01J 20/28028* (2013.01); *B01J 20/28052* (2013.01); *B01J 20/3042* (2013.01); *B01D 2221/10* (2013.01); *B01D 2253/102* (2013.01); *B01D 2253/104* (2013.01); *B01D 2253/108* (2013.01); *B01D 2253/116* (2013.01); *B01D 2253/202* (2013.01); *B01D 2253/304* (2013.01); *B01D 2257/504* (2013.01); *B01D 2257/708* (2013.01); *B01D 2257/80* (2013.01); *B01D 2258/0283* (2013.01); *B01D 2258/05* (2013.01)

(58) Field of Classification Search
CPC ........ B01D 2253/108; B01D 2253/116; B01D 2253/202; B01D 2253/204; B01D 2253/25; B01D 2253/30; B01D 2253/304; B01D 2253/34; B01D 2256/10; B01D 2256/16; B01D 2256/245; B01D 2257/304; B01D 2257/504; B01D 2257/702; B01D 2257/7025; B01D 2257/708; B01D 2257/80; B01D 2258/018; B01D 2258/0283; B01D 2258/05; B01D 53/02; B01D 53/0423; B01D 53/0431; B01D 53/0462; B01D 53/047; B01D 53/0476; B01D 53/229; B01J 20/08; B01J 20/103; B01J 20/18; B01J 20/20; B01J 20/226; B01J 20/262; B01J 20/28011; B01J 20/28023; B01J 20/28028; B01J 20/2803; B01J 20/28052; B01J 20/3035; B01J 20/3042; B01J 20/3092; Y02C 20/20

See application file for complete search history.

(56) References Cited

U.S. PATENT DOCUMENTS

| | | |
|---|---|---|
| 4,664,683 A | 5/1987 | Degen et al. |
| 5,685,897 A | 11/1997 | Belding et al. |
| 6,284,705 B1 | 9/2001 | Park et al. |
| 6,521,019 B2 | 2/2003 | Jain et al. |
| 8,133,308 B2 | 3/2012 | Lively et al. |
| 8,257,474 B2 | 9/2012 | Lively et al. |
| 9,713,787 B2 | 7/2017 | Owens et al. |
| 2004/0118287 A1* | 6/2004 | Jaffe ................ B01D 53/0423 96/121 |
| 2004/0231666 A1* | 11/2004 | Barker ................ B01D 53/02 128/200.23 |
| 2006/0032816 A1 | 2/2006 | Marcus et al. |
| 2012/0010070 A1* | 1/2012 | Blucher ................ C01B 3/0084 502/402 |
| 2012/0222555 A1 | 9/2012 | Gupta et al. |
| 2012/0247330 A1* | 10/2012 | Chang ................ B01D 53/047 96/144 |
| 2015/0059572 A1* | 3/2015 | Chang ................ B01D 53/02 95/95 |
| 2016/0166972 A1* | 6/2016 | Owens ................ B01D 53/0462 95/137 |
| 2016/0303542 A1 | 10/2016 | Harriott et al. |
| 2018/0296966 A1 | 10/2018 | Coignet et al. |
| 2018/0296967 A1 | 10/2018 | Coignet et al. |
| 2019/0201869 A1 | 7/2019 | Coignet et al. |
| 2019/0203380 A1 | 7/2019 | Coignet et al. |
| 2020/0261887 A1* | 8/2020 | Wirth ................ B01J 20/3236 |

FOREIGN PATENT DOCUMENTS

| | | |
|---|---|---|
| EP | 0 252 596 | 1/1988 |
| WO | WO 2017/031260 | 2/2017 |
| WO | WO 2019/097446 | 5/2019 |

OTHER PUBLICATIONS

Lively, et al., "Hollow fiber adsorbents for CO2 capture: Kinetic sorption performance," Chemical Engineering Journal, vol. 171, No. 3, Jan. 4, 2011, pp. 801-810.

Cann, et al., "Characterization of Fiber Volume Fraction Gradients in Composite Laminates," Journal of Composite Materials, vol. 42, No. 5 (2008), pp. 447-466.

Pietra, et al., "A Review of Models for Effective Thermal Conductivity of Composite Materials," Journal of Power Technologies, 95 (1) (2015), pp. 14-24.

Toll, S. (1998). Packing mechanics of fiber reinforcements. Polymer Engineering & Science(38(8)), 1337-1350.

Rosinski, et al., "Improving Energy Efficiency of Air Separation via Hollow Fiber Sorbents," PRAXAIR, DOE Award No. DE-FE0026163, Mar. 29, 2019, 108 pgs.

Lively, R.P. et al. Hollow fiber adsorbents for $CO_2$ capture: kinetic sorption performance, Chemical Engineering Journal, vol. 171, No. 3, Jan. 4, 2011, 801-810.

* cited by examiner

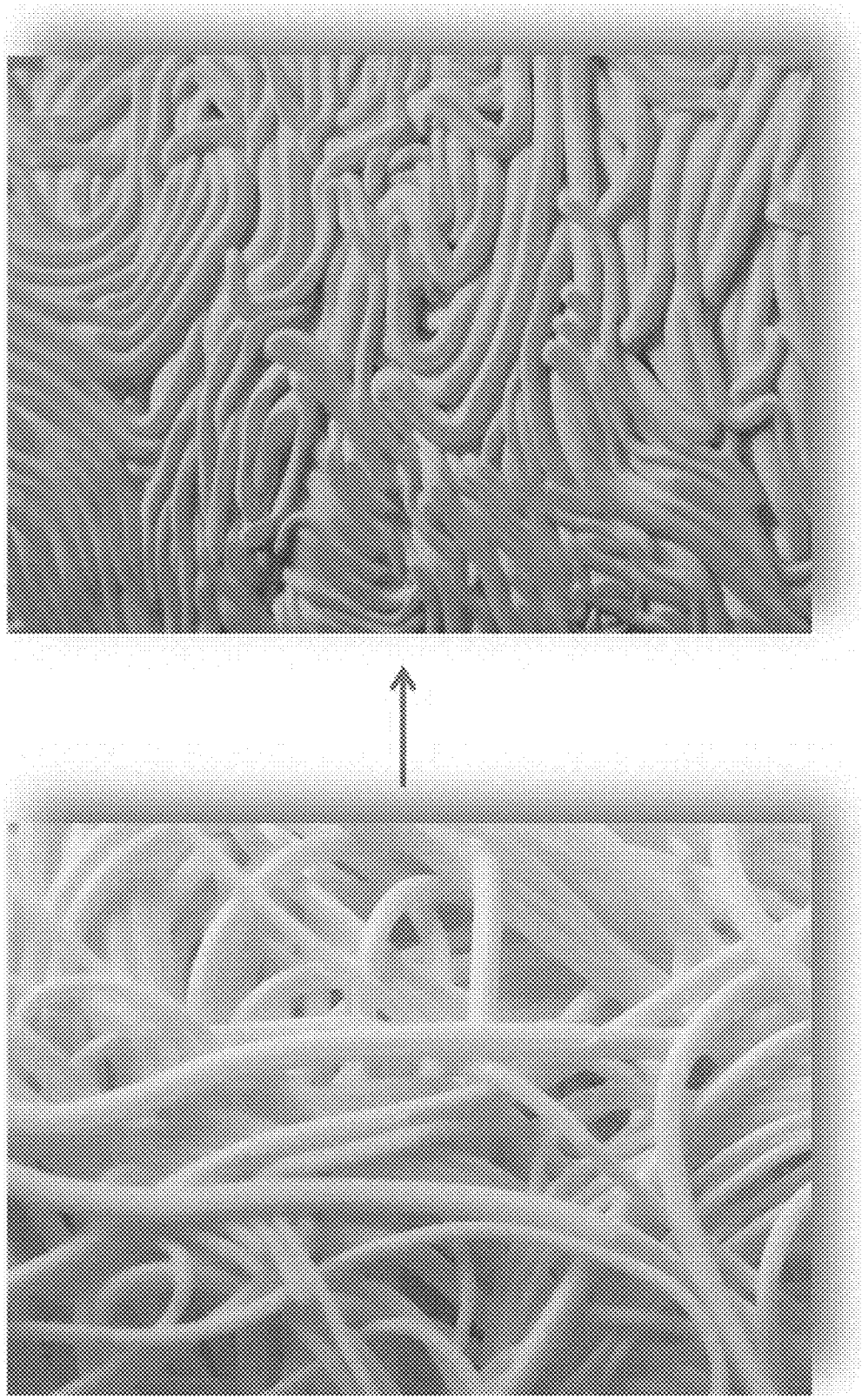

| Axial Adsorber Internal Diameter | |
|---|---:|
| | 5 m |
| Process Conditions | |
| Flow rate | 160,000 Nm3/h |
| Operating pressure | 6 bara |
| Operating temperature | 20 °C |
| Superficial gas velocity | 0.41 m/s |
| Activated Alumina Layer | |
| Fiber outer diameter | 2 mm |
| Layer porosity | 24 % |
| Zeolite Layer | |
| Fiber outer diameter | 0.8 mm |
| Layer porosity | 28 % |
| Pressure drop | |
| Activated Alumina Layer | 12 mbar |
| Zeolite Layer | 33 mbar |
| Total | 45 mbar |

FIG 9

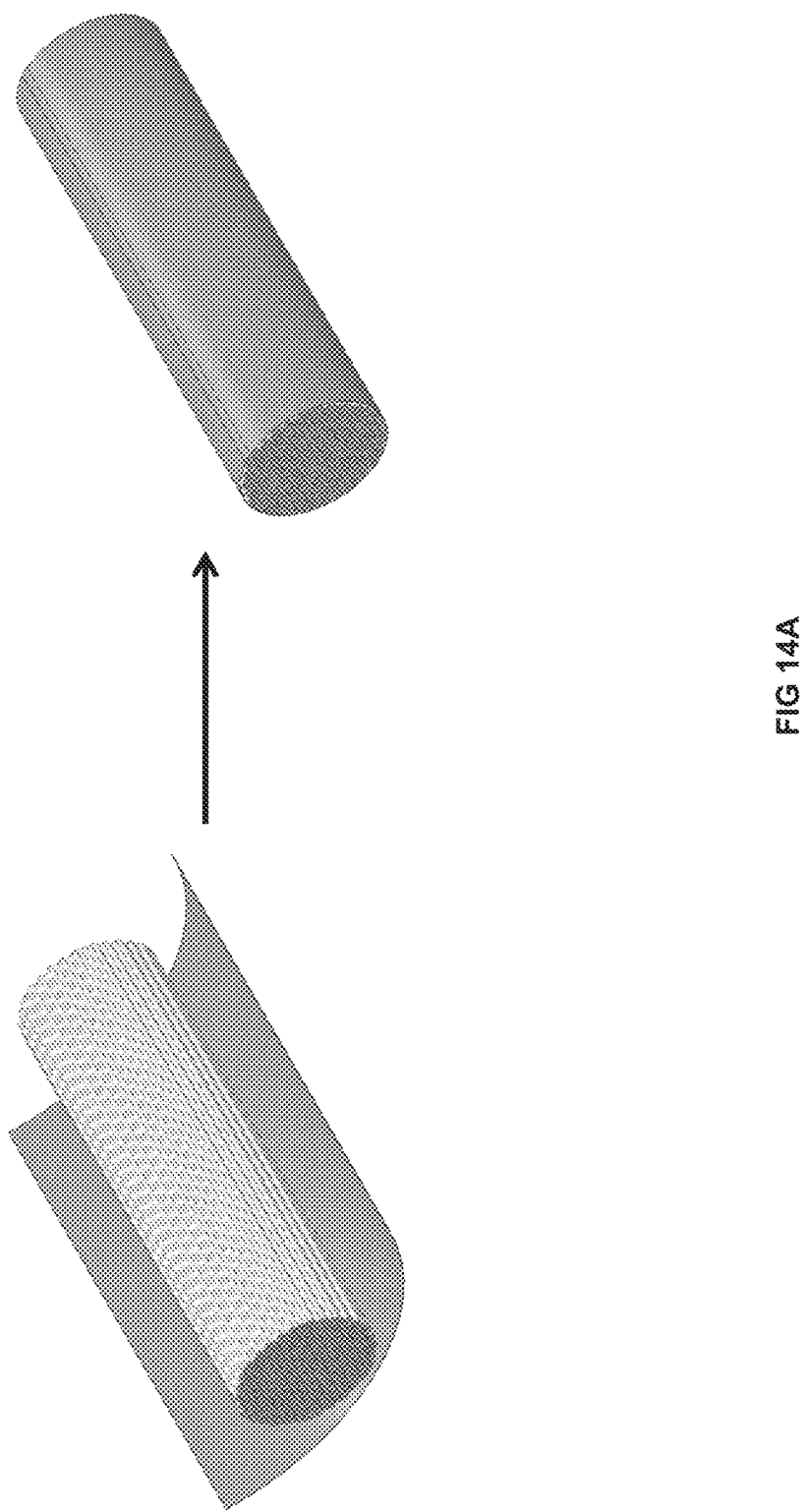

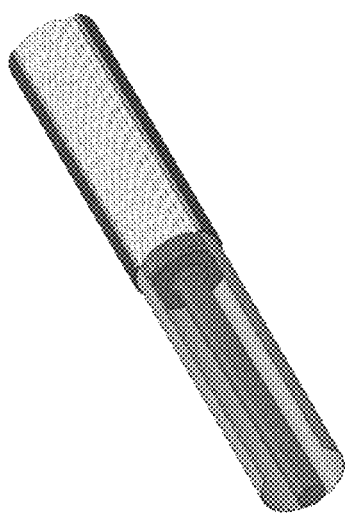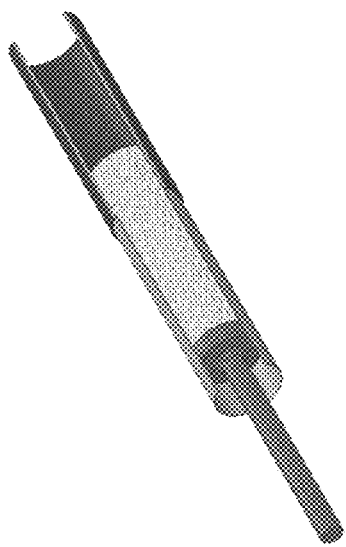
FIG 14B

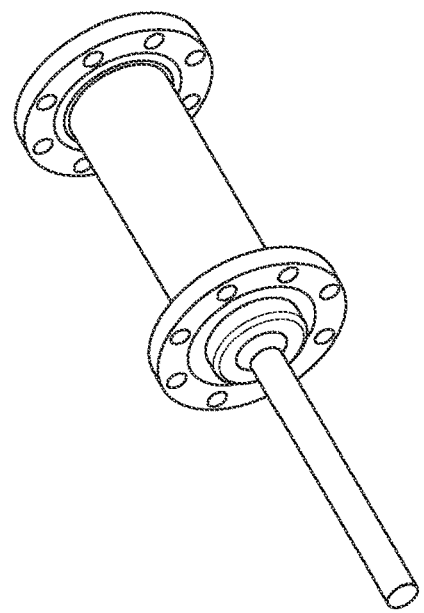
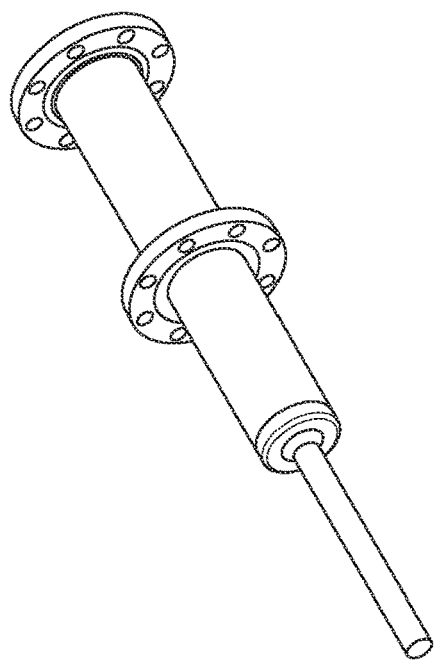
FIG. 15C

ADSORBER

CROSS-REFERENCE TO RELATED APPLICATIONS

This application claims the benefit of priority under 35 U.S.C. § 119 (e) to U.S. Provisional Patent Application No. 62/873,280, filed Jul. 12, 2019, U.S. Provisional Patent Application No. 62/873,284, filed Jul. 12, 2019, and U.S. Provisional Patent Application No. 62/873,289, filed Jul. 12, 2019, the entire contents of which are incorporated herein by reference.

BACKGROUND

Field of the Invention

The present invention relates to adsorbent-based gas separation or purification.

Related Art

Conventional adsorbents usually come in beads or pellets, typically from 1 to 6 mm in diameter. While the bead/pellet shapes have practical advantages (e.g., ease of loading and unloading of adsorber vessels), they also present drawbacks. These include a limited bed packing (e.g., 63%), a relatively high pressure drop, and a low attrition velocity (which limits the flow rate that can be handled by a given adsorbent bed).

Bed packing ($\rho_{bed}$ expressed as a percent) is defined as the volume ($V_{formed\,ads}$) in m³ that is occupied by the formed adsorbent divided by the volume ($V_{bed}$) in m³ of the container containing the formed adsorbent, and expressed in equation form as:

$$\rho_{bed} = \frac{V_{formed\,ads}}{V_{bed}}$$

Following Gauss (1831), the theoretical packing limit of spheres of a same diameter is:

$$\frac{\pi}{3\sqrt{2}} \approx 74\%$$

A packing of approximately 74% yields a void fraction ($\varepsilon$) of approximately 26%. In commercial beaded/pelleted adsorbent systems, due to the narrow particulate size distribution and the imperfections of the packing, the observed packing is significantly lower than the theoretical packing because typically only about 60% can be reached. Because the capacity of the adsorbent bed for adsorbing gases is related to the packing, this maximum packing of 60% typically reached by beaded/pelleted adsorbent beds limits the adsorbent bed capacity.

Therefore, there is a need to increase the capacity of adsorbent beds.

One way of improving the productivity and energy balance of a commercial adsorbent system may be achieved by lowering the pressure drop across the adsorbent bed.

The pressure drop across a packed bed of beads/pellets can be described as the sum of a viscous component and an inertial component according to the Ergun equation:

$$\frac{\Delta P}{L} = 150\,\mu \frac{1}{D_p^2} \frac{(1-\varepsilon)^2}{\varepsilon^3} v_s + 1.75 \rho \frac{1}{D_p} \frac{1-\varepsilon}{\varepsilon^3} v_s^2$$

where:
$\Delta P$ (expressed in Pa) is the pressure drop across the bed
L is the bed length (expressed in m)
$\mu$ is the gas viscosity (Pa·s)
$\rho$ is the gas density (kg/m³)
$D_p$ is the particulate (beads, pellets) diameter (m)
$\varepsilon$ is the bed void fraction
$v_s$ is the gas superficial velocity (m/s)

The first part of the sum is called the viscous component. It accounts for the pressure losses caused by friction of the gas along the surface of the formed adsorbent. The second part of the sum is called the inertial component. It accounts for the loss of kinetic energy along the gas flow path, including tortuosity, compression-expansion, vortices, etc. Pressure drop contributions from the viscous component are strongly dependent upon the gas temperature, while the same for the inertial component are mainly dependent upon the gas pressure. In the case of a beaded system, the second half of this equation is dominant (in comparison to the first half) at most operational velocities due to the high tortuosity of the gas flow lines. Consequently, an increase of the gas velocity would be expected to result in a significant increase in pressure drop across the bed. A significant increase in pressure drop across the bed in turn significantly increases the costs associated with feed gas compression.

Therefore, there is a need for adsorbent beds having a lower pressure drop.

Another way of improving the productivity and energy balance of a commercial adsorbent system may be achieved by increasing the feed flow rate.

Beads/pellets can break apart or generate dust if they are fluidized following quick pressurization or depressurization events, despite the fact that good process designs attempt to prevent such events. Dust may also be generated from: 1) the initial attrition of the beads/pellets that occurs during loading of the adsorbent beads/pellets into the adsorber vessel that contains them, and (2) thermal stress of the adsorbent beads/pellets. The breaking apart or dusting of beads/pellets can have a detrimental impact upon power consumption as the pressure drop increases. The smaller sizes of the dust particles or broken beads/pellets generate a relatively higher pressure drop through bed. This is evident in the Ergun equation because the viscous component is inversely proportional to the square of $(D_p)^2$ and the inertial component is inversely proportional to $D_p$. The presence of dust can also adversely affect equipment downstream of the adsorber, for example, by compromising valve seats or by increasing the heat transfer resistance of heat exchangers. A measure of an adsorbent bed's ability to avoid fluidization is the attrition velocity. Gas superficial velocities above the attrition velocity are understood to generate undesirable attrition and the aforementioned disadvantages while gas superficial velocities below the attrition velocity ae understood to avoid such attrition and attendant disadvantages.

In order to accommodate larger feed gas flow rates, the attrition velocity can be increased by selecting larger, and therefore, heavier beads/pellets. Doing so, however, generally comes at the expense of slower kinetics due to the diffusion limitations present within such larger beads. In other words, in the context of conventional beaded beds, there is a tradeoff between the kinetics and the maximum allowable feed flow rate (or gas velocity). Thus, both fast kinetics and high gas velocities are not achievable with conventional beaded/pelleted beds.

Therefore, there is a need for adsorbent beds with relatively fast kinetics and which may experience relatively high feed flow rates or gas velocities.

For a given bead size, process pressure, and process temperature, the maximum allowable feed flow rate is typically set to a high fraction of the attrition velocity (e.g., 80% of the critical gas velocity) multiplied by the hydraulic section of the adsorber vessel. Therefore, in order to size an axial adsorbent bed for accommodating a specific feed flow rate, the hydraulic section of the adsorber vessel (i.e., the internal diameter) is adjusted. Practically speaking. However, it can be challenging to transport an adsorber vessel having an outer diameter greater than 6 meters on the road, especially in populated areas, due to cargo size restrictions. Beyond this 6 meter limit, the flow configuration is typically changed from axial to radial. The new design variable (of radial beds) for accommodating larger feed flow rates then becomes the height of the radial bed. However, radial beds are more complex and costlier to build and operate than axial beds, thereby increasing by capital and operating expenses. For example, vertical grids with complex configurations have to be position within a radial bed in order to separate the different adsorbent layers from one another. Additionally, radial beds require more steel per unit weight of adsorbent than axial beds do, thus adding to the thermal inertia. Thermal inertia is a critical parameter when considering a Temperature Swing Adsorption (TSA) scheme.

Therefore, there is a need for axial adsorbent beds that may be operated beyond the attrition velocity of conventional beaded beds, while at the same time mitigating any increase in pressure drop and gas compression costs. There is also a need for adsorbent beds that may handle increased feed flow rates without increasing the outer diameter of the adsorber vessel beyond 6 m.

Several alternatives to beaded/pelleted beds have been proposed. For instance, U.S. Pat. No. 6,521,019 proposes a fixed (as opposed to rotary or mobile) monolithic adsorbent wheel having straight flow channels made of a non-adsorbent substrate onto which a thin adsorbent layer (e.g., a 0.5 mm thickness) is deposited. The relatively thin adsorbent layer helps to deliver improved kinetics while the monolithic structure is not subject to fluidization and therefore can handle very large flow rates. Alternatively, U.S. Pat. No. 8,257,474 discloses a sorbent hollow fiber than can be used to create bundles of sorbent fibers. This approach also enhances kinetics.

While the aforementioned alternative solutions generally deliver faster kinetics and decrease fluidization/attrition concerns, they do so at the expense of the adsorbent packing and density. For instance, both U.S. Pat. Nos. 6,521,019 and 8,257,474 exhibit significantly lower adsorbent densities (expressed as kg/m$^3$).

In another example, U.S. Pat. No. 9,713,787 discloses conceptual adsorbent beds made up of filaments that can be randomly packed, spirally wound or woven into a fabric. While the filament shape can help improve the kinetics in comparison to pelleted/beaded beds, it does so at the expense of bed packing and adsorbent density. Specifically, the bed packing given in example 1 of U.S. Pat. No. 9,713,787 for a bed of loose fiber is 22.5%, considering a 300 μm fiber diameter. Because this bed packing will decrease as the fiber aspect ratio (i.e., the ratio of the fiber length to the fiber diameter), one must be mindful of fiber lengths. See Cann, et al., "Characterization of Fiber Volume Fraction Gradients in Composite Laminates", Journal of COMPOSITE MATERIALS, Vol. 42, No. 5 (2008) and Pietrak, et al., "A review of models for effective thermal conductivity of composite materials", Journal of Power Technologies 95 (1) (2015) pp 14-24. In another example, the bed packing achieved in examples 2 and 3 of U.S. Pat. No. 9,713,787 range from 26% to 65% are in association with adsorbent fabrics. Here again, the bed packing is at best comparable to beaded system. In addition, when designing a fiber suitable for a woven process, the adsorbent weight fraction in the fiber has to be properly adjusted in order to yield fibers strong enough for subsequent mechanical handling and formation into fabrics. For practical reasons, this limits the weight fraction of adsorbent in the fiber such that the resulting adsorbent weight fraction is lower than that of commercial beads.

Thus, there is a need for fabric-based adsorbent beds with both high bed packing and satisfactorily high adsorbent weight fraction with the fibers making up the fabric.

In order to mitigate the effects of relatively lower adsorbent densities and take advantage of improved kinetics, the cycle time of the adsorption-based process is typically shortened. Yet, there are practical limitations associated with very short cycle times. For example and considering a pressure swing adsorption (PSA) scheme, it can be challenging to handle very large flow rates with cycle times measured in seconds or sub-seconds. On the other hand, cycle times for temperature swing adsorption (TSA) schemes cannot be shortened enough to overcome relatively lower adsorbent densities because of thermal inertial considerations. While the volume of the adsorber vessel can be increased as a way of ameliorating this problem, increasing the adsorber vessel volume will increase both capital and operating expenses. This defeats the purpose of having a structured adsorbent as a way to lower capital and/or operational costs.

Therefore, there is a need for new structured adsorbents that provide benefits in terms of kinetics without compromising on the adsorbent density.

In equivalent operating conditions, radial beds generate less pressure drop than axial beds as the gas travels through less distance across the radius of a radial bed than along the axis of an axial bed. In addition, on average, the gas flows at slower velocity across a radial bed due to the radial dispersion (i.e. due to the increase in hydraulic section with increasing radius). As seen in the Ergun equation, a decrease in the gas velocity ($v_s$) yields a lower pressure drop. However, radial beds can be complex to operate optimally as the variation of the pressure drop across the radius of the bed favors preferential paths. Such preferential paths are established in such a way that the overall pressure drop is minimum. In other words, the gas flows preferentially through the path of least pressure drop. The complexity of operating a radial beaded bed is well established. In the case of structured adsorbents, the bed packing is known to be lower than that of beaded/pelleted beds. A lower bed packing will result in less of a pressure drop and will therefore favor more preferential paths (i.e., bypasses). A higher pressure drop can be achieved by increasing the outer radius of a radial structured bed. However, an increase in the outer diameter of a radial structured bed would also increase the size and cost of the vessel.

Therefore, for a same outer diameter, there is a need for higher pressure drop radial structured adsorbent beds.

With respect to adsorbent beds made with a mineral binder, these structures are prone to cracking. This can create significantly large bypasses that compromise the intended functionality/operability of such beds. Cracking of monolithic structured bed can result from mechanical constraints or thermal constraints.

Therefore, there is a need for a monolith or monolith-like adsorbent bed that is not as prone to creation of significantly large bypasses due to cracking.

SUMMARY

There is disclosed a method of manufacturing an adsorbent bed that includes the following steps. At least one elementary composite polymer/adsorbent structure is formed through diffusion induced phase inversion of a dope composition that comprises adsorbent particles, a solvent, and a polymeric binder dissolved in the solvent. An intermediate bed of the at least one elementary composite polymer/adsorbent structure is formed. The intermediate bed is compressed so as to immobilize the at least one elementary composite polymer/adsorbent structure against itself or each other and form a product bed.

There is also disclosed an adsorber that includes an adsorbent bed structure containing an adsorbent bed of at least one elementary composite structure that comprises adsorbent particles in a polymer matrix, wherein the adsorber is adapted and configured to separate gas through adsorption and the adsorbent bed has a bed packing, $\rho_{bed}$, defined as a volume occupied by the at least one elementary composite structure, $V_{ecs}$, divided by a volume of the adsorbent bed structure $V_{bed}$, where $\rho_{bed}$ is greater than 0.60.

There is also disclosed another adsorber, comprising an adsorbent bed structure made according to above-disclosed method of manufacturing, wherein the adsorber is adapted and configured to separate gas through adsorption and the adsorbent bed has a bed packing, $\rho_{bed}$, defined as a volume occupied by the at least one elementary composite structure, $V_{ecs}$, divided by a volume of the adsorbent bed structure $V_{bed}$, where $\rho_{bed}$ is greater than 0.60.

There is also disclosed an adsorption-based gas separation method that includes the following steps of feeding a feed gas to an adsorber, withdrawing at least one product gas, and withdrawing at least one waste gas, wherein the adsorbent bed comprises an adsorbent vessel filled with at least one elementary composite structure that comprises adsorbent particles in a polymer matrix, wherein the adsorber comprises an adsorbent bed structure containing an adsorbent bed of at least one elementary composite structure that comprises adsorbent particles in a polymer matrix, wherein the adsorbent bed has a bed packing, $\rho_{bed}$, defined as a volume occupied by the at least one elementary composite structure, $V_{ecs}$, divided by a volume of the adsorbent bed structure $V_{bed}$, where $\rho_{bed}$ is greater than 0.60.

There is also described an adorption-based gas separation method, comprising the steps of feeding a feed gas to the above-disclosed adsorber, withdrawing at least one product gas, and withdrawing at least one waste gas, wherein the adsorbent bed comprises an adsorbent vessel filled with at least one elementary composite structure that comprises adsorbent particles in a polymer matrix.

Any one or more of the method of manufacturing an adsorbent bed, the adsorber, or the adsorption-based gas separation method may include one or more of the following aspects:

the at least one elementary composite polymer/adsorbent structure comprises a plurality of elementary composite polymer/adsorbent beads or extrudates having an average major dimension Dmaj and an average minor dimension Dmin, wherein a ratio of Dmaj:Dmin is in the range of 1:1 to less than 20:1.

the at least one elementary composite polymer/adsorbent structure is wetted with a solvent for the polymeric binder; said step of compressing the intermediate bed comprises the step of forcing a ram onto the intermediate bed during; and said method further comprises the step of allowing the product bed to dry, wherein adjacent ones of the plurality of beads or extrudates are adhered to one another.

said step of compressing the intermediate bed comprises the steps of placing a mechanical restraint on top of the intermediate bed and forcing a ram onto the mechanical restraint and removing the ram from the mechanical restraint while keeping the mechanical restraint in place so as to maintain the beads or extrudates in compressive tension.

each of the at least one elementary composite polymer/adsorbent structure is configured as a fiber having a length L and a diameter D, wherein a ratio of L:D is at least 20:1.

said step of forming the intermediate bed comprises the steps of arranging one or more of the elementary composite polymer/adsorbent fiber around a center tube to thereby provide the intermediate bed; and said step of compressing the intermediate bed comprises the steps of placing a rigid sleeve around the elementary composite polymer/adsorbent fibers and center tube and radially compressing the sleeve so as to compress the intermediate bed and form the product bed; and said method further comprises the step of placing the product bed within a pressure vessel of an adsorber.

the one or more elementary composite polymer/adsorbent fiber is spirally wrapped around the center tube.

said step of forming the intermediate bed comprises the steps of forming one or more skeins of the elementary composite polymer/adsorbent fiber; said step of compressing the intermediate bed comprises the steps of placing a rigid sleeve around the one or more skeins and radially compressing the sleeve so as to compress the intermediate bed and produce the product bed; and said method further comprises the step of placing the product bed within a pressure vessel of an adsorber.

the one or more skeins of the elementary composite polymer/adsorbent fiber comprises a plurality of skeins arranged in parallel to one another.

said step of forming the intermediate bed comprises the steps of forming a plurality of skeins of the elementary composite polymer/adsorbent fiber and distributing the skeins around a center tube in parallel; said step of compressing the intermediate bed comprises the steps of placing a rigid sleeve around the elementary composite polymer/adsorbent fibers and center tube and radially compressing the sleeve so as to compress the intermediate bed to produce the product bed; and said method further comprises the step of placing the product bed within a pressure vessel of an adsorber.

the at least one elementary composite polymer/adsorbent structure is wetted with a solvent for the polymeric binder prior to, during, and/or after said step of forming the intermediate bed but prior to completing said step of compressing the intermediate bed so that the polymeric binder of at least one elementary composite polymer/adsorbent structure is caused to swell or soften with the solvent and become adhered to itself; said step of compressing the intermediate bed comprises the step of applying a compressive force to the intermediate bed to produce the product bed; and said method further comprises the step of allowing the product bed to at least partially dry while the at least one elementary composite polymer/adsorbent structure is in an adhered state before removal of the compressive force so as to achieve immobilization of the at least one elementary composite polymer/adsorbent structure even when the compressive force is removed.

the intermediate bed is compressed until a bed packing, $\rho_{bed}$, defined as a volume occupied by the at least one elementary composite structure, $V_{ecs}$, divided by a volume of the adsorbent bed structure $V_{bed}$, of the product bed is greater than 0.60.

the at least one elementary composite polymer/adsorbent structure comprises a plurality of elementary composite polymer/adsorbent structures configured as beads or extrudates having an average major dimension $D_{maj}$ and an average minor dimension $D_{min}$, wherein a ratio of $D_{maj}$:$D_{min}$ is in the range of 1:1 to less than 20:1.

the adsorbent bed is configured as a radial adsorbent bed, the adsorber further comprising a cylindrical pressure vessel having an inlet and an outlet, a first annular porous grid concentrically disposed within the cylindrical pressure vessel, a second annular porous grid concentrically disposed within the first annular porous grid wherein a first annulus is formed between an inner surface of the cylindrical pressure vessel and an outer surface of the annular porous grid and a second annulus is formed between an inner surface of the first annular porous grid and an outer surface of the second annular porous grid, a gas-tight annular floor sealing a bottom of the second annulus in gas-tight fashion, and a gas-tight annular ceiling sealing a top of the second annulus in gas-tight fashion, wherein the adsorbent bed structure is comprised of the first and second porous annular grids, the gas-tight annular floor, and the gas-tight annular ceiling, and wherein the adsorber is adapted and configured such that: feed gas comprising a first component and a second component that is fed to the inlet of the cylindrical pressure vessel flows into the first annulus, through the first annular porous grid, and into the plurality of elementary composite polymer/adsorbent structures configured as beads or extrudates where a first component of the feed gas is preferentially adsorbed by the at least one elementary composite structure compared to a second component of the feed gas; and a gas enriched in the second component and deficient in the first component compared to the feed gas flows through the second annular porous grid and out of the outlet of the cylindrical pressure vessel.

the adsorbent bed is configured as an axial bed, the adsorber further comprising a pressure vessel having an inlet and an outlet, a first porous grid extending across a cross-section of the pressure vessel, and a second porous grid extending across a cross-section of the pressure vessel parallel to the first porous grid, wherein: the plurality of elementary composite polymer/adsorbent structures configured as beads or extrudates fill a space between the first and second porous grids such that the adsorbent bed structure is comprised of an upper surface of the first porous grid, a lower surface of the second porous grid, and an inner surface of the pressure vessel extending between the first and second porous grids.

each of the at least one elementary composite polymer/adsorbent structure is configured as a fiber having a length L and a diameter D, wherein a ratio of L:D is at least 20:1.

the adsorbent bed is configured as a radial bed, the adsorber further comprising a cylindrical pressure vessel having an inlet and an outlet, a first annular porous grid concentrically disposed within the cylindrical pressure vessel, a second annular porous grid concentrically disposed within the first annular porous grid wherein a first annulus is formed between an inner surface of the cylindrical pressure vessel and an outer surface of the annular porous grid and a second annulus is formed between an inner surface of the first annular porous grid and an outer surface of the second annular porous grid, a gas-tight annular floor sealing a bottom of the second annulus in gas-tight fashion, and a gas-tight annular ceiling sealing a top of the second annulus in gas-tight fashion, wherein the adsorbent bed structure is comprised of the first and second porous annular grids, the gas-tight annular floor, and the gas-tight annular ceiling, and wherein the adsorber is adapted and configured such that: feed gas comprising a first component and a second component that is fed to the inlet of the cylindrical pressure vessel flows into the first annulus, through the first annular porous grid, and into the plurality of elementary composite polymer/adsorbent structures configured as a fiber where a first component of the feed gas is preferentially adsorbed by the at least one elementary composite structure compared to a second component of the feed gas; and a gas enriched in the second component and deficient in the first component compared to the feed gas flows through the second annular porous grid and out of the outlet of the cylindrical pressure vessel.

said fiber comprises a plurality of fibers arranged in parallel to an axis of the adsorber.

said fiber comprises a length of fiber spirally wrapped around the second annular porous grid.

the adsorbent bed is configured as an axial bed, the adsorber further comprising a pressure vessel having an inlet and an outlet, a first porous grid extending across a cross-section of the pressure vessel, and a second porous grid extending across a cross-section of the pressure vessel parallel to the first porous grid, wherein: the at least one elementary composite polymer/adsorbent structure is configured as a plurality of fibers each of which extends in perpendicular to the first and second porous grids; and the plurality fibers fill a space between the first and second porous grids such that the adsorbent bed structure is comprised of an upper surface of the first porous grid, a lower surface of the second porous grid, and an inner surface of the pressure vessel extending between the first and second porous grids.

the at least one elementary composite polymer/adsorbent structure is configured as a fabric woven from warp and weft fibers each one of which has a length L and a diameter D, wherein a ratio of L:D is at least 20:1.

the adsorbent bed is configured as a radial bed, the adsorber further comprising a cylindrical pressure vessel having an inlet and an outlet, a first annular porous grid concentrically disposed within the cylindrical pressure vessel, a second annular porous grid concentrically disposed within the first annular porous grid wherein a first annulus is formed between an inner surface of the cylindrical pressure vessel and an outer surface of the annular porous grid and a second annulus is formed between an inner surface of the first annular porous grid and an outer surface of the second annular porous grid, a gas-tight annular floor sealing a bottom of the second annulus in gas-tight fashion, and a gas-tight annular ceiling sealing a top of the second annulus in gas-tight fashion, wherein the adsorbent bed structure is comprised of the first and second porous annular grids, the gas-tight annular floor, and the gas-tight annular ceiling, and wherein the adsorber is adapted and configured such that: feed gas comprising a first component and a second component that is fed to the inlet of the cylindrical pressure vessel flows into the first annulus, through the first annular porous grid, and into the plurality of elementary composite polymer/adsorbent structures configured as a fiber where a first component of the feed gas is preferentially adsorbed by the at least one elementary composite structure compared to a second component of the feed gas; and a gas enriched in the second component and deficient in the first component compared to the feed gas flows through the second annular porous grid and out of the outlet of the cylindrical pressure vessel.

the adsorbent bed is configured as an axial bed, the adsorber further comprising a pressure vessel having an inlet and an outlet, a first porous grid extending across a cross-section of the pressure vessel, and a second porous grid extending across a cross-section of the pressure vessel parallel to the first porous grid, wherein: the fabric is rolled up in spiral fashion with an axis that extends in perpendicular to the first and second porous grids; and the plurality of fibers fill a space between the first and second porous grids such that the adsorbent bed structure is comprised of an upper surface of the first porous grid, a lower surface of the second porous grid, and an inner surface of the pressure vessel extending between the first and second porous grids.

the at least one elementary composite polymer/adsorbent structure comprises a plurality of the elementary composite polymer/adsorbent structures and at least some the plurality of the elementary composite polymer/adsorbent structures adjacent to one another are adhered to one another.

the binder polymer is a thermoplastic polymer, or blend of thermoplastic polymers, selected from the group consisting of polyetherimides, polyimides, polyamides, polyamide-imides, polyaramids, ladder-type polymers, polybenzimidazole (PBI), polybenzoxazole (PBO), and polybenzothiazole (PBT).

the at least one elementary composite polymer/adsorbent structure is configured as one or more fibers that exhibit an elongation at break of at least 5%, preferably of at least 7%, more preferably of at least 10%, and even more preferably of at least 15%.

the polymeric binder has a glass transition temperature of at least 220° C.

the adsorbent particles are comprised of one or more materials selected from the group consisting of zeolite, activated carbon, carbon molecular sieve, activated alumina, silica gel, metalorganic frameworks, amines in solid form, and mixtures of two or more thereof.

the adsorbent particles are comprised of one or more zeolites selected from the group consisting of zeolite A, Ca-exchanged zeolite A, zeolite X, Ca-exchanged zeolite X, and Ca-exchanged zeolite LSX.

$\rho_{bed}$ is greater than 0.65, preferably greater than 0.70, and more preferably greater than 0.80.

$\rho_{bed}$ is greater than 0.65 up to 0.90, preferably greater than 0.70 up to 0.90, and more preferably greater than 0.80 up to 0.90.

a weight percent content of the adsorbent particles in the at least one elementary composite polymer/adsorbent structure is greater than 80%.

the adsorbent bed is configured as an axial adsorbent bed.

the adsorbent bed is configured as a radial adsorbent bed.

said method is carried out as a pressure swing adsorption method.

said method is carried out as a temperature swing adsorption method.

said method is carried out as a pressure temperature swing adsorption method.

said method is a kinetic-based gas separation.

the feed gas is air, the product gas is nitrogen, the at least one waste gas is nitrogen-depleted air, and the adsorbent is carbon molecular sieve.

said method is an equilibrium-based gas separation.

the at least one elementary composite structure comprises a plurality of parallel fibers.

the adsorbent bed is configured as an axial adsorbent bed, said method is carried out as a temperature swing adsorption method, the feed gas is air, and the product gas is sent to an air separation unit.

the at least one elementary composite structure comprises a plurality of parallel fibers, the adsorbent bed is configured as an axial adsorbent bed, said method is carried out as a temperature swing adsorption method, the feed gas is air, and the product gas is sent to an air separation unit.

the at least one elementary composite structure comprises a plurality of parallel fibers, the adsorbent bed is configured as an axial adsorbent bed, the feed gas is air, the at least one waste gas is enriched in moisture, $CO_2$, and hydrocarbons compared to the feed gas, and the product gas is air depleted in moisture, $CO_2$, and hydrocarbons compared to the feed gas.

the feed gas is air, the at least one waste gas is enriched in VOCs compared to the feed gas, and the product gas is air depleted in VOCs.

the feed gas is a mixture of argon and oxygen derived from a distillation column, the product gas is enriched argon compared to the feed gas, and the at least one waste gas is depleted in argon compared to the feed gas.

the feed gas is natural gas, the product gas is enriched in methane compared to the feed gas, and the at least one waste gas is enriched in $C_{3+}$ hydrocarbons, and $H_2S$ compared to the feed gas.

the feed gas is natural gas, optionally pre-treated to remove amounts of $C_{3+}$ hydrocarbons, and $H_2S$, the product gas is enriched in methane compared to the feed gas, and the at least one waste gas is enriched in $CO_2$ compared to the feed gas.

the feed gas is biogas, the product gas is enriched in methane compared to the feed gas, and the at least one waste gas is enriched in $C_{3+}$ hydrocarbons, siloxanes, and $H_2S$ compared to the feed gas.

$CO_2$ is removed from the product gas using one or more gas separation membranes.

the feed gas is biogas from which amounts of $CO_2$ have been removed the feed gas with one or more gas separations producing a and which has a nitrogen concentration of at least 3%, the product gas is enriched in methane compared to the feed gas, the at least one waste gas is enriched in nitrogen compared to the feed gas, and said method is a pressure swing adsorption based method.

the feed gas is biogas from which amounts of $CO_2$ have been removed the feed gas with one or more gas separations producing a and which has a nitrogen concentration of at least 3%, the product gas is enriched in methane compared to the feed gas, the at least one waste gas is enriched in $CO_2$ compared to the feed gas, and said method is a pressure temperature swing adsorption based method.

the feed gas is flue gas, the product gas is enriched in $CO_2$ compared to the feed gas, and the at least one waste gas is enriched in $N_2$ compared to the feed gas.

the feed gas is flue gas, the product gas is water-depleted flue gas, the at least one waste gas is enriched in water compared to the feed gas, said method is a temperature swing adsorption based method, and the adsorbent is silica gel.

the feed gas is VOC-containing air, the product gas is VOC-depleted air, and the at least one waste gas is enriched in VOCs compared to the feed gas.

the feed gas comprises $CO_2$ and $CH_4$, the product gas is enriched in $CH_4$ compared to the feed gas, and the at least one waste gas is enriched in $CO_2$ compared to the feed gas.

the feed gas comprises $N_2$ and $CH_4$, the product gas is enriched in $CH_4$ compared to the feed gas, and the at least one waste gas is enriched in $N_2$ compared to the feed gas.

the product gas is depleted in water compared to the feed gas, and the at least one waste gas is enriched in water compared to the feed gas.

the feed gas comprises helium, the product gas is enriched in helium compared to the feed gas, and the at least one waste gas is depleted in helium compared to the feed gas.

the feed gas is syngas comprising $H_2$ and $CO_2$, the product gas is enriched in $H_2$ compared to the feed gas, and the at least one waste gas is depleted in $H_2$ compared to the feed gas.

said method is a pressure swing adsorption based method.

the adsorbent is one or more selected from the group consisting of activated alumina, silica gel, activated carbon, zeolite A, Ca-exchanged zeolite A, zeolite X, Ca-exchanged zeolite X, and Ca-exchanged zeolite LSX.

said method is operated according to a cycle that includes at least 3 complete pressure equalization steps lasting 18 seconds or less.

an adsorption pressure of said method is between 15 and 55 bara.

the feed gas is air, the product gas is enriched in $O_2$ compared to the feed gas, the at least one waste gas is depleted in $O_2$ compared to the feed gas, and said method is a vacuum swing adsorption based method.

the method is a vacuum swing adsorption based method.

the method is a vacuum pressure swing adsorption based method.

the adsorbent particles are comprised of one or more materials selected from the group consisting of zeolite, activated carbon, carbon molecular sieve, activated alumina, silica gel, carbon molecular sieve, metalorganic frameworks, amines in solid form, and mixtures of two or more thereof.

the adsorbent particles are comprised of one or more zeolites selected from the group consisting of zeolite A, Ca-exchanged zeolite A, zeolite X, Ca-exchanged zeolite X, and Ca-exchanged zeolite LSX.

the adsorber is portable.

the adsorber is a mobile $O_2$ concentrator adapted and configured for oxygen therapy for a patient.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 3A is a photograph of an uncompressed bed of unorganized fiber.

FIG. 3B is a photograph of a packed bed of unorganized fiber.

FIG. 9 is a table of characteristics of a prophetic example of an axial bed made of high-packing parallel adsorbent fibers.

FIG. 14A is a schematic of a first step of a process for forming a small size packed-bed of parallel adsorbent fibers.

FIG. 14B is a schematic of a second step of the process of FIG. 14A.

FIG. 15C is a schematic of a third step of the process of FIG. 15A.

DESCRIPTION OF PREFERRED EMBODIMENTS

Figure 1:
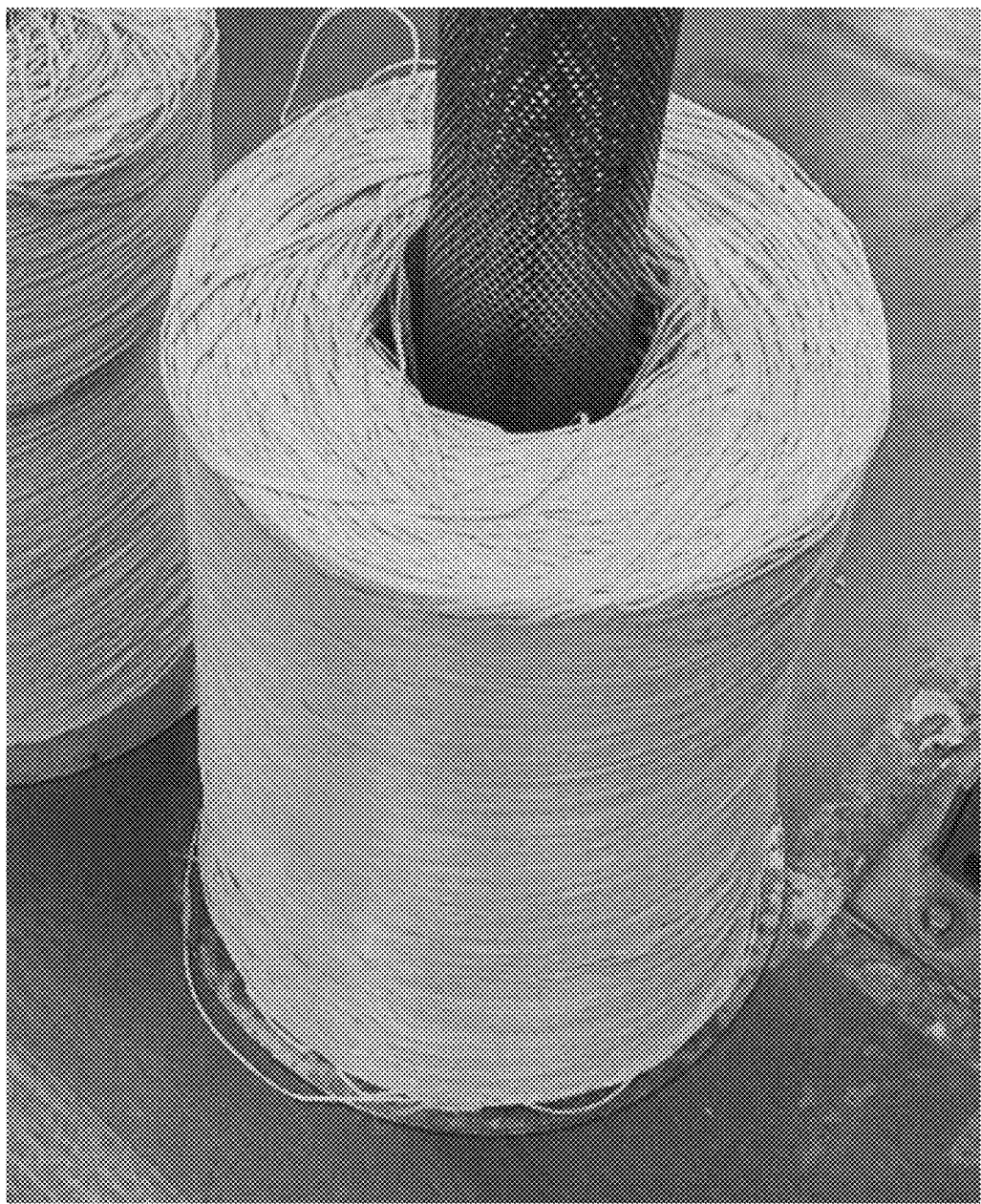
FIG. 1 is a photograph of a radial intermediate bed of piddled fiber.

Before delving into an in-depth description of the invention, we will first provide some background material on adsorbent beds.

The term formed adsorbent refers to the composite material of adsorbent particles and matrix shaped in its final form. It is a composite because the adsorbent particles are more or less uniformly dispersed within and bound by the matrix. While conventional binders are inorganic, the binder of the formed adsorbent of the invention is polymeric.

The term intermediate bed refers to the adsorbent bed obtained through collecting a plurality of the formed adsorbent structures in a container prior to compression of the intermediate bed to produce the product bed.

The term product adsorbent bed refers to the adsorbent bed obtained after compressing the intermediate bed.

The term adsorber refers to the combination of one or more product beds disposed within a pressure vessel that is adapted and configured to separate fluids (such as liquid or especially gas) based upon selective adsorption of one or more components of the fluid upon the adsorbent particles within the formed adsorbent of the product bed.

The adsorbent weight fraction (wt $\%_{ads}$) is defined as the mass of adsorbent particles $m_{ads}$ (kg) divided by the mass of the formed adsorbent $m_{formed\ ads}$ (kg), which of course is the sum of the mass of the adsorbent ($m_{ads}$) and the mass of the binder $m_{binder}$). It is expressed in equation form as:

$$wt\ \%_{ads} = \frac{m_{ads}}{m_{ads} + m_{binder}} = \frac{m_{ads}}{m_{formed\ ads}}$$

The wt $\%_{ads}$ may be easily calculated from the masses of the adsorbent and binder used to form the formed adsorbent.

The bed density $d_{bed}$ (kg/m$^3$) is defined as the mass of the formed adsorbent $m_{formed\ ads}$ (kg) divided by the volume $V_{bed}$ (m$^3$) of the bed of formed adsorbent:

$$d_{bed} = \frac{m_{formed\ ads}}{V_{bed}}$$

$V_{bed}$ (m$^3$) may be calculated from the interior dimensions of the container that contains the bed of formed adsorbent. In the case of a bed of formed adsorbent that is self-contained, $V_{bed}$ may be calculated from the dimensions of the shape formed by the bed. For example, if a self-contained bed of formed adsorbent is shaped as a disc, $V_{bed} = \pi \cdot r^2 \cdot h$, where r is the radius of the bed and h is the height of the bed. Non-limiting examples of a self-contained bed of formed adsorbent includes a mass of randomly organized beads, pellets, extrudates or fibers, a fabric woven from fibers, a mass of parallel fibers, and a fiber wrapped around a mandrel or tube. Notably, a self-contained bed of formed adsorbent excludes a single beads, pellet, or extrudate and also excludes a single, straight fiber that is not randomly organized.

The adsorbent density $d_{ads}$ (kg/m$^3$) is defined as the mass of adsorbent $m_{ads}$ (kg) (and which does not include the mass of the binder) divided by the bed volume $V_{bed}$ (m$^3$):

$$d_{ads} = \frac{m_{ads}}{V_{bed}} = \frac{wt\ \%_{ads} \times m_{formed\ ads}}{V_{bed}}$$

The interstitial volume $V_i$ (m$^3$) refers to the volume that is available for the flow of gas that is located with the adsorbent bed but outside of the formed adsorbent, and is defined as the difference between the bed volume $V_{bed}$ (m$^3$) and the volume of the formed adsorbent $V_{formed\ ads}$ (m$^3$):

$$V_i = V_{bed} - V_{formed\ ads}$$

The volume of formed adsorbent can typically be measured in a number of different ways.

In the volumetric displacement method, the bed is formed in a container with a predetermined volume. The container of predetermined volume containing the formed adsorbent is then filled with a specific fluid that does not penetrate the pores of the formed adsorbent. In this way, the void (the portion of the bed not taken up by formed adsorbent) is filled with a specific fluid. The fluid is then poured off and its volume measured. The volume of formed adsorbent is then obtained by subtracting the volume of the fluid from the volume of the container.

The volume of formed adsorbent can also be obtained by dividing the mass of the formed adsorbent in the bed by the density of the formed adsorbent. It is possible to estimate the density of fiber by cutting a specific length of fiber, measure its radius, and weighing it:

$$\text{structured adsorbent density} = \frac{\text{mass fiber sample}}{\text{volume fiber sample}}$$

$$\text{structured adsorbent density} = \frac{\text{mass fiber sample}}{\text{length fiber sample} \times (\pi \times r^2_{fiber\ sample})}$$

It is also possible to estimate the density of beads, extrudates, or fiber by placing a known mass of the formed adsorbent in a reference cell of known volume, placing it under vacuum, and filling it with helium while measuring the volume of helium entering the cell. By subtracting the volume of helium from the volume of the cell, the volume of the formed adsorbent in the cell can be calculated. The density, therefore, can be calculated by dividing the known mass of the formed adsorbent in the cell by the calculated volume of the formed adsorbent in the cell.

In the case of a bed of parallel fibers, the cross-sectional void fraction remains constant over the length of the bed. Thus, well-known imaging techniques can be used to pixelate a cross-section of the parallel fiber bed into white pixels corresponding to the portion of the cross-sectional surface area taken up by the voids and black pixels corresponding to the cross-sectional surface area taken up by the fibers. The areas of the black pixels are then summed up. Finally, the surface area corresponding to the summed black pixels is multiplied by the length of the parallel fibers, thereby yielding the volume of the formed adsorbent.

In the case of formed adsorbent in bead form, the volume of the formed adsorbent may also be estimated by multiplying the average radius of the formed adsorbent by $4/3 \cdot \pi \cdot r^3$.

The bed packing $\rho_{bed}$ (%) is defined as the volume occupied by the formed adsorbent $V_{formed\ ads}$ (m³) divided by the bed volume $V_{bed}$ (m³):

$$\rho_{bed} = \frac{V_{formed\ ads}}{V_{bed}}$$

The calculation of $V_{bed}$ is described above.

The bed porosity $\varepsilon$ (or void fraction) is defined as the interstitial volume $V_i$ (m³) divided by the bed volume $V_{bed}$ (m³):

$$\varepsilon_i = \frac{V_i}{V_{bed}} = \frac{V_i}{V_i + V_{formed\ ads}} = 1 - \rho_{bed}$$

The superficial gas velocity refers to the average velocity of the gas across the hydraulic section of an empty adsorber vessel.

In the context of conventional beaded/pelleted beds, the attrition velocity is the gas velocity at which attrition starts (i.e., during the initial bed swelling before established fluidization) and corresponds to the minimum gas velocity necessary for suspension, in the gas associated with the attrition velocity (i.e., the attrition velocity is specific to the operating gas, operating pressure and operating temperature), of the smallest, and thus lightest, beads/pellets. The attrition velocity may be calculated from the beads' or pellets' size and density. In order to avoid attrition of the beads/pellets, conventional adsorbent beds are typically sized for a maximum operational gas velocity of about 80% of the attrition velocity.

The term structured adsorbent bed often refers to an adsorbent bed that is not subject to fluidization phenomena. Such beds have, generally speaking, a minimum degree of organization (as opposed to the random packing of beads/pellets) and often comes in one piece. Examples of conventional structured adsorbent beds include adsorbent wheels and honeycomb structures.

A supported structured bed often refers to an adsorbent bed that includes a thin adsorbent layer deposited onto a supporting substrate. The substrate is non-adsorptive and can be selected for properties such as its mechanical strength or thermal properties. Adsorbent wheels are typically supported adsorbent beds.

A monolithic structured bed often refers to an adsorbent bed that consists of one continuous phase. For instance, some honeycomb monoliths are made by extruding a single slurry of a mineral binder mixed with an adsorbent powder.

The term air separation unit (ASU) refers to a relatively large plant where the main components of air ($N_2$, $O_2$, and Ar) are separated by cryogenic distillation.

Front end purification (FEP) refers to a unit operation needed to remove impurities from a feed stream before it is fed to the main separation unit (e.g., the gas separation membranes, an absorption unit, and/or distillation column). Condensable components (e.g., $H_2O$, $CO_2$, NOx) of the gas sought to be separated by cryogenic distillation are removed in order to avoid their solidification in the distillation column. In the case of a gas separation unit, the impurities removed typically include moisture, $H_2S$, $C_{3+}$ hydrocarbons, siloxanes, and volatile organic compounds (VOCs) in order to avoid condensation on the surface of the membrane or degradation of membrane performance.

A temperature swing adsorption (TSA) process scheme utilizes two adsorbers that are alternatively operated, so that while one adsorber is used in production mode in order to remove condensable species, the other adsorber is regenerated under heat. The FEP for an ASU typically involved two-layers adsorbers: a first bottom layer of activated alumina mainly removes water whereas a second top layer of zeolite mainly removes $CO_2$.

An axial flow adsorbent bed refers to an adsorbent bed in which the gas flows along the axis of the vessel.

A radial flow adsorbent bed refers to an adsorbent bed in which the gas flows along the radius of the vessel, typically inwardly from a circumferential surface of the annular adsorbent bed.

Figure 20:
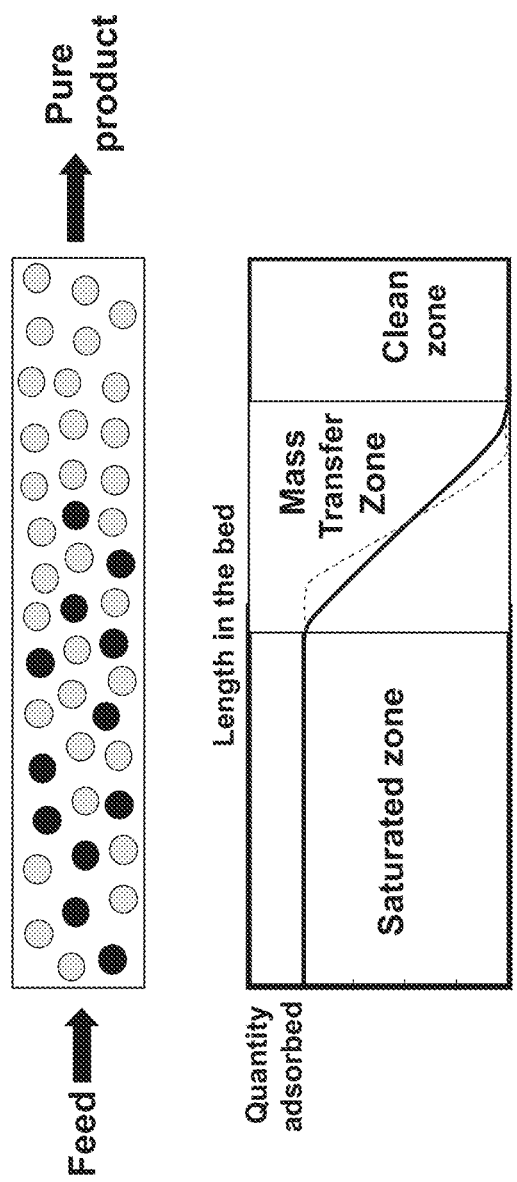
FIG. 20 is an illustration of a mass transport zone of an adsorbent bed.

In a fixed bed process, as the fluid is passed through the adsorbent bed, the transfer of adsorbate molecules from the fluid phase to the solid phase of the adsorbent bed initially occurs at a region called the bed entrance. Once the adsorbent in this region becomes saturated, the zone in which the active adsorption occurs (called the mass transfer zone or MTZ) moves progressively through the bed towards the exit. As seen in FIG. 20, at a given time t, the adsorbent bed can be divided into three zones: a saturated zone, a mass transfer zone, and a clean zone. The MTZ can be indicative of how well the adsorbent bed is used. The wider the MTZ, the less efficiently the bed is used.

Kinetic separation refers to separation of two gaseous species that is based upon the difference of kinetics of adsorption between the two gaseous species, even though their isotherms might be the same. In such a case, the separation is not based upon the difference of adsorbent capacity for the two species but upon the difference in rates at which each species adsorbs (i.e. kinetics). For instance, a $N_2$ PSA uses a specific carbon molecular sieve (CMS) material to kinetically separate $N_2$ from air. Specifically, the $O_2$ that enters the PSA adsorbs faster than $N_2$ onto the CMS so that $N_2$ only first comes out of the CMS bed. In contrast to kinetic separations, other separations typically rely upon a difference of adsorbent capacity between two species. For instance, $O_2$ from air can be concentrated using a PSA made of 13X zeolite. In this case, 13X zeolite has a higher capacity for $N_2$ than it does for $O_2$. These separations occur at equilibrium.

With the foregoing in mind, we will now describe methods of manufacturing an adsorbent bed with high bed packing and the adsorbent beds produced by such methods.

The method of manufacture includes three steps. First, one or more elementary composite polymer/adsorbent structures (hereinafter "elementary structures") are formed. Second, an intermediate bed of the elementary composite polymer/adsorbent structure(s) is formed. Third, the intermediate bed is compressed so as to immobilize the at least one elementary composite polymer/adsorbent structure against itself or each other and form a product bed.

The elementary structures are formed by diffusion induced phase separation of an extruded composition of adsorbent particles and a polymeric binder dissolved in a solvent.

The polymeric binder (or blend of polymeric binders) is not especially limited. Each may be a thermoplastic binder. Typically, each is a thermoplastic polymer. More typically and as described in US 2018/0296966 and US 2018/0296967, each is a soluble thermoplastic polymer that can withstand exposure to activation or regeneration temperatures at or above 220° C. without significant detrimental effects upon the sorbent (such as adsorbent) capacity of the sorbent particles (hereinafter "heat exposure property"). The "heat exposure property" of the polymeric binder or blend of polymeric binders is defined as having a Vicat softening temperature (Ts), a heat deflection temperature (HDT), and/or a glass transition temperature (Tg) of at least 220° C. The description of such polymer binders or blends of polymeric binders in US2018296966 and US2018296967 is incorporated herein in their entireties.

Suitable solvents include those in which at least 98 wt % of the polymeric binder(s) dissolve. Depending on the polymeric binder(s) chosen and without limiting the scope of the invention, particular solvents include non-polar solvents, polar protic solvents as well as polar aprotic solvents. The latter include N-methyl-2-pyrrolidone (NMP), N,N-Dimethylformamide (DMF), N,N-Dimethylacetamide (DMAc), and N,N-Dimethylsulfoxide (DMSO), and combinations thereof. The solvent may also include an amount of a non-solvent (i.e., one that does not dissolve the polymeric binder(s)), but which is miscible with the solvent, in order to produce a single phase that is close to binodal. The composition of the polymeric binder(s) and solvent is hereinafter referred to as a polymer dope suspension.

The dope suspension may include one or more salts added to the solvent(s) in order to facilitate the polymer dissolution, such as $CaCl_2$ or LiCl. The combination of solvent(s) and salt(s) should also be selected with the nature of the adsorbent used. For example, it may be desirable to include no salt with certain zeolites in order to prevent any ion exchange processes that would ultimately denature or transform the zeolite. On the other hand, salt(s) may be added so as to intentionally transform the zeolite by ionic exchange while in the adsorbent dope (made up of the polymeric binder(s), solvent(s), optional salts, adsorbent, and optional filler). Alternatively, no salt may be intentionally added to the dope suspension but the formed composite-adsorbent fiber may be subjected to further processing after formation, such as ion exchange in order to obtain the targeted adsorption properties. Such ion exchange processes are well known and maybe applied to the formed fiber without significant modification due to the chemical inertness of the utilized polymer.

The dope suspension may include one or more organic and/or one or more inorganic fillers. For example, the adsorbent dope may include a filler comprising dry-spun fibrils made of a thermoplastic polymer. Fibrils made by dry-spinning inherently exhibit a high degree of crystallinity. Through inclusion of such high crystallinity fibrils, the flexibility of the inventive fiber may be improved. One type of inorganic filler includes relatively short carbon fiber, such as 5-20 µm long, in amounts up to 20 wt % so as to increase the mechanical properties of the sorbent extrudates. An alternative filler is fiberglass. The organic fillers may be a polymer that is soluble or insoluble in the solvent of the polymer dope. The insoluble polymeric filler includes but is not limited to dry-spun fibrils made of a thermoplastic polymer. Examples of insoluble polymeric filler include poly(para-aramid) pulp or fibrils, (such as fiber made of Kevlar type 953 at a length of 500-1,000 µm). Inclusion of an insoluble poly(para-aramid) to a dissolved poly(meta-aramid) may allow the poly(para-aramid) to swell and thereby help to lock/entangle the poly(meta-aramid) and poly(para-aramid) polymers chains within one another while improving the mechanical properties of the sorbent extrudates. In order to enhance compatibility of blending insoluble polymeric fillers with the soluble thermoplastic polymer of the polymer dope, the insoluble polymeric filler typically belongs to the same general class of polymers as the dissolved thermoplastic polymer in the polymer dope. The insoluble polymeric filler may be identical to the soluble thermoplastic polymer of the polymer dope but have a higher molecular weight than that of the soluble thermoplastic polymer or have a higher degree of crystallinity than that of the soluble thermplastic polymer. For example, a high degree of crystallinity may be achieved with rigid-chain polymers such as in MPD-I fiber produced by dry spinning.

The polymer dope suspension may be made by mixing dissolved polymeric binder(s) with the adsorbent particles. The type of adsorbent is not limited and may include any of those known to those skilled in the art of adsorption-based liquid separation, or typically, gas separation. Typically, the adsorbent has a particle size of less than or equal to 100 µm, typically less than or equal to 10 µm, and sometimes even less than or equal to 1 µm. It may be milled in order to achieve the desired size distribution. Non-limiting examples of types of adsorbents include zeolites (e.g., types A, Y, X, CaBaX, or LSX such as Li-LSX, Ca-LSX), activated carbon, carbon molecular sieve, activated alumina, silica gel, metallorganic frameworks (MOF) and amines in solid form. By amines in solid form, we mean amines that have been deposited upon a solid substrate or solid particles of amines that are not supported on a substrate. The adsorbent can be a mixture of adsorbents, such as a mixture of 20 wt % silica gel and 80 wt % activated alumina or a mixture of a zeolite and a silica gel.

The dope suspension may optionally be degassed under heat and/or vacuum prior to extrusion through a die or spinneret. The dope suspension is forced through a die or spinneret into a coagulant medium where the solvent(s) is removed from the polymer dope suspension thus inducing the polymer binder(s) to solidify into a matrix. The polymeric binder loading and amount of solvent are carefully controlled in order to produce a single phase that is close to binodal. That way, as the extruded dope suspension exits the spinneret or die and traverses through an optional air gap, solvent evaporating from the dope composition either causes the exterior of the extruded dope suspension to solidify or brings it closer to solidification.

The coagulation bath (also known as the coagulant) constitutes a non-solvent or a poor solvent for the polymer(s) while at the same time a good solvent for the solvent(s) that is present within the dope suspension. As the extruded dope suspension is plunged into a coagulant bath containing non-solvent, exchange of solvent and non-solvent from the extruded dope suspension to the bath and vice-versa completes the solidification of the thus-formed nascent fiber, extrudate or bead/pellet to form a two-phase structure of solid polymer and liquid solvent/non-solvent. In this manner, the liquid coagulant bath facilitates diffusion induced phase separation (i.e., solidification) of the still-dissolved polymer(s). In selecting an appropriate coagulant medium composition and temperature, the nature of the dope suspension may be considered. After coagulation, the resulting solid composite structure of adsorbent in a polymeric matrix can be best described as an opened-cell structure. Specifically, the polymeric matrix encapsulates the adsorbent particulates in an opened-cell structure or cage structure, without sticking to the adsorbent particles so as to promote good mass transport.

For formation of fibers, during the extrusion process the solidified fiber may be pulled, for instance by pulling it onto and around a rotating barrel, so that the nascent fiber coagulates under tension. Coagulating the nascent fiber from the suspension dope under tension can promote polymer chain alignment, thus creating additional hydrogen bonds and ultimately reinforcing the resulting adsorbent fiber. One example of a polymeric binder exhibiting such alignment under tension is poly meta-aramids. The draw ratio may be adjusted, among other things, so as to create an opened fiber skin characterized by a relatively higher polymer content than at the fiber core. Such a skin mitigates the risk of dust formation while still allowing good mass transfer.

The formed adsorbent may be configured as beads, pellets, extrudates, a fiber, or fibers. Beads and pellets may be distinguished from extrudates and fibers based upon the aspect ratio: the ratio of the average major dimension of the shape to the average minor dimension of the shape. For beads or pellets, the ratio of the average length to the average thickness generally ranges from 1:1-1:2. For extrudates, which are essentially longer versions of beads or pellets, the ratio of the average length to the average thickness generally ranges from 1:2 to 1:20. For fibers, the ratio of the average length to the average diameter is greater than 1:20.

Those of ordinary skill in the art recognize that methods of producing fibers by diffusion induced phase separation are well known. They will recognize that methods established for the manufacture of hollow fiber membranes for membrane-based gas separation may be adapted for use in the invention, with notable differences between the two being the presence of adsorbent particles and a solid fiber configuration in the case of the invention and the presence of a hollow bore in the case of gas separation membranes.

Extrudates and beads/pellets may be formed much in the same way as fibers, except that the diameter of the extrusion die opening is larger for extrudates and beads/pellets than it is for fibers. While not limited as such, beads/pellets or extrudates typically have an outside diameter (OD) of 2-6 mm. The corresponding typical length of the extrudates will range from 4-120 mm On the other hand, the fibers have an OD of less than a 4 mm, preferably less than 2 mm, preferably less than 1 mm, preferably less than 750 µm, preferably less than 500 µm, preferably less than 300 µm OD, and more preferably less than 150 µm.

For elementary structures configured as a fiber or fibers, the fiber or fibers can optionally have a solid support as described in US 2019/0203380 and US 2019/0201869, the contents of which are incorporated herein in their entireties. Alternatively, the fibers may be gathered in untwisted tows of 3-7 fibers. Optionally, each untwisted tows may have an additional polymeric fiber or metallic wire (which is made of binder without adsorbent particles) that is wrapped around the tow. Again alternatively, a plurality of fibers (e.g., 3-7 fibers) can optionally be twisted around one another to form a yarn and even optionally also include an additional fiber or metallic fiber (again, one made of binder without adsorbent particles) or wire wrapped around the twisted fibers.

The elementary structures may be dried after formation or remain in a wetted state or initially dried and later wetted in preparation for the second step. Regardless of which alternative is utilized, in the second step, an intermediate adsorbent bed is formed from a plurality of the wet or dry beads/pellets, extrudates or fibers, or from a continuous length of a wet or dry fiber. The intermediate bed may be formed "in situ". By "in situ", we mean that the intermediate bed is formed by filling a space within a pressure vessel of the adsorber. In this case, the product bed is formed by compressing the thus-formed intermediate bed while in this space within the pressure vessel. Alternatively, the intermediate bed may be formed in a container that is not disposed within the pressure vessel of the adsorber at the time of compressing the intermediate bed to form the product bed. In this alternative case, the product bed is first formed and later placed within the pressure vessel of the adsorber. In a refinement of this alternate case, a plurality of product beds are formed and then stacked on top of or next to each other in the pressure vessel of the adsorber. This modular-type technique can be an especially convenient way to provide for relatively large adsorbers.

The shape of the intermediate bed is not limited. The shapes include irregular, annular, circular, square, rectangular, etc.

The intermediate bed is then axially and/or radially compressed to form the product bed so as to immobilize the one or more elementary structures against itself or each other and form a product bed.

The compression may be performed while the elementary structures of the intermediate bed are in a wetted state. By "wetted state", we mean that they are wetted with a liquid swelling agent. While any liquid known to swell the type of polymeric binder used, a non-limiting list of such liquids includes methanol, a mixture of methanol, water, and optionally N-Methyl-2-pyrrolidone (NMP), and the like. In such a wetted state, the polymeric binder tends to become softened and swollen by the action of the liquid swelling agent. We have found that, after compression and drying of the product bed, the one or more elementary structures remained immobilized against itself or each other even if the compression force is removed. It is as if a monolith-like structure holding its shape is formed.

Alternatively, the compression may be performed while the elementary structures are dry and not in a wetted state. Any solvent remaining in the elementary structures after diffusion induced phase separation may be removed through any technique known in the field of gas separation membrane manufacturing, including allowing the elementary structures to dry in place with or without circulation of air or inert gas or replacement of less volatile solvents present within the elementary structures with more volatile solvents by washing and subsequent drying of the elementary structures. When the intermediate bed is compressed in a dried state, the compression force needs to be maintained on the product bed in order to maintain immobilization of the one or more elementary structure against each other or against itself because the theorized adhesion is not present or at least not present to the same degree as in wetted compression of the intermediate bed as described above.

Whether the compression is performed while the elementary structures are dry or are wetted, because the binder is not made of the brittle inorganic materials of conventional beaded adsorbents, but is instead made of a polymeric material, no breakage or dusting is observed as a result of compression of the intermediate bed. Those skilled in the art of materials engineering will recognize that brittle materials fracture when they are subjected to stress but have a little tendency to deform before rupture. Therefore, they are characterized by little deformation, poor impact resistance capacity, and low tensile strength. It is well accepted that most inorganic non-metallic materials are brittle. Zhang, H., Building Materials in Civil Engineering, § 2.3.3, Woodhead Publishing (2011). In contrast, the elementary structures of the invention deform when subjected to stress. Because they do not fracture during or after being subjected to stress, product beds made of them do not exhibit dusting that would otherwise be expected in conventional beads made with a binder that is brittle if such conventional beads were subjected to the same stress.

Descriptions of a number of different techniques follows.

In one example, and in the case of an intermediate bed comprised of a plurality of elementary structures shaped as beads or extrudates or as a mass of randomly organized fiber, a container is filled with the elementary structures and a ram is then plunged against the intermediate bed while in a wetted state. After the product bed has been allowed to at least partially dry (in order to achieve the aforementioned adhesion), the ram is removed from the product bed. The container may already form a part of the adsorber, in which case the compression step is performed "in situ". In such an embodiment, the types of internal structures that ordinarily contain conventional adsorbent beads inside adsorbers, such as grids and other structures, may be used as the container. The container may instead not already form part of the adsorber, in which case the aforementioned internal structures may be used as a container and the container later placed within the pressure vessel or the container may be used during formation of the product bed and the product bed removed from the container for later placement within the adsorber.

In another example and in the case of an intermediate bed comprised of a plurality of elementary structures shaped as beads or extrudates or as a mass of randomly organized fiber, a container is filled with the elementary structures and a ram is then plunged against the intermediate bed while in a wet or dry state. The container may already form a part of the adsorber, in which case the compression step is performed "in situ". In such an embodiment, the types of internal structures that ordinarily contain conventional adsorbent beads inside adsorbers, such as grids and other structures, may be used as the container. For example, a container configured with a tube may be fitted with top and bottom ends made of mesh (i.e., a grid). While an intermediate bed compressed while in a wet state may retain its shape after drying and removal of the compression force, an intermediate bed compressed while in a dry state requires a permanent mechanical constraint upon completion of compression. Take, for example, the aforementioned tube fitted with top and bottom mesh ends. The bottom mesh is permanently secured to the bottom of the tube so that it may withstand the compression force. The top mesh is adapted and configured to slide within the tube during application of the compression force, such as a ram. After the compression is completed, the upper mesh may be permanently secured to the tube (with, for example, a retaining ring) while the compressive force is still being maintained upon the product bed. After this permanent mechanical constraint is removed, the compression force may be withdrawn.

In another example, the pressure vessel of the adsorber may be fitted with an extension having a same cross-section, such as an extension tube fitted on top of the pressure vessel of similar ID whose bottom is fitted with a porous grid. First, a desired amount of the elementary structures are placed within the extension tube/pressure vessel to form the intermediate bed and the top layer of elementary structures is smoothed out to form a planar top surface. Second, a top porous grid, comparable to the bottom porous grid, is placed on top of the intermediate bed, Third, a ram is placed against the top porous grid and pushed downwardly to compress the intermediate bed. Before the compression force is removed, the top porous grid is secured to the top of the pressure vessel. Finally, the extension tube is removed from atop the pressure vessel.

While an embodiment in which the container constituting the pressure vessel of the adsorber is described above, alternatively, the container does not constitute the pressure vessel adsorber, in which case the product bed may be formed within the container (such as a tube with top and bottom mesh) and the container containing the product bed later placed within the pressure vessel of the adsorber.

In another example, the intermediate bed comprised of a plurality of elementary structures shaped as one or more fibers wrapped around a mandrel. This may be made by wrapping the fiber(s) around the mandrel. The wrapped fibers may be radially compressed as follows. A rigid sleeve is placed around the fiber-wrapped mandrel. The sleeve has a slit extending down the entire length of the sleeve so that one edge of the sleeve along the slit may slide under the other edge of the sleeve while the sleeve is radially compressed with a device such as with a worm clamp. In this manner, the intermediate bed is compressed to form the product bed. If performed in a wetted state, the product bed is allowed to at least partially dry (in order to achieve the aforementioned adhesion) before removal of the radial compressive force. If performed in a dry state, the two edges of the sleeve are fastened to one another (using any technique known in the field of mechanical fasteners and containers) so as to permanently constrain the product bed before removal of the compressive force. In one particular technique, the compressed fiber-wrapped mandrel is plunged out of the sleeve and into a cylindrical container adapted and configured to form part of the adsorber. Because the cylindrical container has an inner diameter (ID) close to or slightly larger than that of the compressed sleeve, the degree of packing of the product bed is maintained or only slightly decreased when plunged into the subsequent container (for placement in the adsorber). The mandrel may optionally be a porous center tube forming a grid. In this case, the product bed is suitable as a radial adsorbent bed.

The intermediate bed may instead be comprised of a plurality of elementary structures shaped as a plurality of parallel fibers. Any technique known in the field of gas separation membranes and structured adsorbents may be used to form such a configuration.

In one non-limiting technique, this may be done by forming a bundle of one or more skeins of elongate, parallel loops of the fiber followed by placement of a rigid sleeve around the skein(s). It should be noted that it is within the scope of the invention to optionally twist the fibers so that they are no longer parallel. After placement of the sleeve, the loop ends of the skein(s) may be cut so as to provide for cut fiber ends that are flush with the ends of the sleeve. The sleeve has a slit extending down the length of the sleeve so that one edge of the sleeve along the slit may slide under the other edge of the sleeve while the sleeve is radially compressed, such as with a worm clamp. In this manner, the intermediate bed is compressed to form the product bed. If performed in a wetted state, the product bed is allowed to at least partially dry (in order to achieve the aforementioned adhesion) before removal of the radial compressive force. If performed in a dry state, the radial compression upon the bundle of dry parallel fibers must be maintained. In one technique, the two edges of the sleeve are fastened to one another (using any technique known in the field of mechanical fasteners and containers) so as to permanently constrain the product bed before removal of the compressive force. In another technique, the compressed bundle of parallel fibers is plunged out of the sleeve and directly into a tube. This tube may be adapted and configured to form part of the adsorber. Alternatively, the tube is used to hold the compressed dry bundle before the tube and compressed bundle is placed into the cylindrical pressure vessel of the adsorber or the compressed dry bundle is plunged into the cylindrical pressure vessel of the adsorber. Because the tube has an inner diameter close to or slightly larger than that of the compressed sleeve, the degree of packing of the product bed is maintained or only slightly decreased, whether it is plunged into a subsequent cylindrical container (for placement in the adsorber) or not.

In another non-limiting technique, the intermediate bed is compressed of a plurality of skeins of fiber distributed around a porous center tube so that the elongate loops are parallel to one another. The subsequent steps of sleeve placement, radial compression, placement or plunging into the pressure vessel of the adsorber are performed as described above.

Regardless of the specific technique used to form the product bed and as mentioned above, the intermediate bed may be compressed while in a dry state or in a wetted state. When done in a dry state, the elementary structure(s) are forced against each other by a permanent mechanical constraint. By permanent, we mean that the compressive force remains upon the product bed unless mechanically removed. Advantages of such dry forming include obtaining bed packing over 50% without cracking the elementary structures as would happen to conventional adsorbent beads/pellets which use an inorganic binder. When done in a wet state, the initial volume of the intermediate bed can be significantly decreases (e.g. –30%). Because the elementary structure(s) are wetted, they can deform and pack more closely without breaking or dusting as would happen with conventional adsorbent beads/pellets made with inorganic binder. As a consequence, the bed packing increases while its porosity (i.e., void fraction) decreases. Using this process, a bed packing above 70% can be reached. The resulting product bed can then be at least partially dried before removing the compressive force.

Regardless of the specific technique used to form the product bed, generally speaking, the bed packing of the product bed exceeds 60%, 70%, 80%, or 90% or greater. Preferably, the bed packing is from 70-90% or even greater.

The product bed may be adapted and configured as an axial or radial bed. The bed cross section can be annular, circular, square, or other geometrical shapes.

Although not restrictive, in one embodiment, product beds made of parallel fibers are preferred. The resulting structure is sturdy and not subject to fluidization/attrition phenomena and can yield a very low pressure drop without compromising on adsorbent density.

We will now describe methods of use of high packing adsorbent beds for separation of gases. There are many advantages and potential applications for the high-packing bed of the invention.

Generally speaking, for feed gases already at high pressure, the inventive adsorbent bed is advantageous because the smaller void allows the cycle time of the adsorption process to be significantly decreased, or alternatively, for a same cycle time as performed with conventional beaded beds, the volume of the adsorbent bed is significantly decreased. One example of such a process is for hydrogen PSA. Also, for feed gases at low pressure, use of a parallel fiber adsorbent bed made according to the invention is advantageous the significantly lower pressure drop in comparison to conventional beaded beds allows for a significant decrease in compression needs, and therefore, a significant decrease in compression power costs and even the capital cost of a compressor if the compressor size can be decreased due to the lower pressure drop it must overcome.

The adsorber may be adaped and configured to be stationary or to be mobile, such as a portable oxygen concentrator adapted and configured for oxygen therapy for a patient.

Axial beds of parallel adsorbent fibers made according to the invention are advantageously implemented in replacement of conventional, complex and costly radial beaded beds within the temperature swing adsorption (TSA) scheme of the FEP of large ASUs.

Axial beds of parallel adsorbent fibers made according to the invention are advantageously implemented in replacement of conventional axial beaded beds within a TSA scheme of an ASU FEP.

Radial or axial beds made according to the invention are advantageously implemented in replacement of conventional, complex and costly radial beaded beds or axial beaded beds within a TSA scheme of an ASU FEP.

The high packing adsorbent beds of the invention may be used to remove components of air that would freeze in the distillation column of an air separation unit (ASU) in which oxygen is separated from nitrogen. This process is called Front End Purification (FEP) in which components such as moisture, $CO_2$, and hydrocarbons are removed from an air feed. The adsorbent bed of a FEP employs an adsorbent(s) formulated for removal of moisture, CO2, and volatile organic compounds from the feed air in order to avoid freezing of those components in the cold box of the ASU. The air feed must be compressed to the pressure required for the air separation process. Because all adsorbent beds have a pressure drop, above and beyond the pressure that is necessary for the downstream air separation process, the compression must also be sufficient to accommodate the pressure drop of the bed. A higher pressure drop of course leads to a higher pressure for the air feed gas to the adsorbent bed. As a result, the compression energy is necessarily higher for higher pressure drop beds. Since the pressure drop associated with parallel fiber beds is significantly lower than those of conventional beaded beds in the FEPs of ASUs, a parallel fibers adsorbent bed made according to the invention results in significantly lower costs associated with compression energy.

Other air separation applications include ambient air purifiers for removal of contaminants such as volatile organic compounds (VOCs) abatement) and production of Argon from an Argon and Oxygen-containing stream from a distillation-based air separation process.

The high packing adsorbent beds of the invention may also be used for production of methane from natural gas or biogas. For example, adsorbent-based techniques are often used to pre-purify natural gas or biogas prior to treatment in bulk separation techniques, such as $CO_2$ removal by gas separation membranes of amine absorption. The high packing adsorbent beds of the invention may be used to remove moisture, VOCs, $C_{3+}$ hydrocarbons, and $H_2S$ in the FEP step for pre-treatment of the raw natural gas or biogas feed upstream of any bulk separation step. In one aspect, because the working capacity of the inventive adsorbent bed is significantly higher than that of conventional beaded beds, for a same volume adsorbent bed, the volume taken up by moisture removal adsorbent may be decreased and the volume taken up by VOC removal adsorbent may be correspondingly increased. Because of the kinetic advantage of the inventive adsorbent bed, although the equilibrium capacities for the inventive adsorbent bed and conventional beaded bed are similar, the working capacity of the inventive adsorbent bed is significantly higher than conventional beaded beds.

In this way, any downstream non-regenerable activated carbon bed ordinarily used for removing residual amounts of VOCs will not be subjected to such large loads of VOCs and thus may be replaced less frequently. In another example, biogas or natural gas containing relatively high levels of nitrogen may be first processed in one or more gas separation membranes to remove bulk amounts of $CO_2$. Since it is difficult to simultaneously remove nitrogen at the same time as $CO_2$ using gas separation membranes, nitrogen must be removed in a subsequent purification step if the product methane gas is to meet pipeline specifications of less than 3% inerts. This may be done by removal of $N_2$ from the gas produced by the gas separation membrane step using the high packing adsorbent bed of the invention. Instead of using the high packing adsorbent bed for removal of $N_2$ from natural gas or biogas containing undesirable levels of $N_2$, they may be used to remove residual amounts of $CO_2$ from the gas produced by the gas separation membrane step prior to removal of $N_2$ in a distillation column.

The high packing adsorbent beds of the invention may also be used for capture of $CO_2$ from flue gas (primarily containing $CO_2$ and $N_2$) or from air.

The high packing adsorbent beds of the invention may also be used for capture of $CO_2$ from flue gas and/or in a TSA FEP utilizing silica gel for dehumidification of the flue gas prior to $CO_2$ removal.

The high packing adsorbent beds of the invention may also be used for VOC abatement in the enclosed spaces such as submarines, buildings, or spacecraft.

The high packing adsorbent beds of the invention may also be used for separation of $CO_2$ or $N_2$ from $CH_4$.

Still other applications of the inventive high packing adsorbent beds include dehydration of gases, such as air, $O_2$, $N_2$, $H_2$, alcohol, fuel, or $CO_2$, and recovery or purification of helium from helium-containing gases such as natural gas or exhaust gas from an optical fiber cooling tower.

The high packing adsorbent beds of the invention may also be used to produce hydrogen from a hydrogen-containing gas mixture using PSA (commonly referred to as an $H_2$ PSA). For example, the hydrogen-containing gas is a syngas stream or processed syngas stream from a reforming process that primarily contains $H_2$ and $CO_2$. We will now describe this particular application greater detail.

Figure 21:
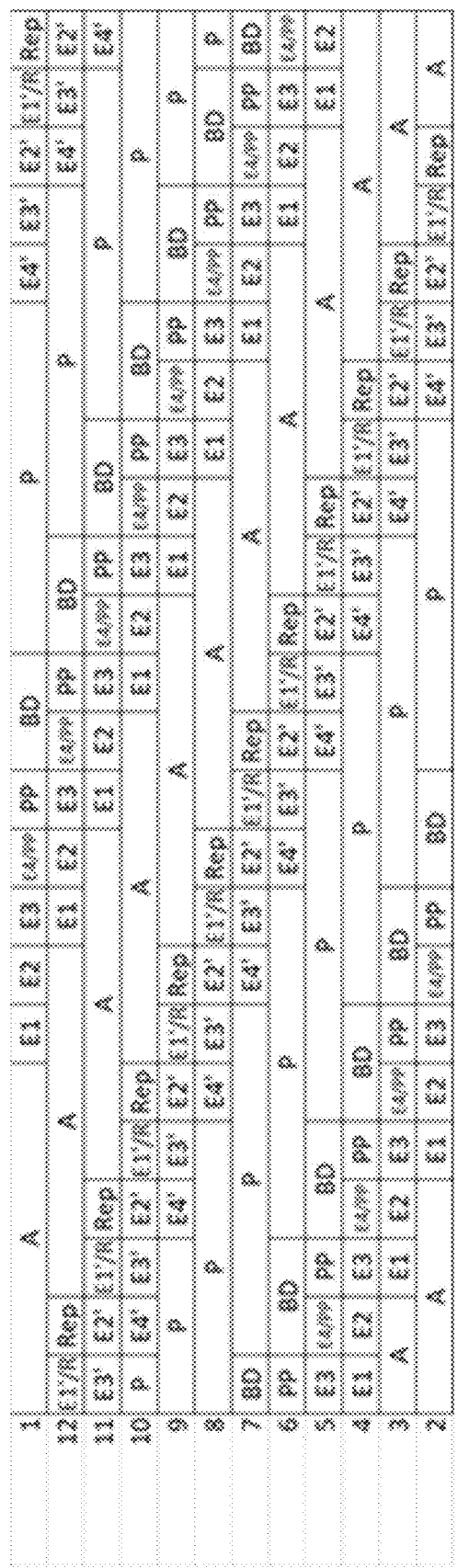
FIG. 21 is a table depicting a conventional 1234 cycle for a 12 vessel pressure swing adsorption unit.

High-packing for industrial $H_2$ PSA systems can be large and involve multiple adsorber vessels (>2) operated following a complex cycle with numerous steps. In the example below, a 12-vessels PSA is considered in which each vessel successively go through 13 steps as seen in FIG. 21. FIG. 21 depicts a conventional 1234 cycle. The term "1234" means that:
- the PSA has 12 adsorber vessels
- 3 of which are simultaneously in adsorption (A) and
- The cycle has 4 pressure equalization steps: ($E_1$, $E_1'/R$), ($E_2$, $E_2'$), ($E_3$, $E_3'$) & ($E_4$/PP, $E_4'$)

The first column indicates the adsorber number while the nomenclature of the different steps is:
A=Adsorption Step with $H_2$ production at high pressure
$E_1$=First Equalization Down (i.e. $1^{st}$ depressurization)
$E_2$=Second Equalization Down (i.e. $2^{nd}$ depressurization)
$E_3$=Third Equalization Down (i.e. $3^{rd}$ depressurization)
$E_4$/PP=Fourth Equalization Down with simultaneous Purge Providing
PP=Purge Providing
BD=Blowdown
P=Purge (i.e. low pressure regeneration)
$E_4'$=Fourth Equalization Up (repressurization using gas from $E_4$)
$E_3'$=Third Equalization Up (using gas from $E_3$)
$E_2'$=Second Equalization Up (using gas from $E_2$)
$E_1'/R$=First Equalization Up (using gas from $E_1$) with simultaneous product pressurization
Rep=Final product pressurization In $H_2$ PSA systems, it is necessary to avoid high velocity events that can lead to fluidization and to attrition of the beaded adsorbent media. Such high velocity events can occur when connecting together two adsorber vessels at different pressures. To mitigate the risk of media fluidization, pressure equalizations between 2 adsorber vessels is carried out in control fashions, using dedicated and properly-sized valves.

In large $H_2$ PSA systems, it is also desirable to minimize the PSA phase time (defined as the total cycle time divided by the number of beds) since the necessary volume of adsorbent is proportional to the phase time. As the equalization flow rate is limited to avoid attrition and the duration is also limited to minimize phase time, partial pressure equalizations are often used. The term partial pressure equalization means an equalization step in which the final differential pressure between the two vessels is greater than zero. However, partial pressure equalizations cause a loss of $H_2$ recovery.

The implementation of the inventive adsorbent beds in $H_2$ PSA systems brings significant advantages since such beds are not prone to attrition while having similar packing density (kg/m$^3$) compared to beaded media. Pressure equalization steps can be complete instead of partial, which maximizes $H_2$ recovery. Moreover, the phase time can be shortened with respect to the state of the art, which results in proportionally reduced adsorbent volume.

Three examples follow that are based on simulations of a 12 adsorber vessel PSA system. The first example describes the performance achieved with conventional beaded media. This is a commercial reference case. The second example looks at the performance achieved with the inventive adsorbent beds, considering complete pressure equalizations (since higher flow rate can be allowed. The third example is similar to the second example but with faster (shorter) pressure equalization steps. As can be seen in the first table above, shortening the equalization steps also means shortening other steps, including both the adsorption and purge steps.

The three examples are based on the same cycle chart, same feed flow rate, same feed pressure, same operating temperature and same final $H_2$ product purity. The resulting performance parameters looked at are (1) the H2 recovery and (2) the volume of adsorbent used.

In the reference case, a conventional 1234 cycle with purge-providing step simultaneous to 4th equalization step is described in FIG. 21. The composition of the feed gas is: $CO_2$ 16%, $CH_4$ 7%, CO 3.5%, $N_2$ 0.5%, $H_2$ 73%. The pressure of the feed gas is 26 bara and the temperature 35° C. The low pressure of the cycle is 1.6 bara. The phase time is 30 seconds and the equalization steps E1, E2, E3, E4 last respectively 11 s, 16 s, 14 s and 15 s. The adsorbents used are standard activated alumina beads, activated carbon pellets and molecular sieve beads that would suffer from attrition if they were submitted to a gas velocity high enough to let them move. To avoid attrition risk, the equalization flow rates are limited such that the pressure differences at the end of all the equalization steps are 1.5 bar each. The $H_2$ purity in the product is 99.8% with 10 ppmv of CO. Within these constraints, the maximum $H_2$ recovery obtained is 89% and the adsorbent quantity necessary to treat 166000 $Nm^3/h$ of feed gas is 35 $m^3$ per vessel.

In the second example, the different layers of beaded media are replaced by high-packing structured adsorbent beds of AA, AC and molecular sieve. The same cycle chart as in example 1 is applied with the same step times. The characteristics and flow rate of the feed gas are the same as in example 1. The use of high-packing structured beds allows to increase equalization flow rate so that complete equalizations can be performed where the pressure differences between two adsorbers at the end of an equalization step are set to zero. With this enhanced cycle, $H_2$ recovery of 91% can be achieved with a volume of adsorbent of 43 $m^3$ per vessel. With an increase of 23% of adsorbent volume, a significant increase of 2% in $H_2$ recovery is possible.

In the third example, the same cycle and same adsorbents as in the second example are applied but where the phase time is reduced from 30 s to 20 s. Likewise, the equalization steps are complete equalizations. Each equalization step lasts 10 seconds. By reducing the cycle time, the required adsorbent volume is reduced accordingly. The $H_2$ recovery obtained is 1% more than in conventional example 1 and the adsorbent volume per vessel is reduced by 17%. The performances of the two cycles are summarized in Tables 1 and 2. The cycle time for the first and second examples is 360 sec (phase time of 360/12=30 sec). The cycle time for example 3 is 240 sec (phase time of 240/12=20 sec).

TABLE 1

Cycle performances for $H_2$ PSA example

| example 1 (conventional) | | example 2 (according to the invention) | | example 3 (according to the invention) | |
| --- | --- | --- | --- | --- | --- |
| $H_2$ Recovery [%] | $V_{ads}$ [$m^3$] | $H_2$ Recovery [%] | $V_{ads}$ [$m^3$] | $H_2$ Recovery [%] | $V_{ads}$ [$m^3$] |
| 89 | 35 | 91 | 43 | 90 | 29 |

TABLE 2

$H_2$ recovery and adsorbent volume comparison

| step | duration (s) Example1/Example 2 | duration (s) Example3 |
| --- | --- | --- |
| A | 90 | 60 |
| E1 | 11 | 8 |
| E2 | 16 | 11 |
| E3 | 14 | 9 |
| E4/PP | 15 | 10 |
| PP | 15 | 10 |
| BD | 30 | 20 |
| P | 90 | 60 |
| E4' | 15 | 10 |
| E3' | 14 | 9 |
| E2' | 16 | 11 |
| E1'/R | 11 | 8 |
| Rep | 19 | 12 |

When the inventive adsorbent bed is used in H2 PSA systems, the following non-limiting list of adsorbents are particularly useful: activated alumina, silica gel, activated carbon, zeolite A, Ca-exchanged zeolite A, zeolite X, Ca-exchanged zeolite X, and Ca-exchanged zeolite LSX. Also, the cycle may include at least 3 complete equalization steps lasting 18 seconds or less, preferentially 15 seconds or less, more preferentially 13 seconds or less. Finally, the adsorption pressure may be between 15 and 55 bara.

The high packing adsorbent beds of the invention may be used to separate components of air other than just the separation of oxygen and nitrogen. Non-limiting examples include oxygen from air in On-Board Oxygen Generators Systems (OBOGS) used for production of oxygen aboard aircraft, a nitrogen PSA for producing nitrogen product gas, or an oxygen VSA for producing oxygen product gas.

The fast kinetics of the inventive adsorbent beds are particularly useful for the production of oxygen following a VSA cycle.

Adsorption processes can be characterized by a combination of equilibrium and kinetic effects. Even in equilibrium-driven separations such as $O_2VSA$, the kinetic component is critical to achieve high performances. In $O_2VSA$, the preferred adsorbent used are X-type zeolites exchanged with Li. It is well known that the mass transfer is limited by the resistance in the macropores. For this reason, the interesting kinetic parameter is the so-called macropore diffusion time constant $$\frac{R_P^2}{D_P^e}$$

with $$D_P^e = \frac{\varepsilon_P \dfrac{D_{macro}}{\tau}}{\varepsilon_P + (1 - \varepsilon_P)K},$$

where the denominator represents the effective bead Henry law constant. It was determined that the adsorbent described in prior invention (U.S. Pat. No. 10,525,400) has a macropore diffusion time constant 3 times shorter than an high-rate commercial available LiLSX adsorbent. The diffusion times constants have been determined using the experimental protocol described by Brandani, et. al. Brandani, et al., Using a volumetric apparatus to identify and measure the mass transfer resistance in commercial adsorbents, Microporous and Mesoporous Materials, vol. 304, September 2020, 109277. Specifically, the adsorbent was made using PBI as a binder and a lithium-exchanged zeolite.

The resulting adsorbent (LiX/PBI) can be formed into high-packing structured adsorbent beds according to the invention. The resulting beds structure can be tuned to deliver low pressure drop while delivering faster kinetics than conventional solutions.

Figure 22:
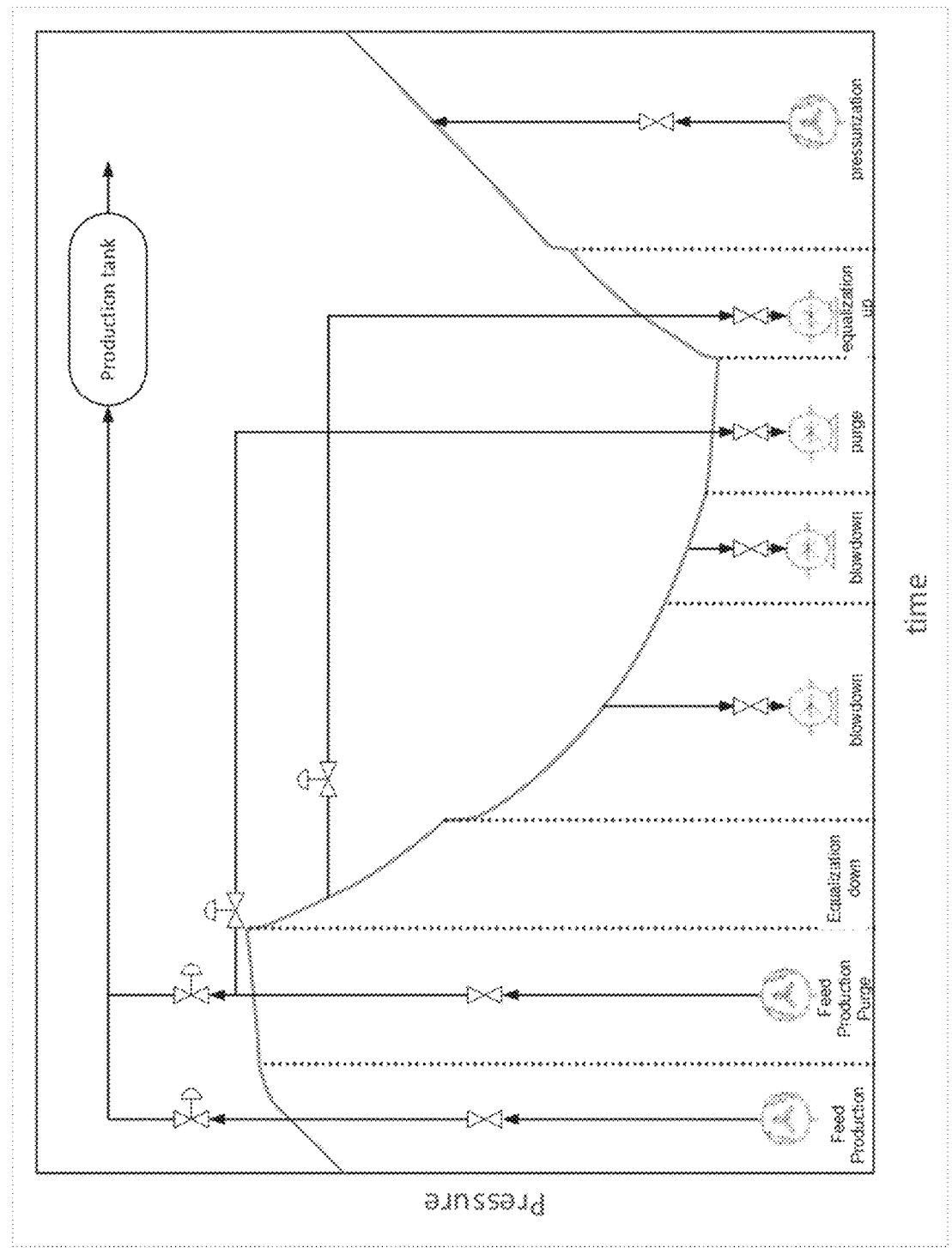
FIG. 22 is a schematic of a VSA process in order to show the impact of the invention upon an O2 production process in comparison to a conventional beaded bed.

To show the impact on an $O_2$ production process, the performances of a VSA air separation process performance were determined using a detailed computer model. The cycle with 2 adsorbers, 1 production buffer capacity, a blower, a vacuum pump and comprising 8 substeps is shown in FIG. 22.

The step times are given in Table 4 for a total cycle time of 42 seconds.

TABLE 4 cycle step times for 8 step $O_2$ VSA cycle

| step | duration (s) |
|---|---|
| feed production | 4 |
| feed production purge | 5 |
| equalization down | 4 |
| blowdown | 8 |
| blowdown | 4 |
| purge | 5 |
| equalization down | 4 |
| pressurization | 8 |

The following conditions were used for the process simulations: O2 product purity at 93%, adsorption pressure at 1.5 bara, desorption pressure at 0.4 bara and feed temperature at 313K. The two adsorbers were each filled with 8 $m^3$ of $N_2$ selective adsorbent. A highly exchanged LiX adsorbent commercial available was used as a reference case. The performances obtained are summarized in Table 5.

In the second example, the same cycle and conditions as in example 1 were used to simulate the process performances when the conventional beaded adsorbent media are replaced with high-packing structured adsorbents according to the invention. The results of the simulations are summarized in table 2. By using high-packing structured adsorbents, an increase of 15% of the $O_2$ recovery and a reduction of the specific energy of 15% can be achieved. The daily O2 production can be increased by 25%.

TABLE 5

$O_2$ VSA performances comparison

| | example 1 (commercial adsorbent) | example 2 (adsorbent according to the invention) |
|---|---|---|
| $O_2$ Recovery (%) | 55 | 64 |
| Total Specific Energy (kWh/Nm$^3$) | 0.39 | 0.33 |
| Pure $O_2$ Total Production (t/d) | 71 | 89 |

EXAMPLES

Example 1

In a 1st example, dry forming of a radial bed using adsorbent fibers is described. Filaments of adsorbent fibers were produced by phase inversion. Several filaments were gathered together as a multi-filament and the multi-filament was wrapped with an overwrapping fiber that does not contain adsorbent particles. The thus-formed overwrapped multi-filament structured adsorbent was piddled into a container in a helical fashion to form a cylindrical bundle until a proper sized bundle is reached, as seen in FIG. 1.

A radial adsorbent bed may be finished from this cylindrical bundle as follows. An expendable, mesh, central support tube is placed within the open interior of the cylindrical bundle. A similar expendable, mesh, outer support tube is placed around the circumference of the cylindrical bundle. While in this constrained state, piddled bundle is axially compressed in a dry state from the top with a plunger until the desired bed packing is obtained.

Example 2

Example 2 describes the wet forming of an axial bed using loose extrudates.

Extrudates loaded with 90 wt % of 13X zeolite were first prepared by phase inversion using a high temperature rated polymer (MPD-IT) as binder. MPD-IT is a meta-aramid obtained from the poly-condensation of the monomers: MPD (meta-phenylenediamine), I (isophthalamide chloride) and T (terephthaloyl chloride).

Figure 2A:
FIG. 2A is a photograph of an uncompressed bed of extrudate.

A stainless steel tube measuring 5" long by 2" outside diameter. 0.5" was provided. A thick stainless steel disc having an outside diameter slightly smaller than the inside diameter of the tube was then placed at the bottom of the tube. The extrudates were poured into the tube and dry packed through axial compression using a moderate amount of mechanical force with a plunger having an outside diameter slightly smaller than the inside diameter of the tube. The dry packed axially shaped bed is shown in FIG. 2A. After application of the moderate mechanical constraint, we estimated that the initial bed volume had decreased by merely 5% with no breaking or dusting observed. The resulting bed packing was estimated at about 36%.

Figure 2B:
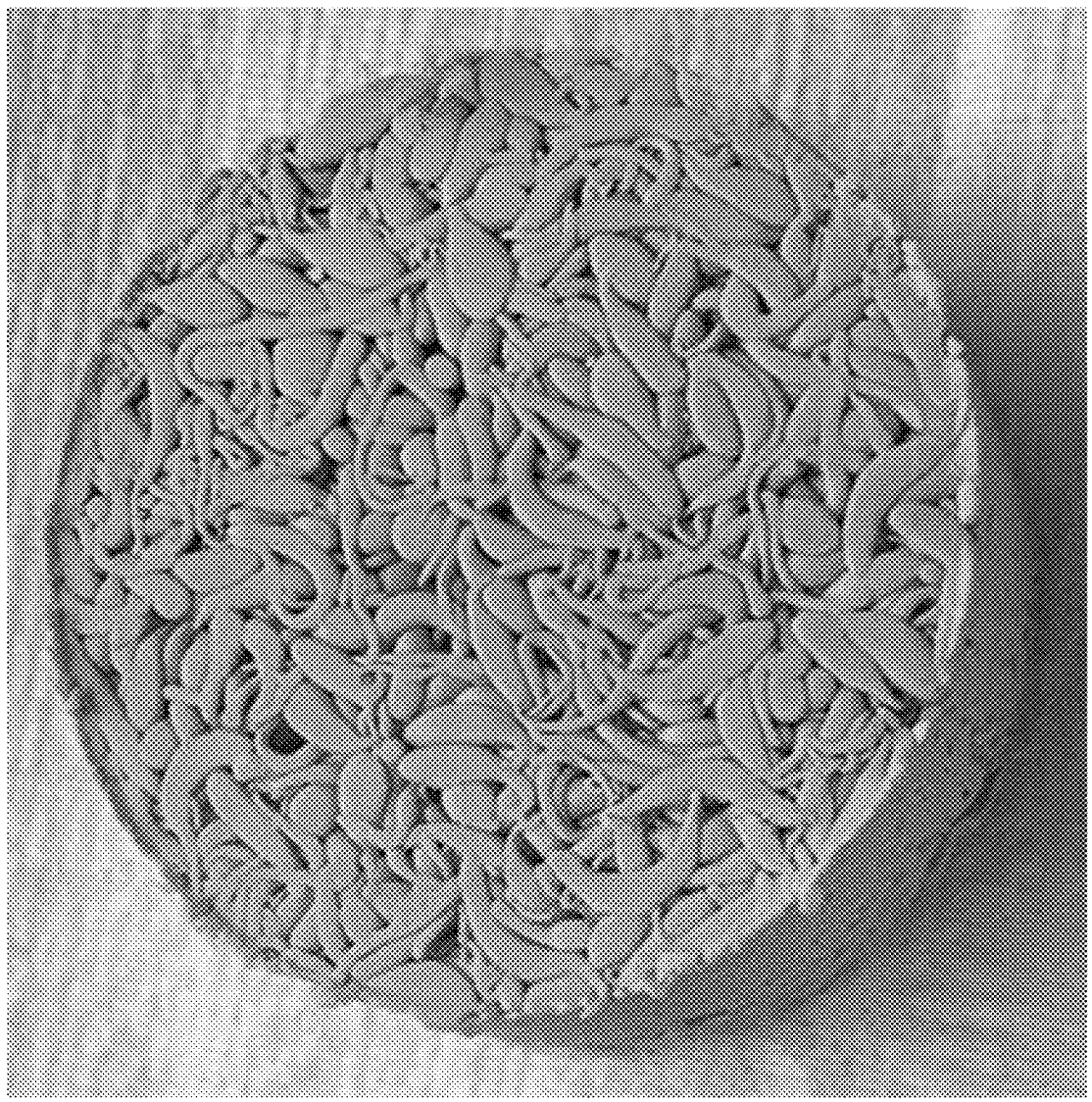
FIG. 2B is a photograph of a packed bed of extrudate.

The dry packed extrudates were wetted with methanol in order to soften the binder. The now-wetted extrudates were axially compressed with the plunger driven by an axial press. As the wetted-extrudates were deformed under the mechanical constraint of the plunger, methanol was forced out of the extrudates and through the gap between the disc and the tube. The compressive force was sufficient to decrease the volume of the bed by about 50%. The resultant bed packing was estimated to be about 73%. This final high-packing bed is shown in FIG. 2B.

Example 3

Example 3 is directed to wet forming of an axial high-packing bed from a loose collection of unorganized fibers.

Fibers loaded with 85 wt % of 13X zeolite were first prepared by phase inversion using the high temperature rated polymer (DAM-IT) as binder. DAM-IT is a meta-aramid obtained from the poly-condensation of the monomers: DAM (diamino mesitylene—also known as 2,4,6 trimethyl m-phenylene diamine), I (isophthalamide chloride) and T (terephthaloyl chloride). The fibers were then dry packed loose in an acrylic tube and moderately compacted with the plunger of Example 4 using to form an axial bed. The moderate mechanical axial constraint was such that the initial bed volume decreased little and with no breaking or dusting observed. A close-up photograph of this initial bed is seen in FIG. 3A. The resulting bed packing was estimated at about 28%. Next, the fibers of the initial bed were wetted with methanol in order to soften the binder. The wetted packed bed was then compressed using the plunger, while allowing the methanol to be expelled from the bottom of the tube. After drying, the resulting packing was estimated at about 72% as seen in the photograph of FIG. 3B. It is noteworthy that some of the adsorbent fibers are bent in a way (e.g., a 180° bend) that would not have been possible without wetting first the fibers. In fact, we believe that dry fibers would have broken and dusted.

Example 4

Figure 4:
FIG. 4 is a photograph of uncompressed skeined bundles of fiber.

Skein bundles of different length are shown in FIG. 4. Fiber from a spool of fiber is fed to a large rotating "fork" until the desired skein bundle size is obtained. In order to achieve a same overall fiber length for each skein bundle formed, the number of rotations is repeated for each formed skein bundle.

Example 5

Figure 5A:
FIG. 5A is a photograph of a first step of a process for dry-forming an axial bed.
Figure 5B:
FIG. 5B is a photograph of a second step of the process of FIG. 5A.
Figure 5C:
FIG. 5C is a photograph of a third step of the process of FIG. 5A.
Figure 5D:
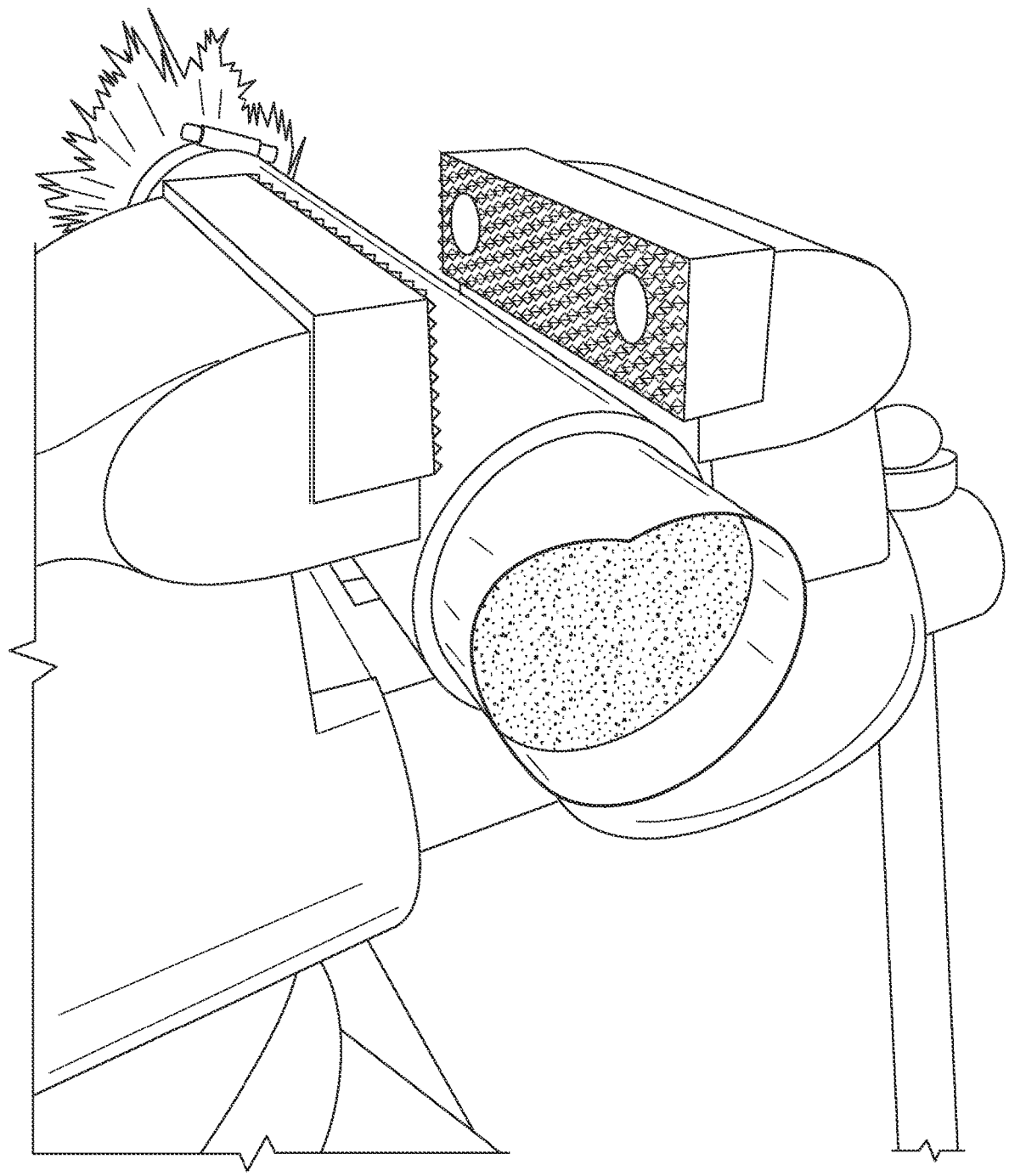
FIG. 5D is an illustration of the sleeve-outfitted bundle being inserted into a metal tube, in accordance with one embodiment of the present invention.
Figure 5E:
FIG. 5E is a photograph of a fifth step of the process of FIG. 5A.
Figure 5F:
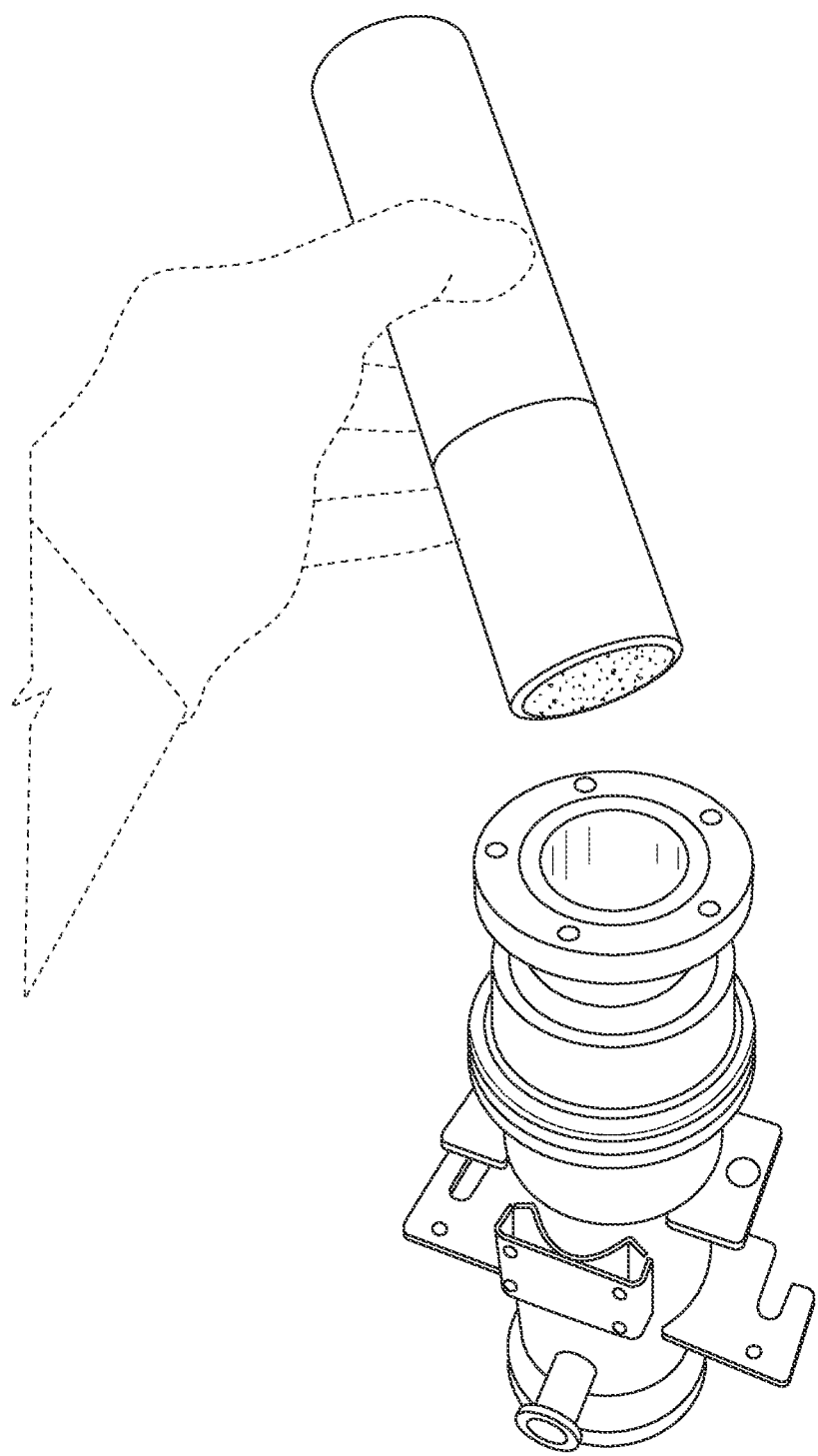
FIG. 5F is an illustration of a sixth step of the process of FIG. 5A.
Figure 5G:
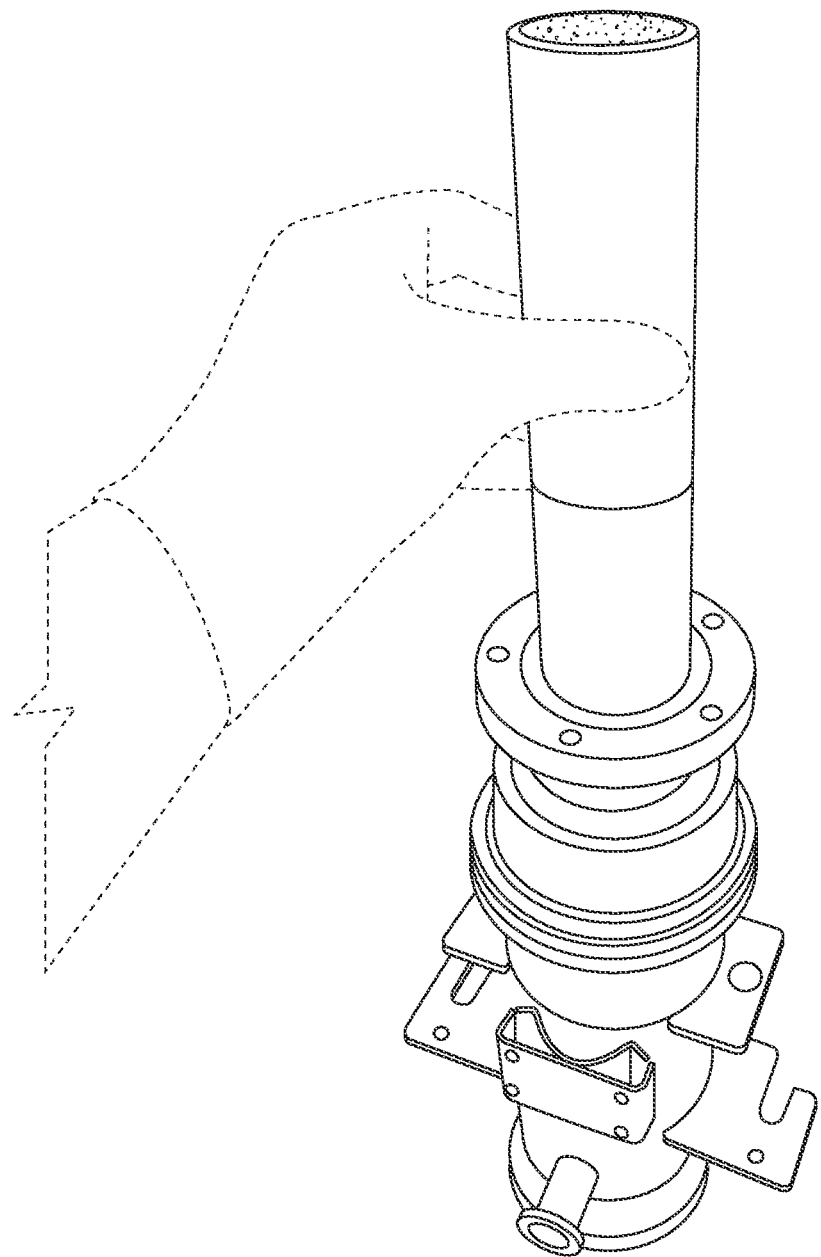
FIG. 5G is an illustration of a seventh step of the process of FIG. 5A.
Figure 5H:
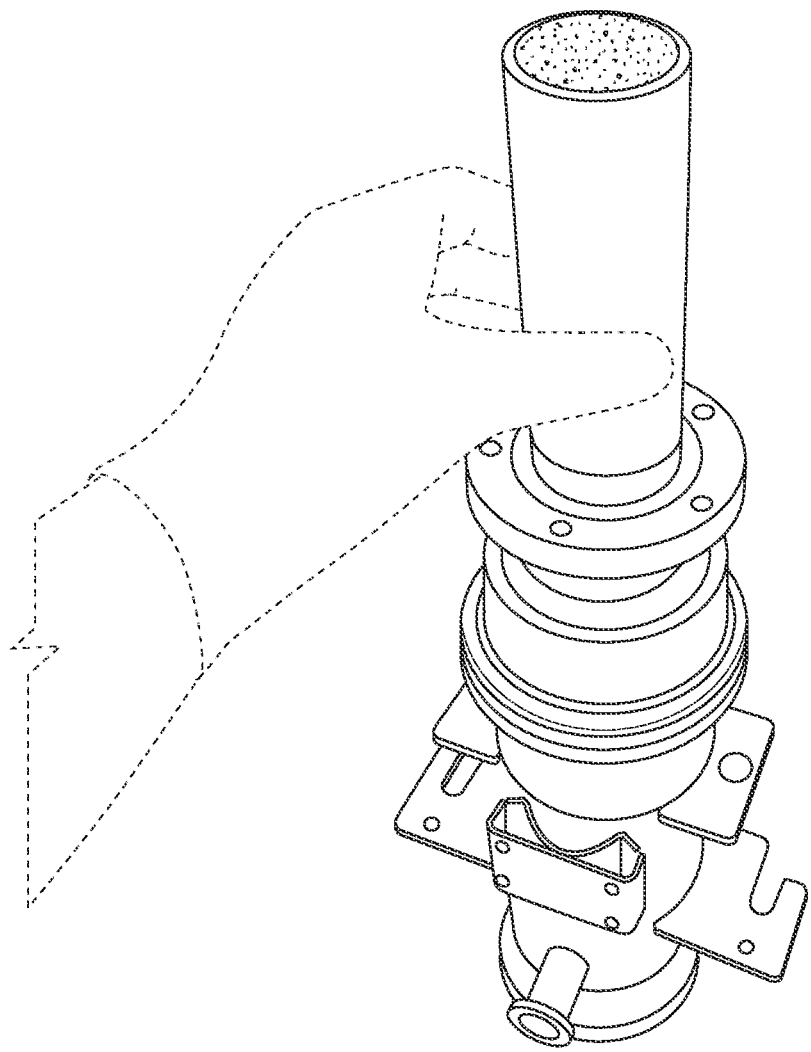
FIG. 5H is an illustration of an eighth step of the process of FIG. 5A.
Figure 5I:
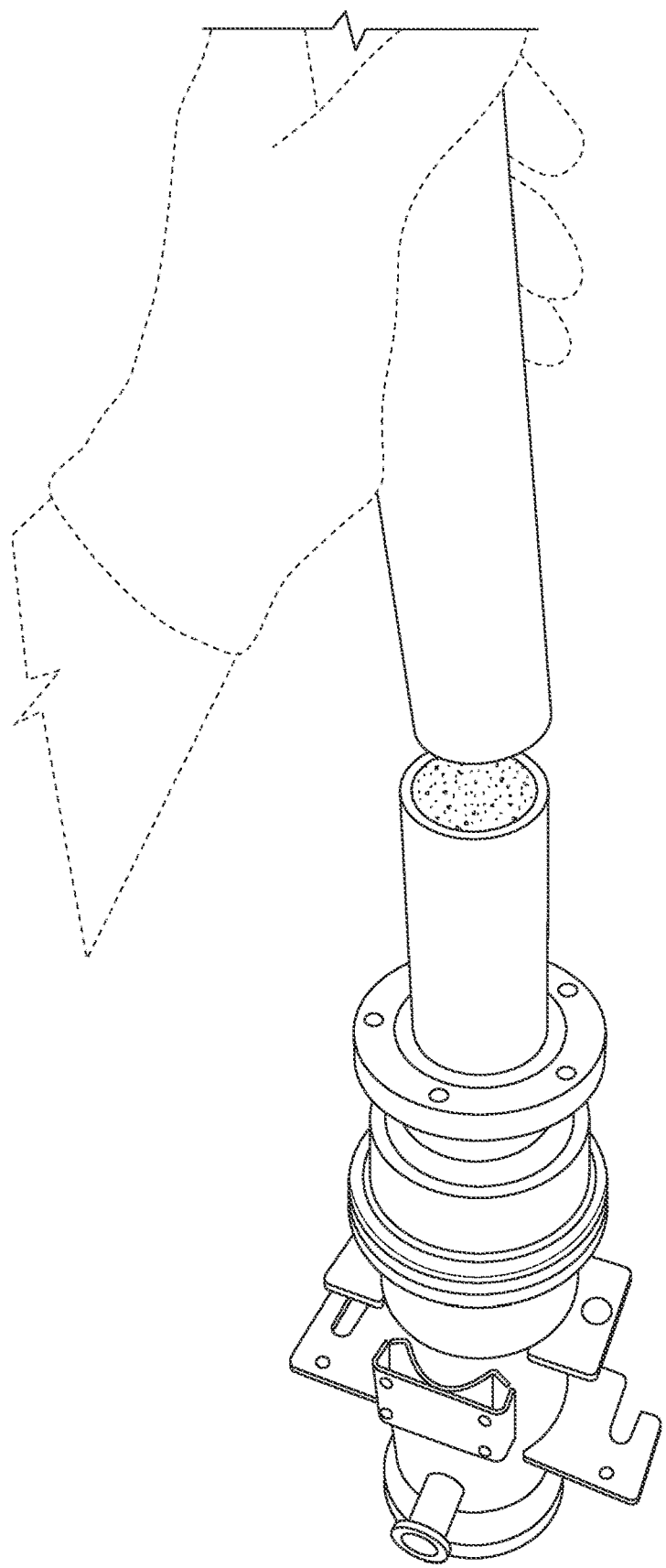
FIG. 5I is an illustration of a ninth step of the process of FIG. 5A.
Figure 5J:
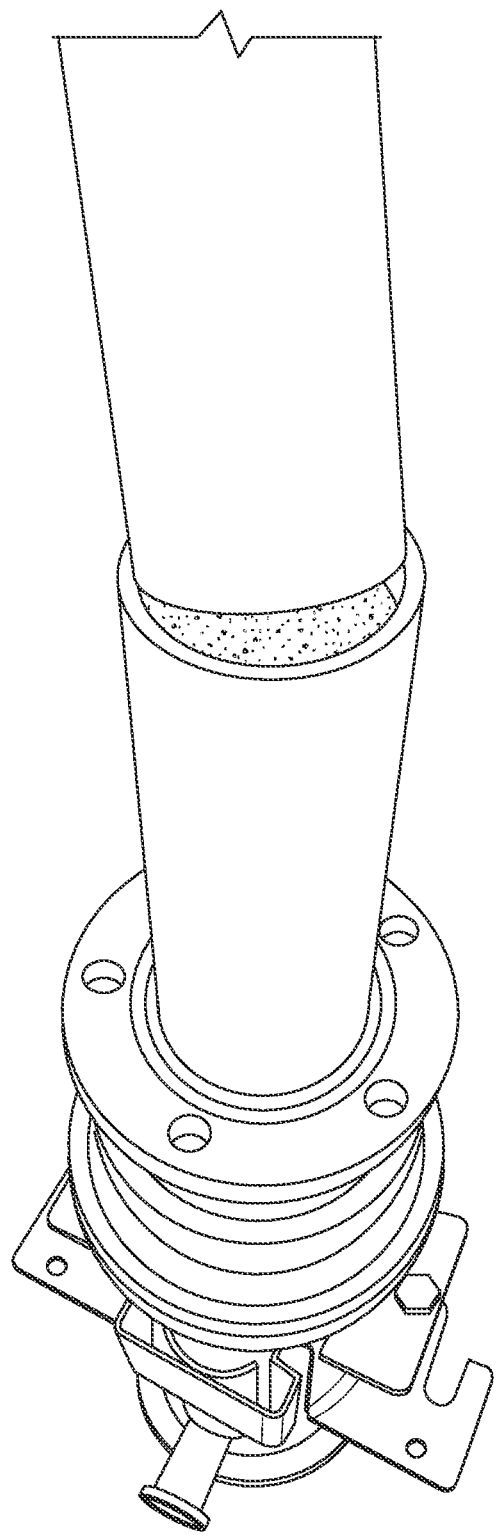
FIG. 5J is an illustration of a tenth step of the process of FIG. 5A.
Figure 5K:
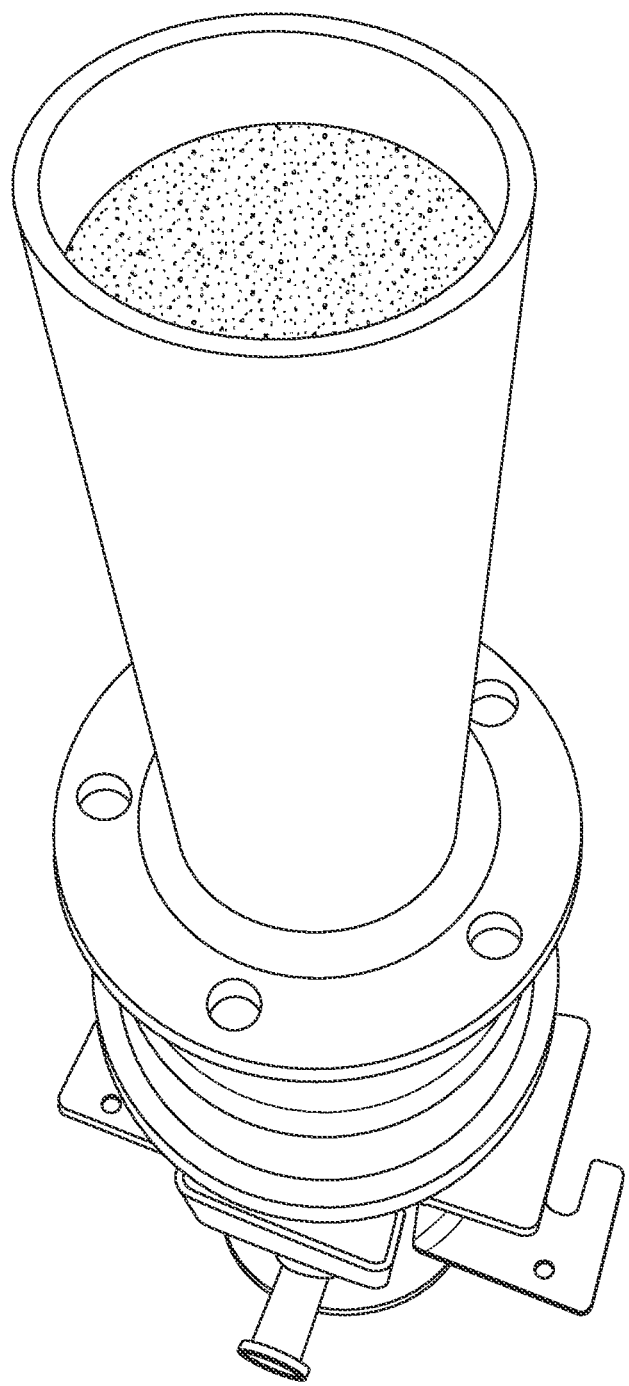
FIG. 5K is an illustration of an eleventh step of the process of FIG. 5A.
Figure 5L:
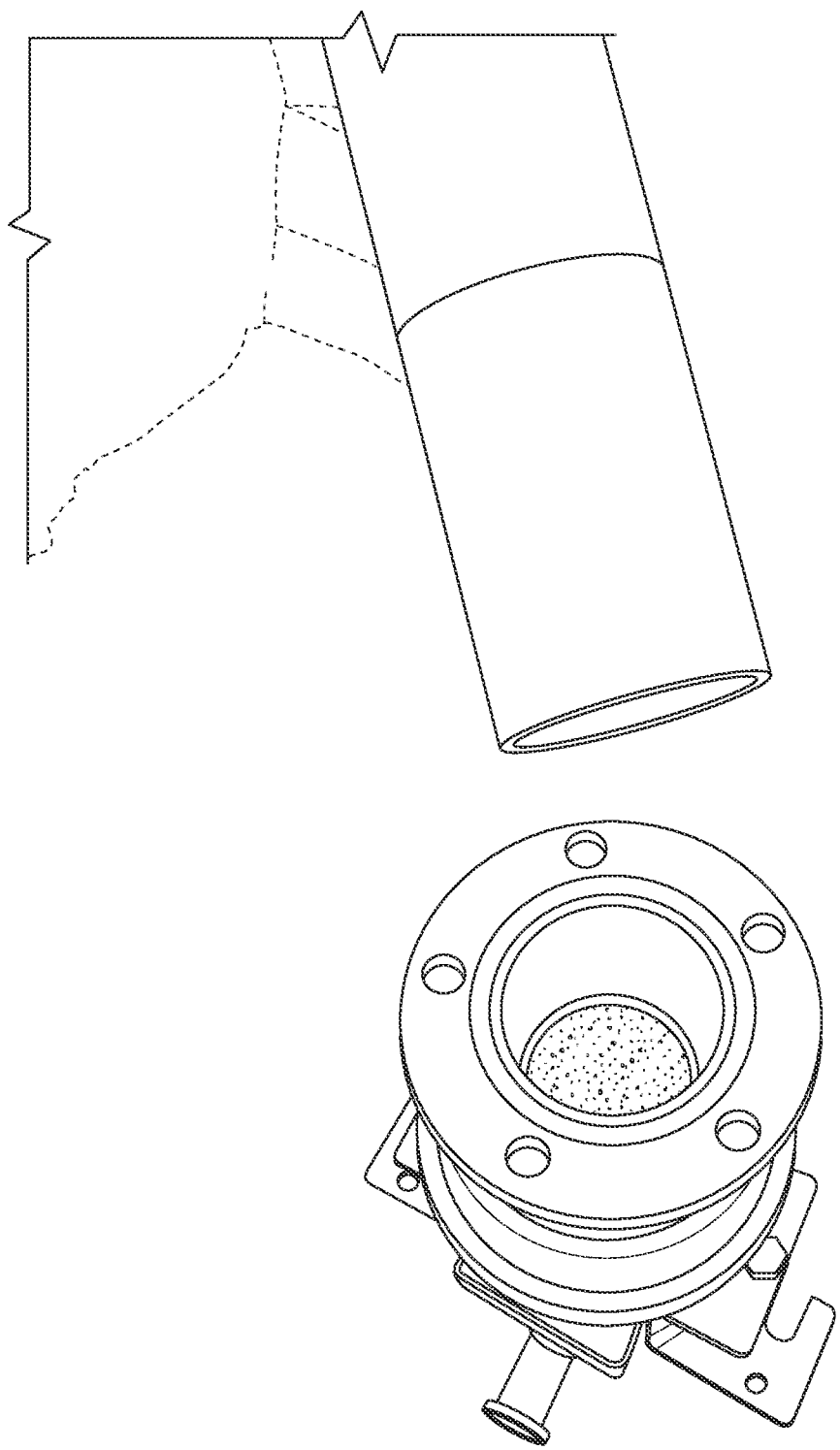
FIG. 5L is an illustration of a twelfth step of a process for dry-forming an axial bed.

Example 5 is directed to a step-by-step description of the dry forming of a small size packed-bed of parallel adsorbent fibers. The bundle of parallel fibers, as shown in FIG. 5A, is shown next to the tube into which it will be inserted. The bundle was first wrapped with a metallic sleeve. The metallic sleeve had a slit so that when it was wrapped around the bundle, the first edge of the sleeve (that was formed by previously slitting the sleeve) slid underneath the second edge of the sleeve. Three hose clamps were then provided around the periphery of the sleeve. The sleeve-outfitted bundle is shown in FIG. 5B. As the hose clamps were tightened, the bundle was radially compressed as the second edge of the sleeve slides further over the first edge of the sleeve and the diameter of the sleeve is decreased. Although optional at this point, the ends of the fibers projecting out of the sleeve-outfitted bundle were then pre-cut, as shown in FIG. 5C, so as to ease the final manufacturing that is performed for providing a planar face at each end of the adsorbent bed. The sleeve-outfitted bundle was then carefully inserted into a metal tube with removal of the hose clamps, while maintaining compression of the bundle within the sleeve, as the sleeve-outfitted bundle advanced inside the tube, as shown in FIG. 5D. After the sleeve-outfitted bundle was placed within the tube, the sleeve was extracted, leaving the bundle radially compressed within the tube. But we note that, before inserting the sleeve-outfitted bundle into the tube, the sleeve edges could have optionally been trimmed and soldered, welded, or glued to provide a permanent radially compressive constraint upon the bundle. This optional technique would allow the clamps to be removed before inserting the bundle into the tube. In any case, the ends of the fibers sticking out of the tube were then cut to provide bundle ends that are flush, as seen in FIG. 5E. As seen in FIGS. 5F-5H, the tube-compressed bundle is placed against the flanged end of the adsorber pressure vessel. As seen in FIGS. 5I-5L, the bundle is plunged from the tube with a PTFE plunger into the pressure vessel of the adsorber and the tube removed.

Example 6

Figure 6:
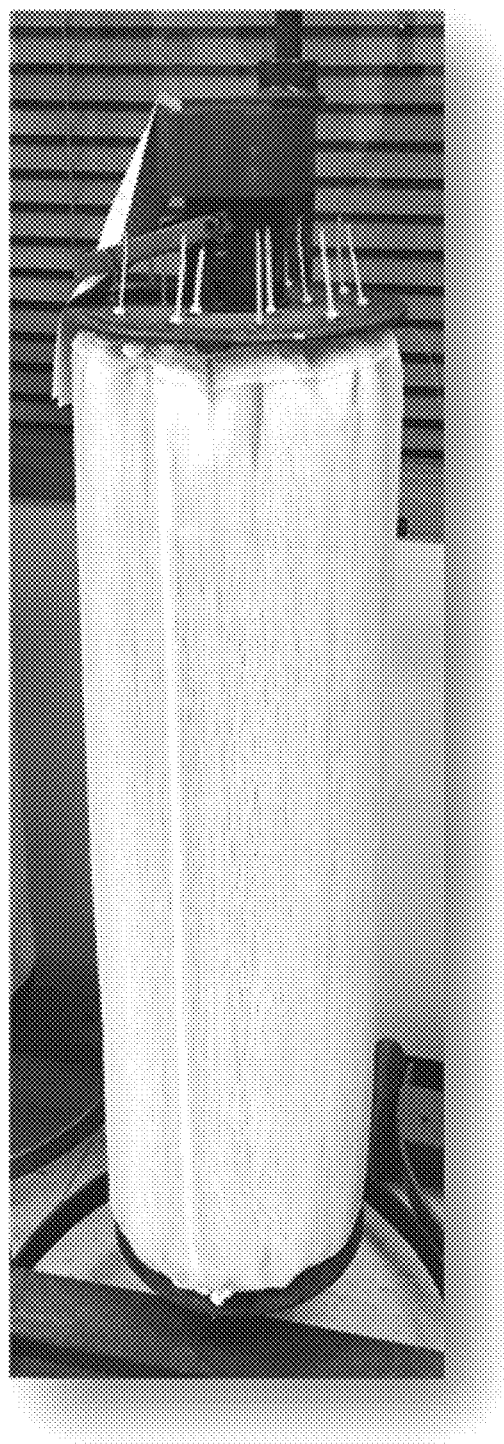
FIG. 6 is a photograph of a collection of several, vertical, uncompressed skeined bundles of fiber for making a large radial bed.

Example 6 is directed to making a large axial bed by assembling several parallel skein bundles. While it is relatively easy to make relatively small beds by placing two or three parallel skein bundles on a flat surface for gathering/aligning into a combined bundle prior to compression, this technique would quickly reach its practical limit for making larger beds (e.g., a larger bed containing 100+ kg of adsorbent), because the bundles would just roll and fall over onto the side of the combined bundle. Therefore, we supported several skeined bundles vertically from a suspension bracket to gather/align them, as seen in FIG. 6, around a center support mesh prior to radially compression of the combined bundle.

Example 7

Figure 7:
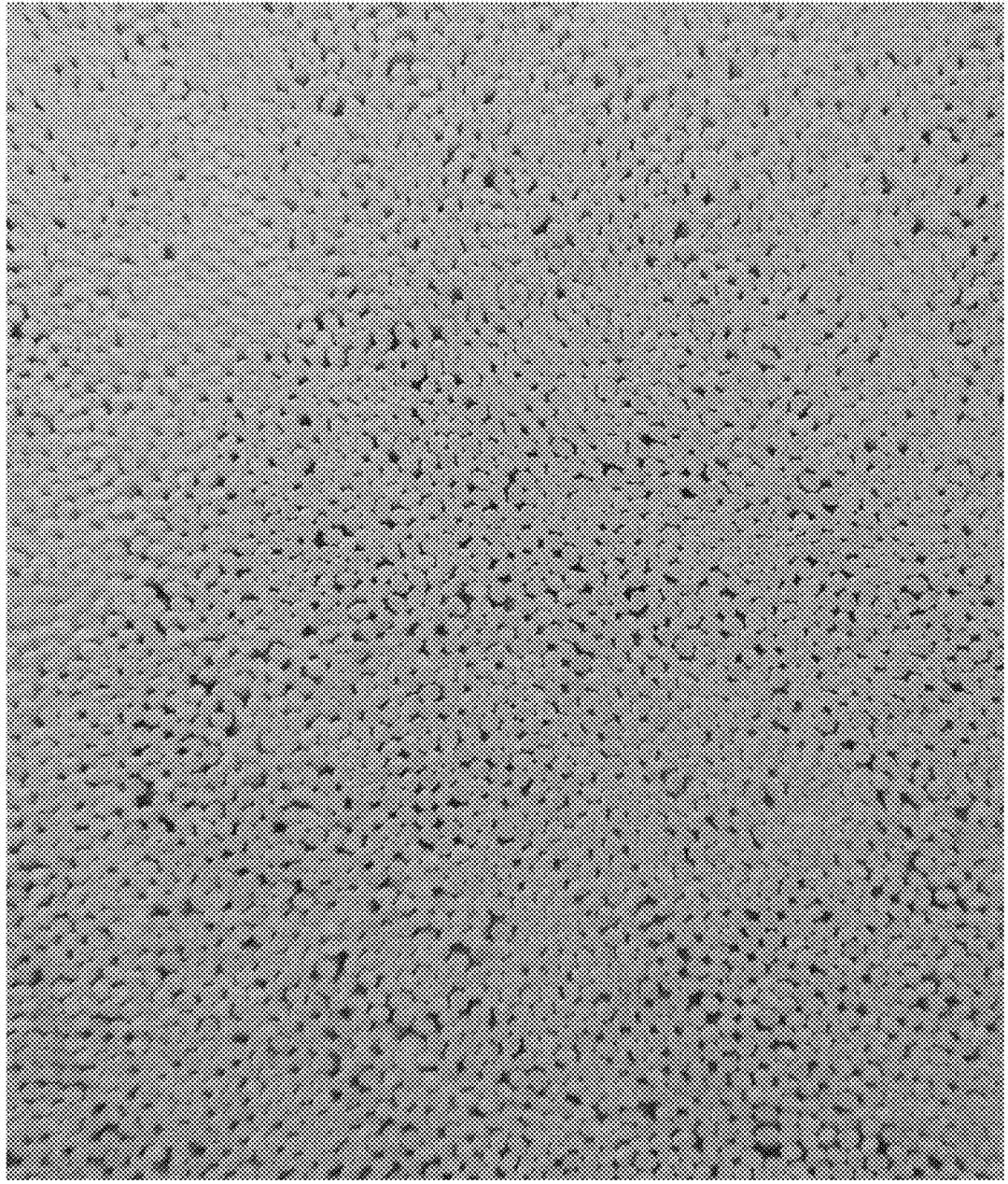
FIG. 7 is a photograph of a face of a packed bed of parallel fibers.

Adsorbent fiber made of 15 wt % DAM-IT and 15 wt % 13X zeolite were formed with a 400 μm OD by diffusion-induced phase separation spinning as described above. After forming a parallel skein bundle, they were radially compressed and placed into a tube of 2" ID. A face of the packed bed is seen in FIG. 7. The bed packing was estimated at 82% by imaging techniques.

Example 8

Example 8 is directed to an analysis of $CO_2$ breakthrough on axial packed beds, having identical dimensions, at different gas velocities. Each bed was subjected to multiple $CO_2$ breakthrough tests at 6 bara. Specifically, a feed gas stream of $N_2$ charged with 450 ppm of $CO_2$ was sent through each bed and the output $CO_2$ concentration was recorded with time. The first bed was made according to the invention, in particular, with parallel adsorbent fibers. The second bed, used as a reference, was made with commercial beads were obtained from a Germany supplier CWK. Each of the parallel adsorbent fibers and the commercial beds used 13X zeolite as the adsorbent. More particularly, the parallel adsorbent fibers were made of 87 wt % of 13X zeolite and 13 wt % of MPD-IT.

Figure 8A:
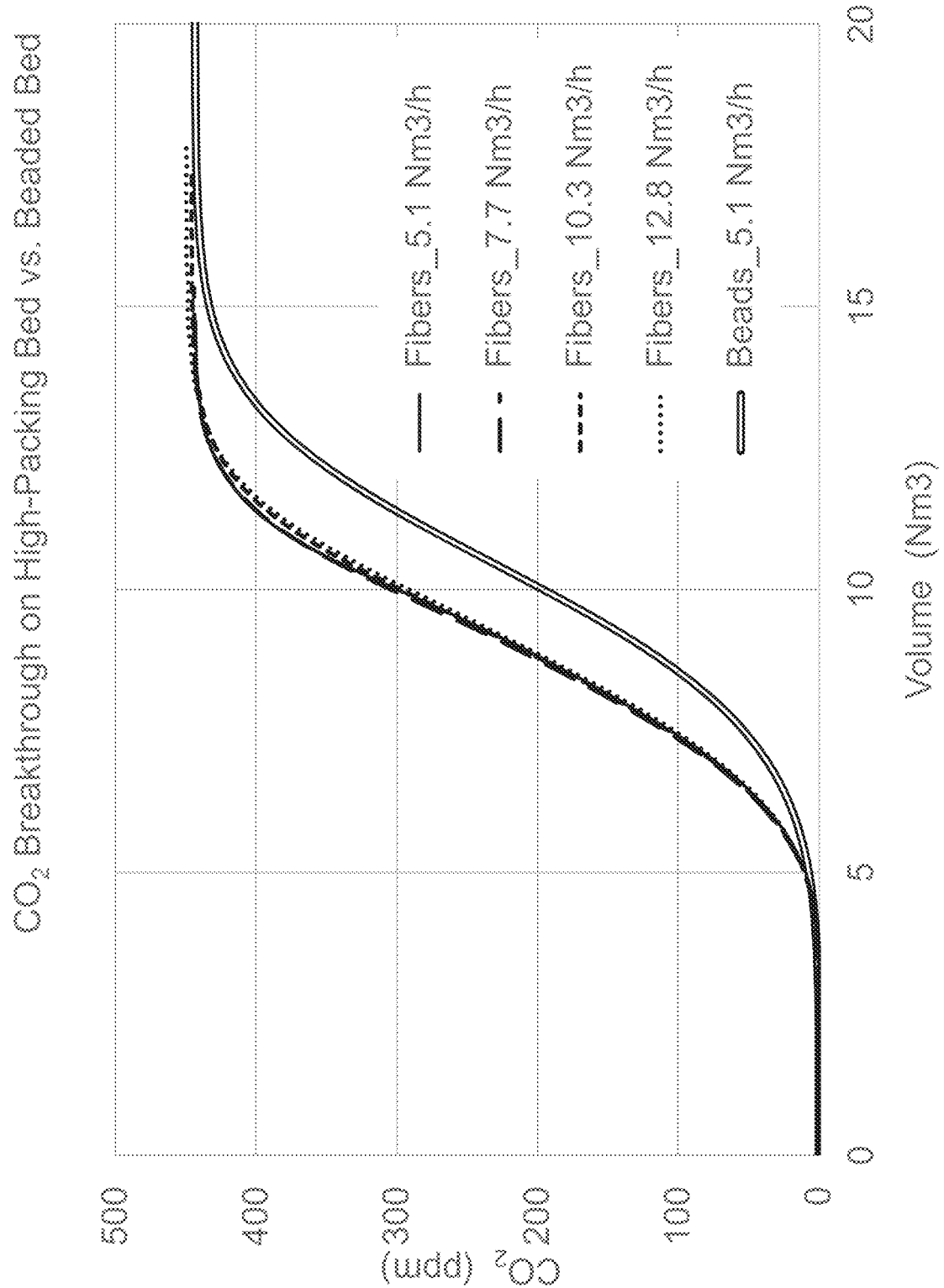
FIG. 8A is a graph of $CO_2$ breakthrough curves generated from a simulated fiber beds at different flow rates and a simulated bed of the commercial beads.
Figure 8B:
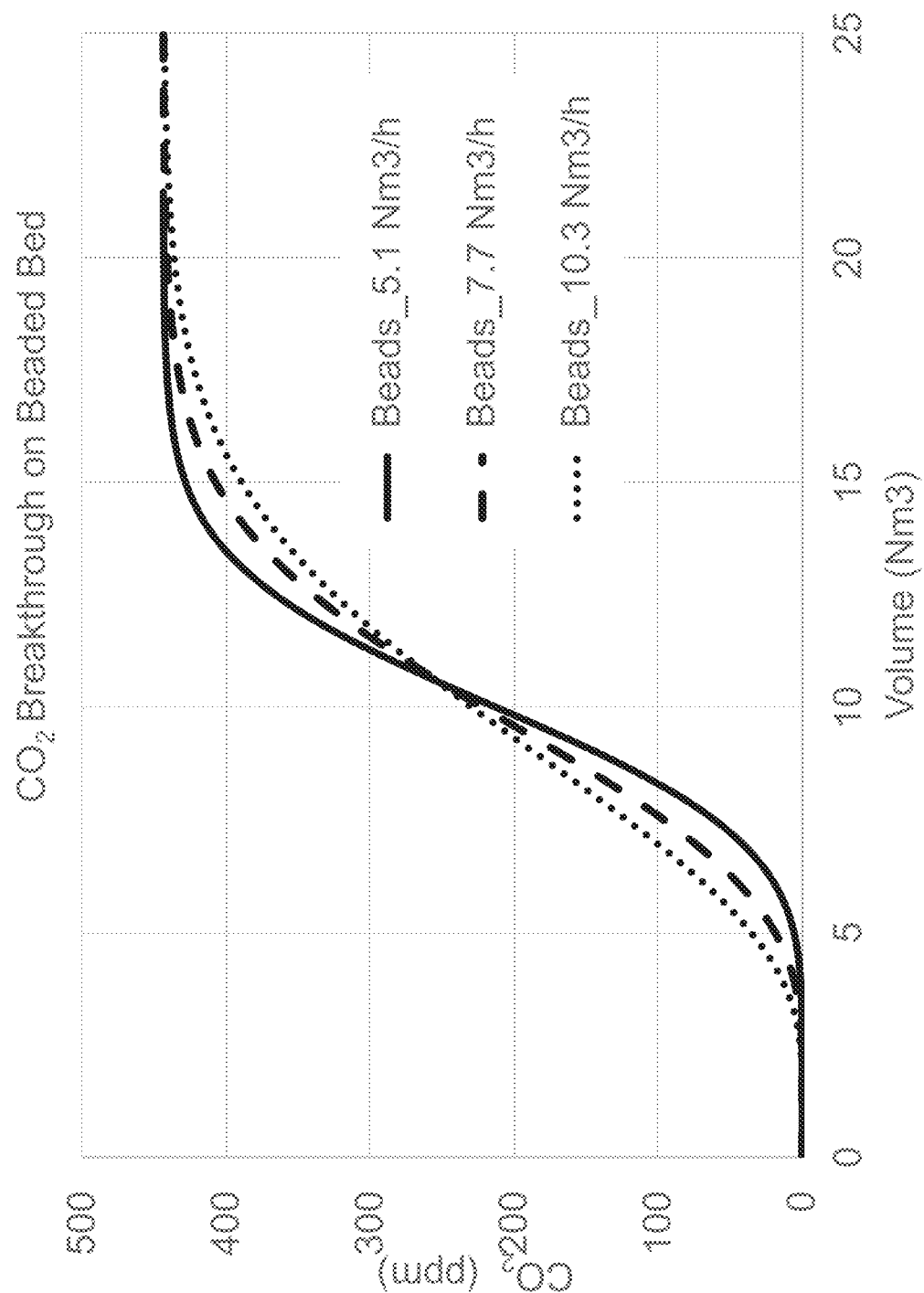
FIG. 8B is a graph of $CO_2$ breakthrough curves generated from a simulated bed of the commercial beads at different flow rates.

FIGS. 8A-8B show the $CO_2$ breakthrough curves generated from the fibrous bed and a bed of the commercial beads. As seen in FIG. 8A, the $CO_2$ breakthrough curves generated from the fibrous bed are not impacted by the flow rate and are superposed on each other. This means that the fibrous bed does not suffer appreciable kinetic limitations with increasing flow rates (i.e., increasing gas velocities), in the range of flow rate tested. In other words, the superior kinetics of the high-packing bed of parallel fibers yields a separation that is governed by thermodynamics, that is by the $CO_2$ capacity reached at equilibrium (i.e. $CO_2$ isotherm).

On the other hand, when a similar series of tests is carried out on a reference beaded bed, FIG. 8B shows that the $CO_2$ breakthrough curves do not superpose and are a function of the flow rate. This means that the separation is controlled/limited by kinetics.

Thus, we have shown that parallel fiber beds can be operated at higher gas velocities (flow rates) without the kinetic penalty that would have been expected from a commercial beaded bed.

Example 9

Example 9 is directed to a high-packing axial bed of parallel fibers for large flowrates in replacement of a conventional radial beaded bed. In this example, an axial flow adsorber made of two high-packing beds of parallel adsorbent fibers (a bottom bed of activated alumina and a top bed of zeolite) is proposed in replacement of a radial flow adsorber.

The radial flow configuration is typically adopted for large flow rates that would otherwise require axial adsorbers with outer diameters greater than 6 meter. For practical reasons as explained hereafter, however, a maximum outer diameter of 6 m is generally considered in order to permanently maintain the compression. One way to increase the flow that can be handled by an axial bed is to increase the bed diameter. A six meter OD is considered the limit for transportation by road while still easily transporting the adsorbent bed by tractor trailer and not requiring rail, airship, or helicopter. If an axial bed requires more than 6 m OD, then designers ordinarily switch to a radial configuration. In a radial configuration, the height of the bed is increased to handle larger flows instead of the diameter.

Additionally, the axial configuration is preferred when possible as it is simpler and cheaper to make and operate, in comparison to radial configuration.

Thus, Example 10 is directed to an adsorbent bed for a large ASU FEP that would ordinarily be implemented with a beaded bed in a radial configuration. To put it altogether, because a properly sized parallel fiber bed made according to the invention generates a lower pressure drop than a similar bed made of conventional beaded adsorbent, the conventional radial adsorber design can be replaced by a tall axial bed.

As a reference, an adsorber for an ASU-FEP with 3 mm OD beads of activated alumina and 2 mm OD beads of zeolite is considered. The smaller and lighter beads of zeolite are used to derive the attrition velocity. Considering a beaded bed density of 680 kg/m$^3$, an attrition velocity of 0.23 m/s is calculated. A margin is then applied to the attrition velocity, for instance to account for the beads size distribution which means that portion of the beads are smaller than the average and consequently lighter. Considering an 80% safety factor for the superficial gas velocity (where 100% constitutes the superficial gas velocity at which smaller beads in a conventional beaded bed would be fluidized thereby causing swelling and dusting of the bed), the conventional beaded bed of zeolite can be operated at 0.18 m/s superficial gas velocity. Regardless of the zeolite layer height and, besides the operating pressure and temperature, the flow rate is then set by the cross-section area of the adsorbent bed. For instance, a 1 m$^2$ section of such a conventional beaded bed will handle a flow rate of 0.18 m$^3$/s or 648 m$^3$/h.

In order to illustrate the benefits brought by high-packing beds of parallel adsorbent fibers, an air flow rate of 160,000 Nm$^3$/h is considered. Normal conditions refers to 101,325 Pa and 0° C. (i.e. 273.15 K). Looking at an adsorber operated at 6 bara and 20° C., the real flow rate can be derived at ~29,000 m$^3$/h. Having set the operating superficial gas velocity at 0.18 m/s or 648 m/h, an axial-flow beaded adsorber would require a cross section of 44.8 m$^2$, corresponding to a bed diameter over 7.5 meter. Such a flow rate would therefore require a radial bed design. Instead, an axial bed made of high-packing parallel adsorbent fibers can be proposed, the characteristics of which are shown in the table of FIG. 9.

Example 10

Figure 10:
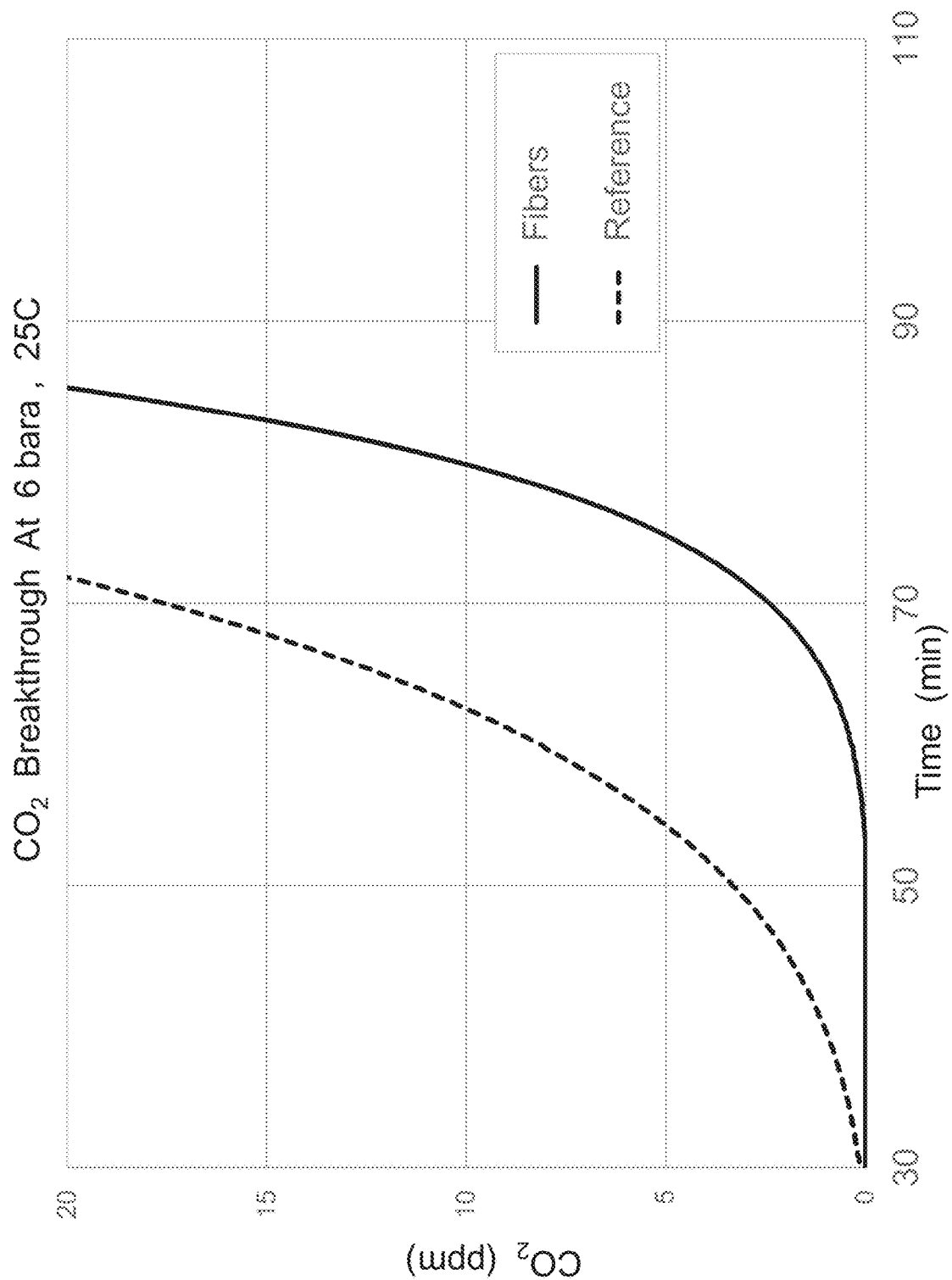
FIG. 10 is a graph of $CO_2$ breakthrough curves generated from simulated beds of axial fiber commercial beads.

Example 11 is directed to an analysis of $CO_2$ breakthrough through a high-packing adsorbent bed of parallel fibers made according to the invention. As an example, a bed of parallel adsorbent fibers was formed using fibers loaded with 81 wt % of 13X. The fibers were first arranged in a skein bundle. The bundle was then compressed radially to reach a packing of 80%. Next, the bundle was inserted into an adsorber vessel and activated under dry nitrogen at 280° C. Finally, a $CO_2$ breakthrough curve was generated out at 6 bara. The bundle was then removed and replaced with a bed of commercial 13X beads. The same $CO_2$ breakthrough test was carried out on the beaded bed after activation. As can be seen in FIG. 10, the parallel fiber bed yield a significantly extended breakthrough time (+34% at 5 ppm of $CO_2$).

Example 11

Figure 11:
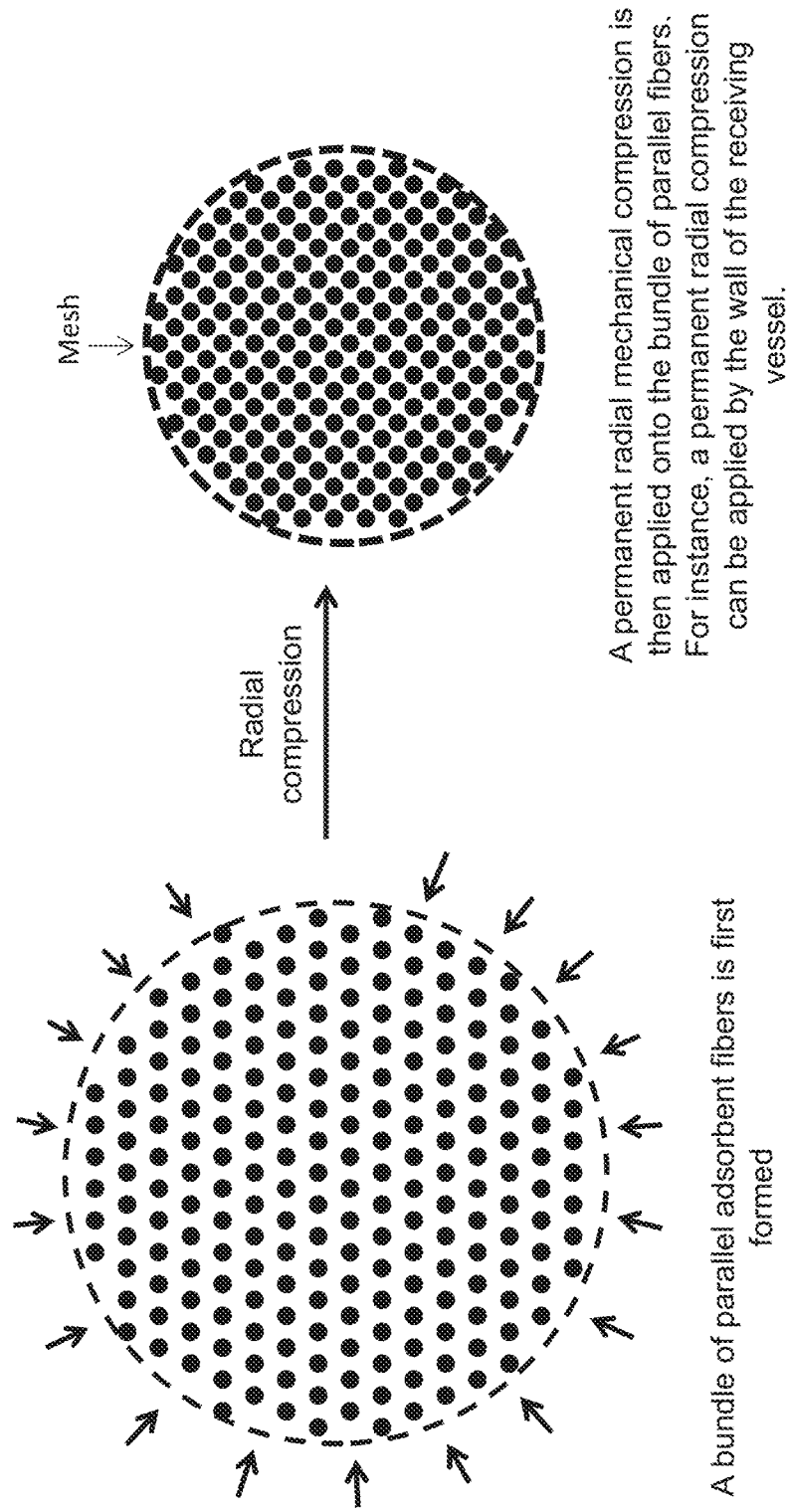
FIG. 11 is a schematic of a process for forming an axial packed-bed of elementary shapes that are immobilized either wet or dry using a permanent mechanical constraint.

Prophetic Example 11 is directed to an axial packed-bed of elementary shapes that are immobilized either wet or dry using a permanent mechanical constraint. As shown in FIG. 11, first a bundle of parallel adsorbent fibers is formed. After radial compression, an outer mesh is applied around the compressed bundle. In this manner, a permanent mechanical constraint maintaining the compression of the bundle and associated bed packing.

Example 12

Figure 12:
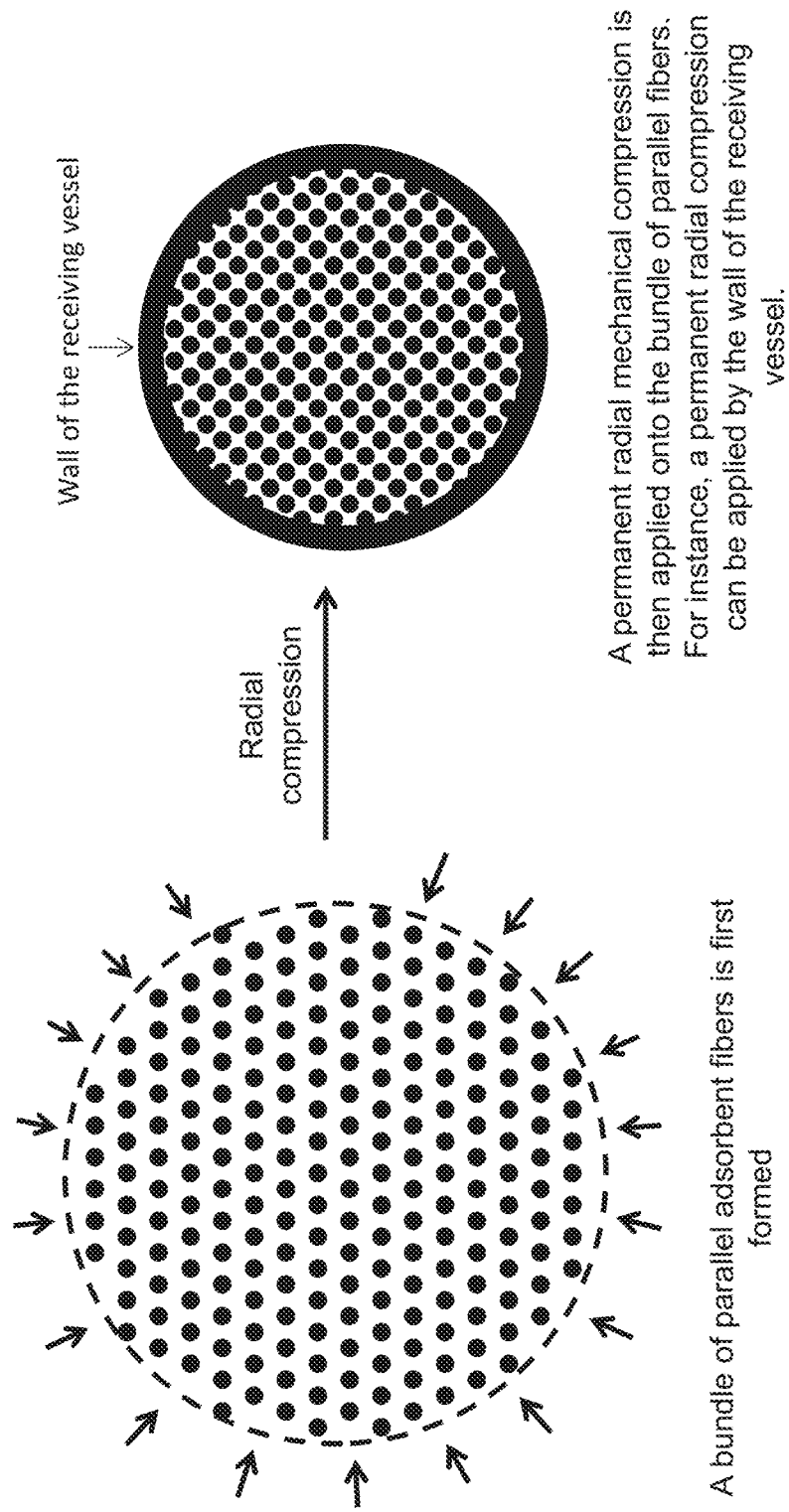
FIG. 12 is a schematic of another process for forming an axial packed-bed of elementary shapes that are immobilized either wet or dry using a permanent mechanical constraint.

Prophetic Example 12 is directed to an axial packed-bed of elementary shapes that are immobilized either wet or dry again using a permanent mechanical constraint. As shown in FIG. 12, first a radial bundle of parallel adsorbent fibers is formed. After radial compression, instead of applying an outer mesh around the compressed bundle, the compressed bundle is placed into the adsorber. In this manner, a permanent mechanical constraint maintaining the compression of the bundle and associated bed packing is provided by the adsorber wall.

Example 13

Figure 13:
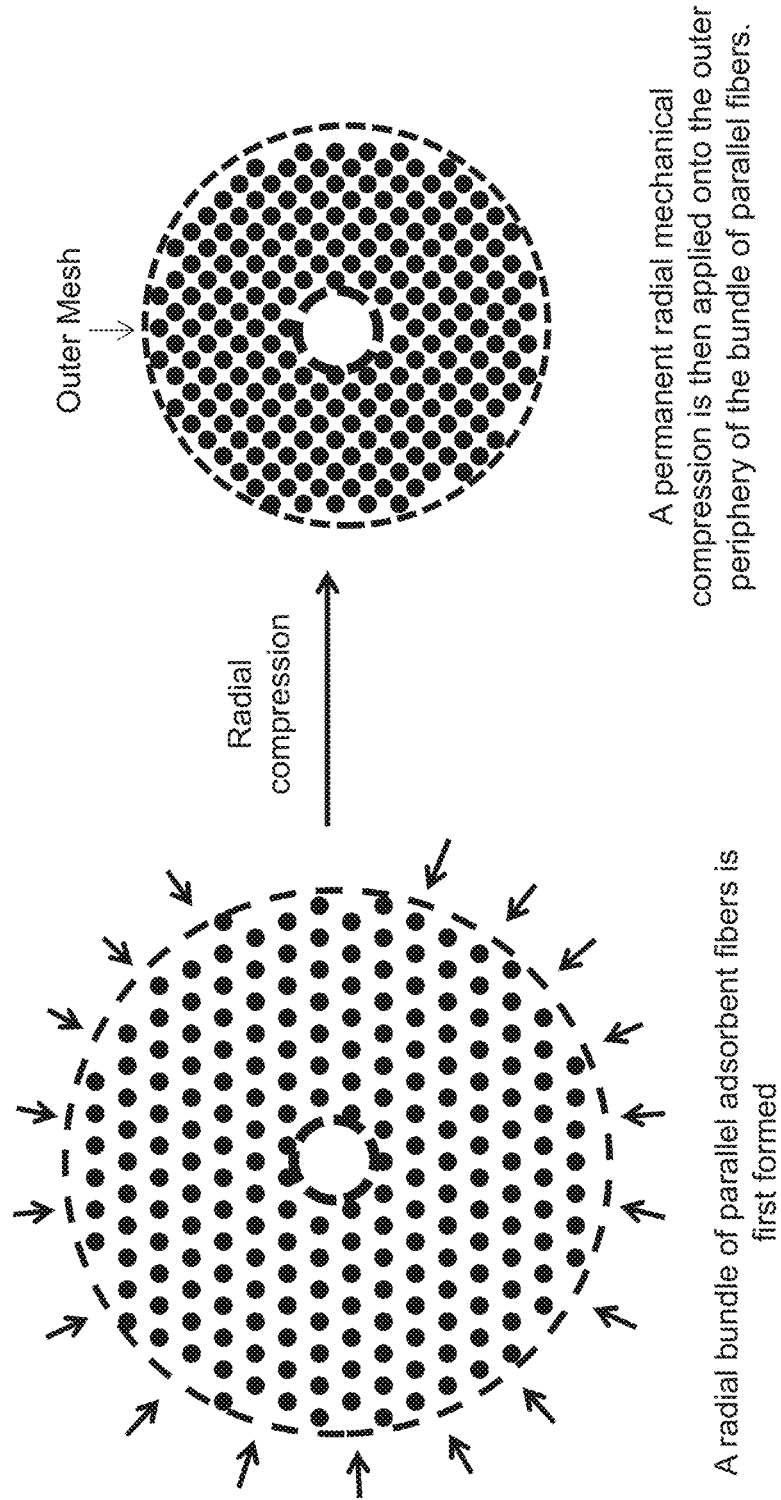
FIG. 13 is a schematic of a process for forming a radial packed-bed of elementary shapes that are immobilized either wet or dry using a permanent mechanical constraint.

Prophetic Example 13 is directed to a radial packed-bed of elementary shapes that are immobilized either wet or dry using a permanent mechanical constraint. As shown in FIG. 13, first a radial bundle of parallel adsorbent fibers is formed. After radial compression, an outer mesh is applied around the compressed bundle. In this manner, a permanent mechanical constraint maintaining the compression of the bundle and associated bed packing.

Example 14

Prophetic Example 14 is directed to a step-by-step description of the wet or dry forming of a small size packed-bed of parallel adsorbent fibers. As seen in FIG. 14A, a bundle of parallel fibers, manufactured as described above, is first wrapped with a metallic sleeve. If wet-forming is desired, the fibers may be pre-wetted as described above before being wrapped by the sleeve or wetted after being wrapped by the sleeve. The sleeve had a slit so that when it was wrapped around the bundle, the first edge of the sleeve (that was formed by previously slitting the sleeve) slid underneath the second edge of the sleeve. A compressive force, such with hose clamps or the like, is then provided to the sleeve-wrapped bundle. As seen in FIG. 14B, the sleeve-wrapped bundle is placed against the end of a receiving tube and the bundle is plunged from the sleeve wrap and into a tube. Because the sleeve has an ID larger than the ID of the tube into which the bundle is plunged, the sleeve remains outside the tube. The sleeve is then withdrawn from the face of the tube, leaving the compressed bundle of parallel fibers in the tube. The tube may be inserted inside the pressure vessel of the adsorber or the tube may itself serve as the pressure vessel of the adsorber.

Example 15

Figure 15A:
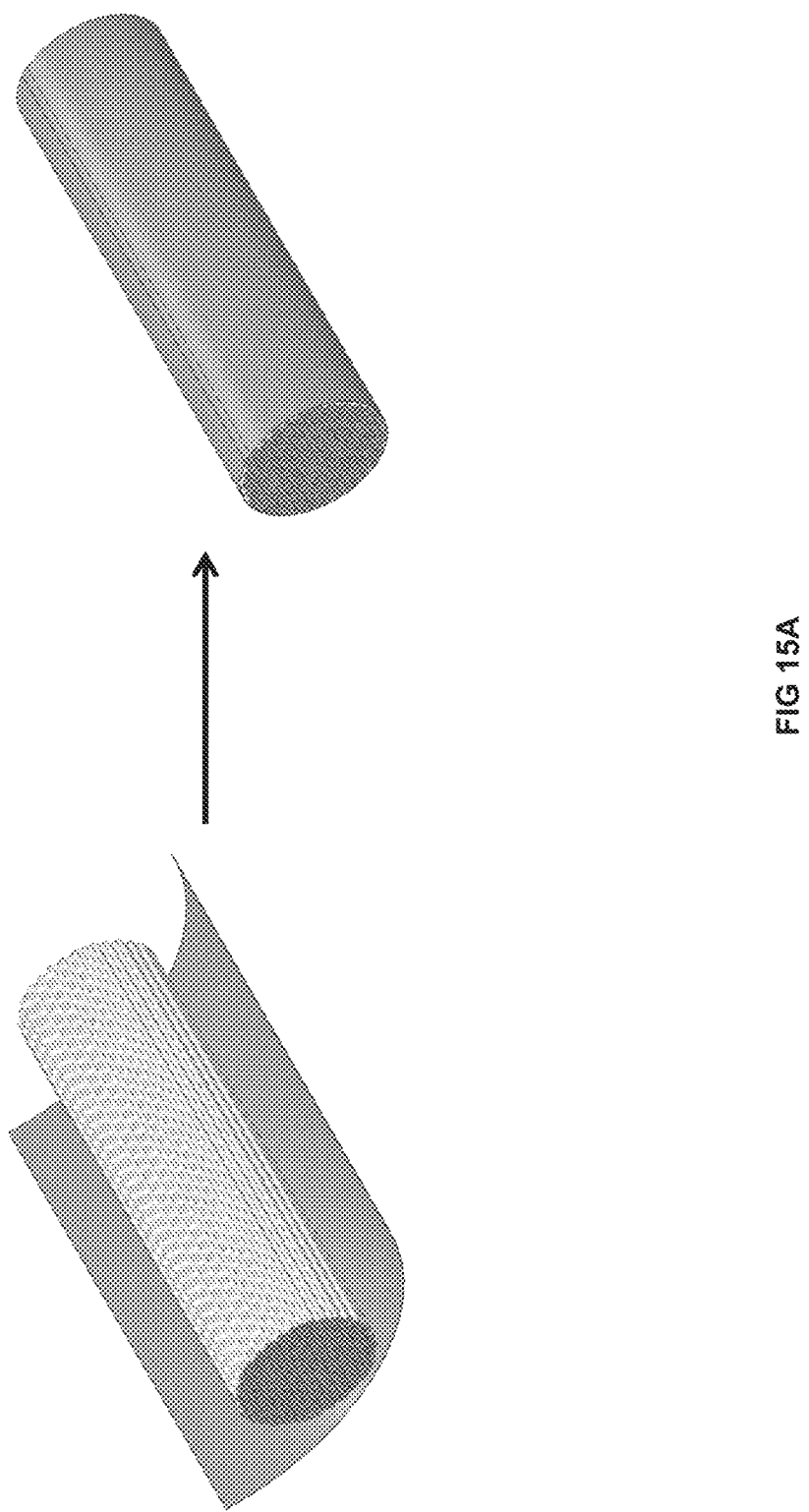
FIG. 15A is a schematic of a first step of a process for wet or dry forming of a small size packed-bed of parallel adsorbent fibers.
Figure 15B:
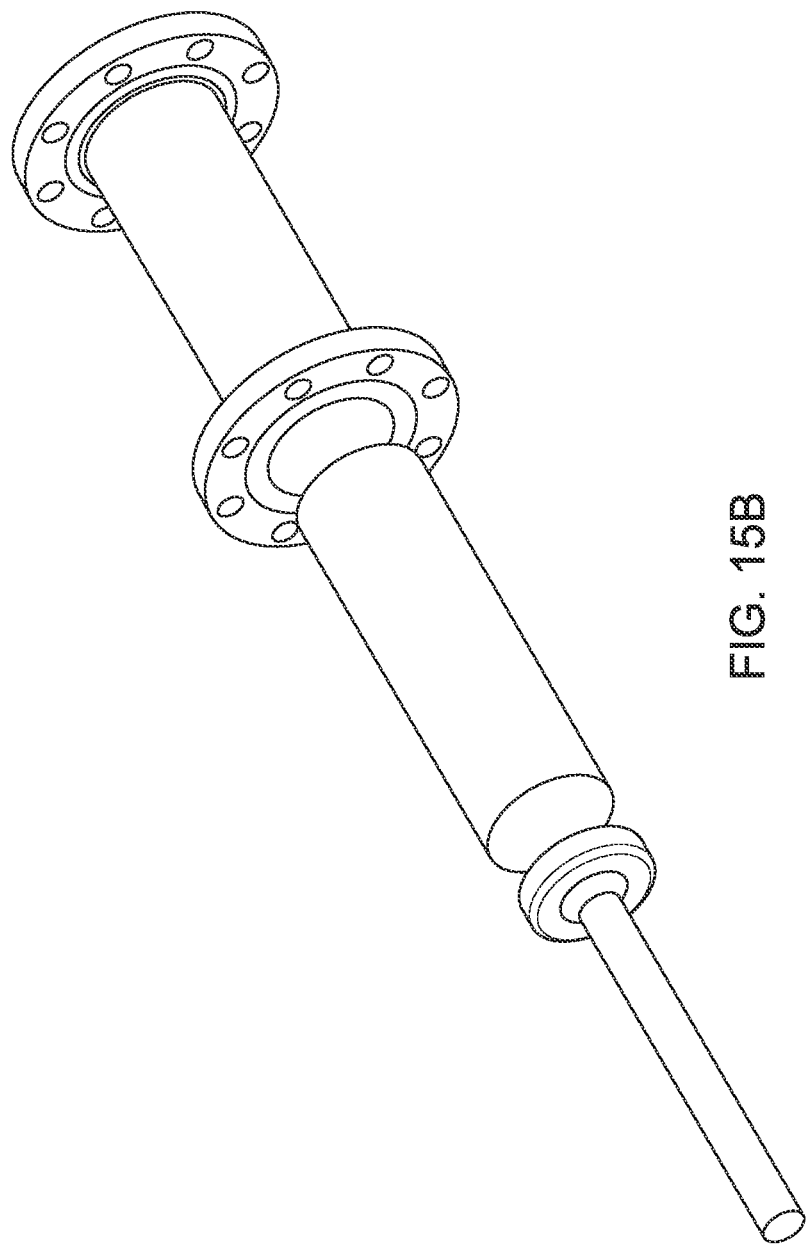
FIG. 15B is an illustration of a second step of the process of FIG. 15A.

Prophetic Example 15 is directed to a step-by-step description of another way of wet or dry forming of a small size packed-bed of parallel adsorbent fibers. As seen in FIG. 15A, a bundle of parallel fibers is first wrapped with a metallic sleeve. If wet-forming is being performed, the fibers may be pre-wetted before being wrapped by the sleeve or wetted after being wrapped by the sleeve. The sleeve had a slit so that when it was wrapped around the bundle, the first edge of the sleeve (that was formed by previously slitting the sleeve) slid underneath the second edge of the sleeve. A compressive force, such with hose clamps or the like, is then provided to the sleeve-wrapped bundle. In contrast to Example 15, the sleeve forms a part of the adsorber pressure vessel. In order to prevent bypass of the gas at the seam of the overlapped shim edges, the edges are first glued, welded, or soldered to seal the overlapping edges of the sleeve. As seen in FIG. 15B, the sleeve-wrapped bundle is placed against the end of a flanged tube constituting the pressure vessel of the adsorber. Because the sleeve OD is smaller than the ID of the tube, the sleeve and bundle may be plunged together into the tube as seen in FIG. 15C. The sleeve is then withdrawn from the face of the tube, leaving the compressed bundle of parallel fibers in the tube. The tube may be inserted inside the pressure vessel of the adsorber or the tube may itself serve as the pressure vessel of the adsorber.

Example 16

Figure 16A:
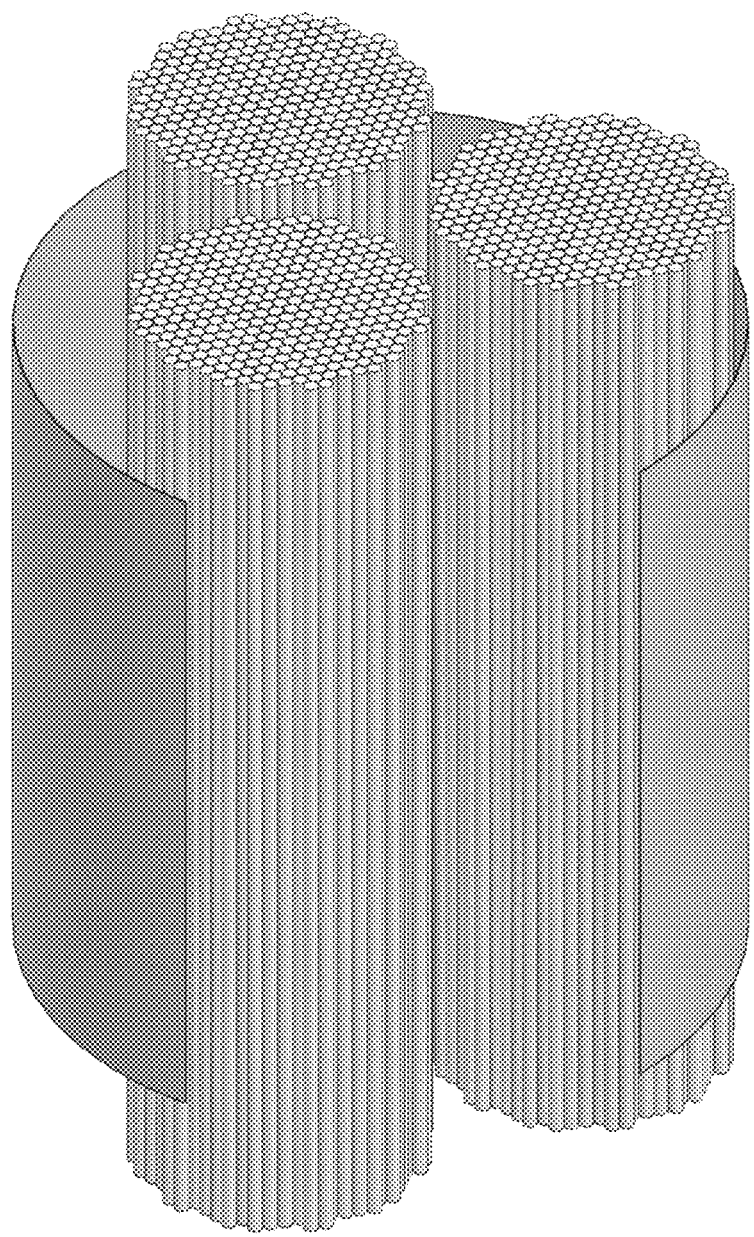
FIG. 16A is a schematic of a first step of a process for wet or dry forming of a large size packed-bed of parallel adsorbent fibers.
Figure 16B:
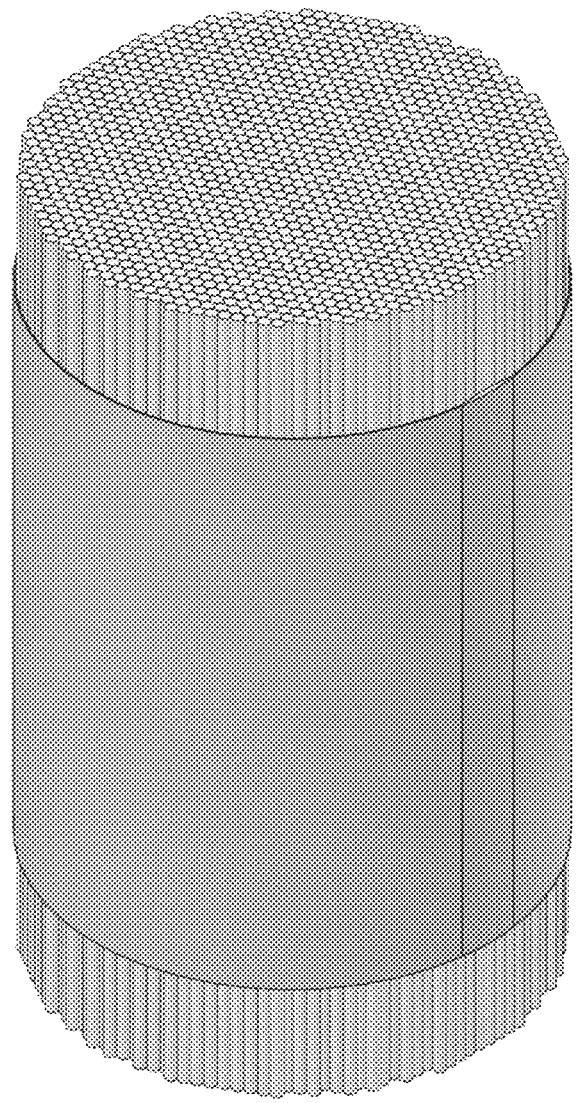
FIG. 16B is a schematic of a second step of the process of FIG. 16A.
Figure 16C:
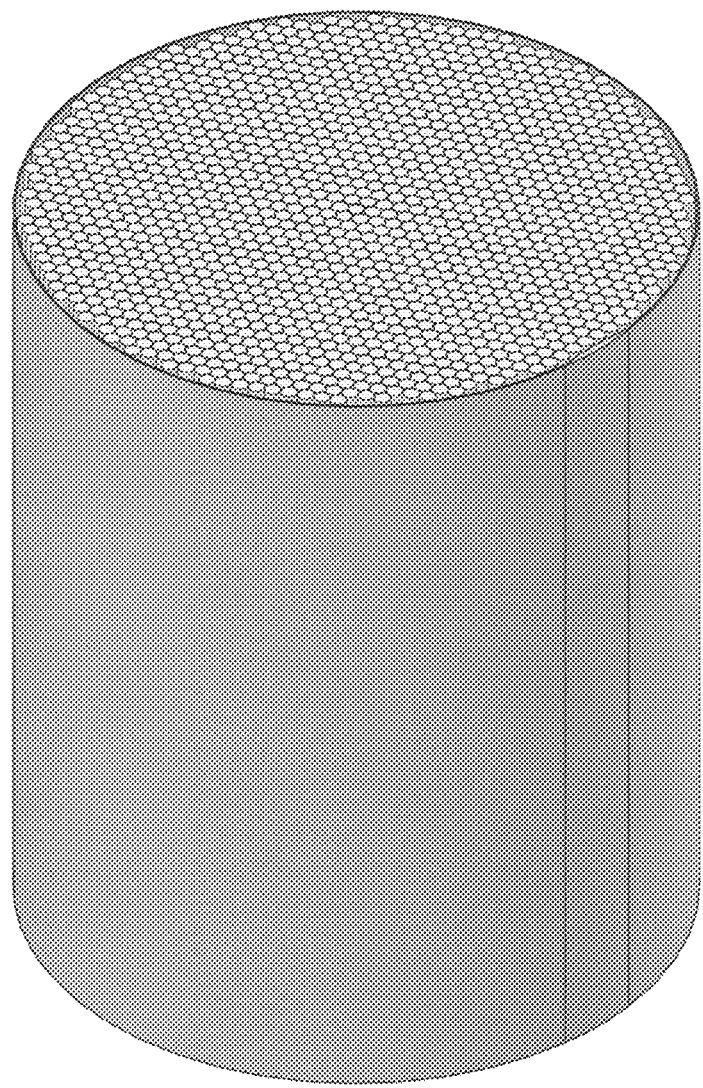
FIG. 16C is a schematic of a third step of the process of FIG. 16A.

Prophetic Example 16 is directed to a step-by-step description of another way of wet or dry forming of a large size packed-bed of parallel adsorbent fibers. As seen in FIG. 16A, three bundle of parallel fibers are first wrapped with a metallic sleeve. If wet-forming is being performed, the fibers may be pre-wetted before being wrapped by the sleeve or wetted after being wrapped by the sleeve. The sleeve had a slit so that when it was wrapped around the bundle, the first edge of the sleeve (that was formed by previously slitting the sleeve) slid underneath the second edge of the sleeve. A compressive force, such with hose clamps or the like, is then provided to the sleeve-wrapped bundles to provide the compressed structure shown in FIG. 16B. Again in contrast to Example 15, the sleeve forms a part of the adsorber pressure vessel. In order to prevent bypass of the gas at the seam of the overlapped shim edges, the edges are first glued, welded, or soldered to seal the overlapping edges of the sleeve. The excess fibers projecting out from the sleeve are then cut to provide flush faces of the compressed bundle as seen in FIG. 16C. The flush-faced compressed bundle is then placed within the flanged tube constituting the pressure vessel of the adsorber as seen in the perspective view of FIG. 17D with portions (i.e., the vessel wall) broken away. For very large beds (e.g., 10 tons), one or multiple rods may be inserted into the bundle, for instance along its axis, prior to the compression in order to facilitate subsequent handling, such as insertion or removal of the bundle into/from the flanged tube.

Example 17

Example 17 is directed to a comparison of the surface morphologies of commercial beads vs adsorbent extrudates made according to the invention.

Figure 17:
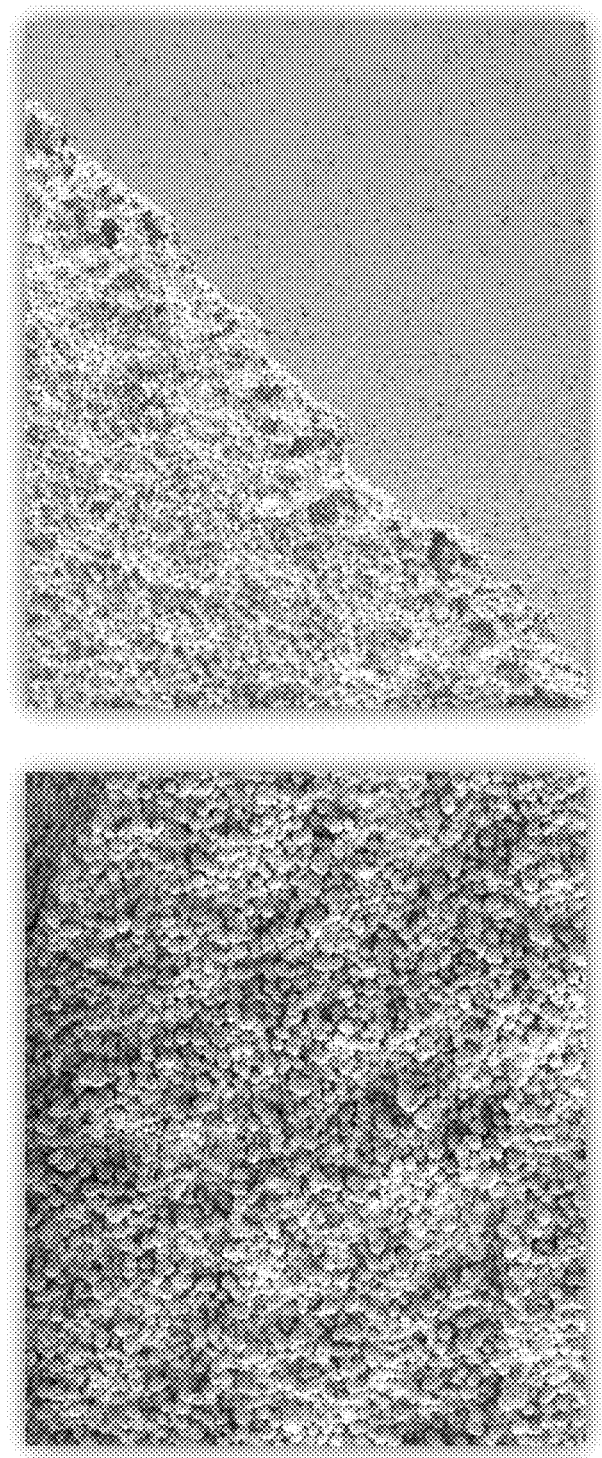
FIG. 17 is a comparison of two SEM microphotographs of cross-sections of the surfaces of a commercial bead and extrudates made according to the invention.

The left-hand side scanning electron microscope (SEM) picture of FIG. 17 shows the morphology of the surface of a commercial bead of 13X, specifically a cross-sectional view obtained by breaking a bead in half. As seen in the left-hand side SEM picture of FIG. 17, the morphology of the bead surface appears identical to the morphology of the bead interior.

The right-hand side SEM picture shows the morphology surface of an extrudate made with the polymeric binder by diffusion induced phase separation as described above. The upper left corner is the interior of the inventive extrudate while the lower right corner is the skin formed on the surface of the extrudate. The morphology of the extrudate interior appears similar to that of the bead interior and surface. On the other hand, the morphology of the extrudate skin is characterized by a thin, densified layer of polymeric binder that does not contain adsorbent particles. Such a thin, densified layer observed in the extrudates corresponds well to the skin of hollow fiber membranes made of polymeric binder without adsorbent particles through diffusion induced phase separation.

The comparison of these 2 pictures explain why we do not observe dusting of beads, extrudates, or fibers made with polymeric binder using diffusion induced phase separation as described above. Because adsorbent particles are present at the surface of conventional beads, dusting can occur when beads are fluidized during an adsorption process. In contrast, the thin densified skin of the extrudates protects the adsorbent particles and thus prevents dusting during the adsorption process.

Example 18

Prophetic Example 18 is directed to a comparison of the pressure drop across an axial bed of conventional beaded adsorbent versus an axial bed of parallel fibers made according to the invention.

Pressure drops for the conventional case were estimated with an Ergun equation-based model derived from measurements of pressure drop on a wide range of bead shapes. The pressure drops across the fiber beds were estimated from our experimentally derived model using an Ergun-like equation using the same method as done for beads, but in this case on parallel fibers of known packing and fiber diameter.

Figure 18:
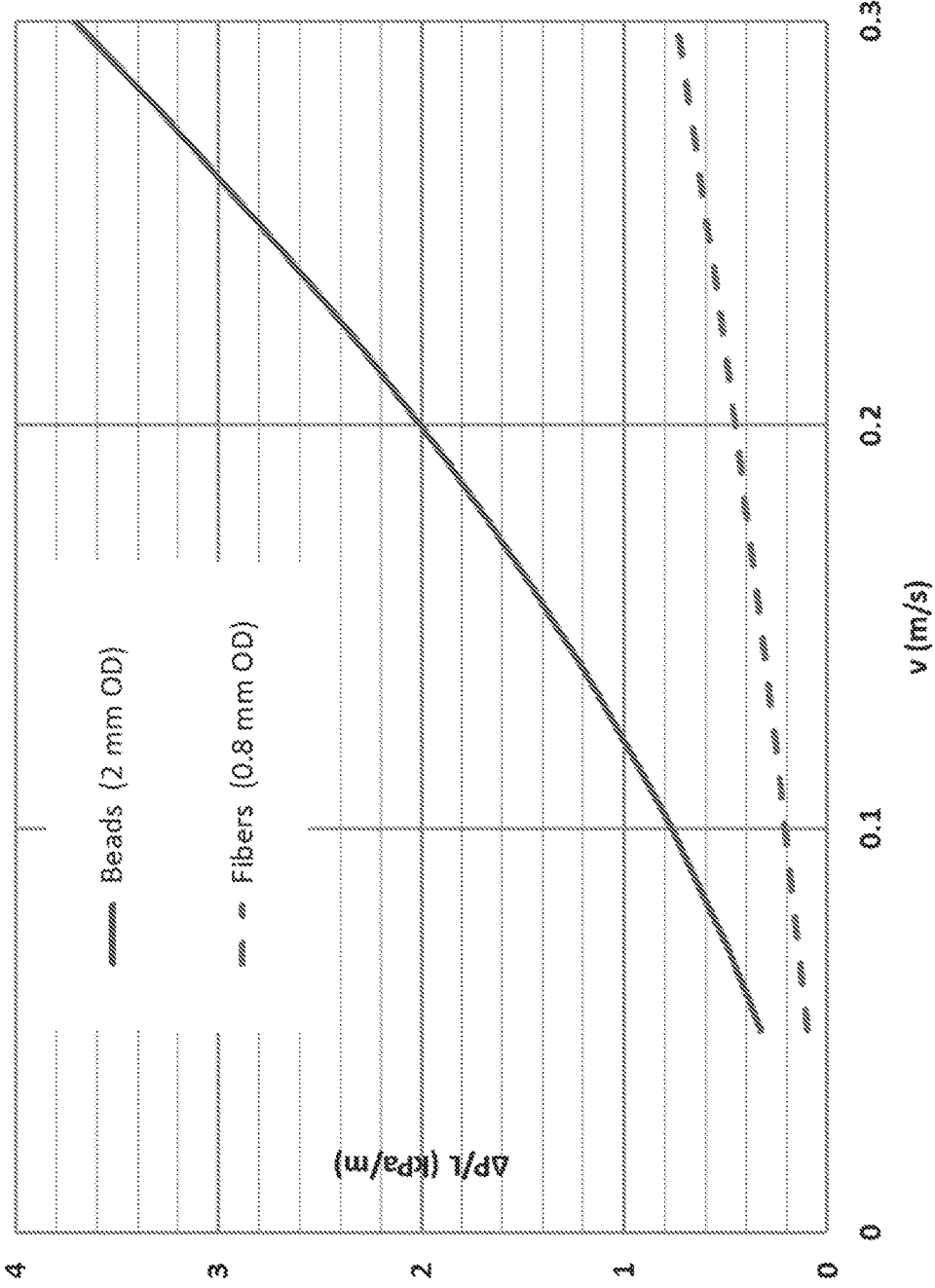
FIG. 18 is a graph of the pressure drop across a simulated axial bed of conventional beaded adsorbent versus a simulated axial bed of parallel fibers made according to the invention.

Estimations of pressure drops exhibited by the inventive bed of parallel fibers assumed a bed packing of 75%, whereas the same assumption for the conventional beaded bed was only 63%. As seen in FIG. 18, the pressure drop across the axial bed of conventional beaded bed has a steeper and more logarithmic rise as the gas velocity is increased. In contrast, the pressure drop along the length of the axial bed of parallel fibers made according to the invention has a less steep and more linear rise. At a typical operational gas velocity of 0.2 m/s, the pressure drop over the bed of parallel fibers is only 22% of the pressure drop exhibited across the conventional beaded bed, despite the fact the parallel fiber bed has a significantly higher bed packing.

Example 19: Fiber OD vs. Bed Porosity

For an equivalent reference bed pressure drop per unit of length, prophetic Example 19 is directed to the evolution of the parallel fiber diameter as a function of the bed porosity (void fraction) for parallel fibrous beds (solid line) and the evolution of the bead diameter (the bead diameter here being the diameter of spherical beads, or in the case of non-spherical beads, the equivalent spherical diameter) for the conventional beaded bed.

In the case of beaded beds, the maximum bed packing is fixed by the particulate size distribution—a 37% void fraction in the example above. This is because random close packing of spheres yields a minimum size void fraction of 37%.

In the case of parallel fiber beds, the maximum theoretical bed packing yields a void fraction of only about 9%.

Figure 19:
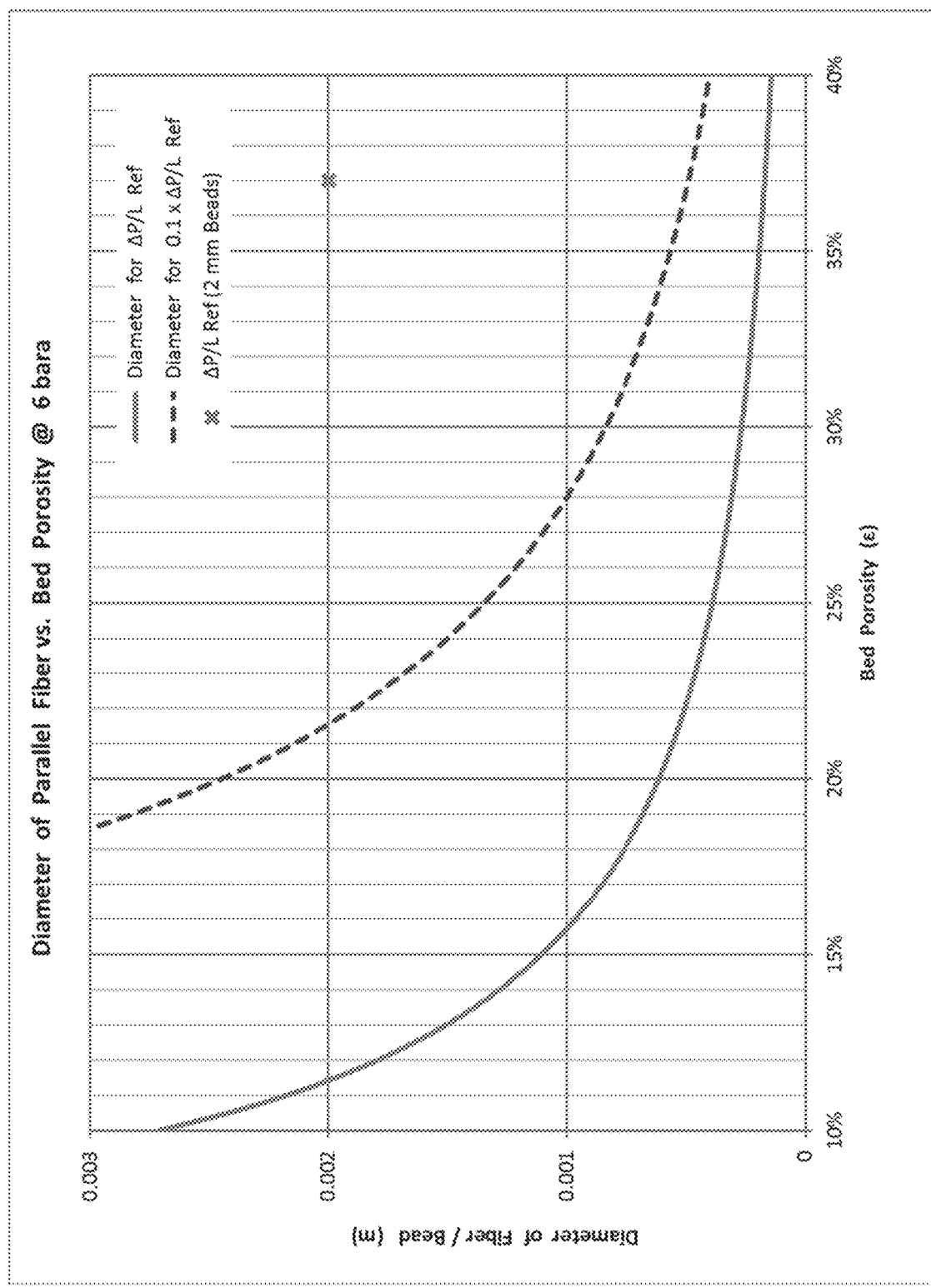
FIG. 19 is a graph of structured adsorbent diameter against bed porosity for simulated beds of commercial beads and parallel fibers made according to the invention.

As seen in FIG. 19, the dashed line shows the variation of the parallel fiber diameter as a function of the bed porosity for a pressure drop of 1/10th of the reference bed pressure drop per unit of length defined previously. As an example, for a similar adsorbent material diameter of 2 mm, parallel fibrous beds can reach a higher packing than beaded beds (21.5% void fraction versus 37% void fraction for beaded system) while dividing by 10 the pressure drop across the bed. Thus, a core benefit of a parallel fiber bed made according to the invention is the possibility to pack additional adsorbent material per unit volume of bed.

Example 20

Prophetic Example 201 is directed to wet forming of a radial bed using an adsorbent fabric. An adsorbent fabric is prepared and rolled wet around a central mesh-support. The fabric is woven from adsorbent fibers produced according to the invention (including both the warp and the weft fibers). The radial bundle of fabric is then compressed wet on the outer periphery in order to increase the packing and therefore the pressure drop. A mesh is placed on the outer diameter in order to permanently maintain the compression. During the radial compression process, the outer diameter of the radial packed-bed of adsorbent fabrics is reduced from initial non-packed bed, resulting in higher packing and higher pressure drop.

Example 21

Prophetic Example 21 is directed to a comparison of pressure drops resulting from different flow rates that are simulated from a parallel fiber adsorbent bed, made according to the invention, versus a conventional beaded bed. More particularly, it is a comparison of a commercial design of an ASU FEP (with a nominal capacity of 350 tons of $O_2$/day) to a fictitious design that would leverage the use of a bed of parallel fibers.

Pressure drops in the commercial case are estimated with an Ergun equation-based model derived from measurements of pressure drop on a wide range of bead shapes. The pressure drops across the fibrous beds are estimated from our experimentally derived model using an Ergun-like equation using the same method as done for beads, but in this case on parallel fibers of known packing and fiber diameter. The estimations are based upon the assumptions listed below in Tables 6-8.

TABLE 6

Assumptions for simulation of beaded axial bed

| Operating Parameters | | |
|---|---|---|
| Pressure | (bara) | 5.7 |
| Temperature | (° C.) | 37 |
| Flow Rate | (Nm3/h) | 49,295 |
| Flow Rate | (m3/h) | 9,950 |
| O2 Input | (t/d) | 353 |
| Adsorbent Vessel Specifics | | |
| Diameter | (m) | 4.92 |
| Section | (m2) | 19.0 |
| Adsorbent Height | (m) | 2.804 |

TABLE 6-continued

Assumptions for simulation of beaded axial bed

| Activated Alumina Beads | | |
|---|---|---|
| Beads Diameter | (m) | 0.003 |
| Layer Height | (m) | 1.324 |
| Volume | (m3) | 25.134 |
| Density | (kg/m3) | 770 |
| Mass | (kg) | 19,353 |
| 13X Beads | | |
| Beads Diameter | (m) | 0.002 |
| Layer Height | (m) | 1.480 |
| Volume | (m3) | 28.091 |
| Density | (kg/m3) | 720 |
| Mass | (kg) | 20,226 |
| Total Vol of Ads | (m3) | 53.225 |
| Total Mass Ads | (kg) | 39,579 |
| Superficial Velocity | (m/s) | 0.15 |
| Bed Porosity | | 0.375 |
| Pressure Drop | | |
| ΔP_AA | (mbar) | 17 |
| ΔP_13X | (mbar) | 33 |
| Total ΔP (AA + 13X) | (mbar) | 50 |

TABLE 7

Assumptions for simulation of first fiber bed

| Operating Parameters | | |
|---|---|---|
| Pressure | (bara) | 5.7 |
| Temperature | (° C.) | 37 |
| Flow Rate | (Nm3/h) | 49,295 |
| Flow Rate | (m3/h) | 9,950 |
| O2 Input | (t/d) | 353 |
| Adsorbent Vessel Specifics | | |
| Diameter | (m) | 4.92 |
| Section | (m2) | 19.0 |
| Adsorbent Height | (m) | 2.804 |
| Activated Alumina Fibers | | |
| Fibers Diameter | (m) | 0.0012 |
| Layer Height | (m) | 1.324 |
| Volume | (m3) | 25.132 |
| Density | (kg/m3) | 770 |
| Mass | (kg) | 19,352 |
| 13X Fibers | | |
| Fibers Diameter | (m) | 0.00075 |
| Layer Height | (m) | 1.480 |
| Volume | (m3) | 28.093 |
| Density | (kg/m3) | 720 |
| Mass | (kg) | 20,227 |
| Total Vol of Ads | (m3) | 53.225 |
| Total Mass Ads | (kg) | 39,579 |
| Superficial Velocity | (m/s) | 0.15 |
| Bed Porosity | | 0.250 |
| Pressure Drop | | |
| ΔP_AA | (mbar) | 6 |
| ΔP_13X | (mbar) | 16 |
| Total ΔP (AA + 13X) | (mbar) | 22 |

TABLE 8

Assumptions for simulation of second fiber bed

| Operating Parameters | | |
|---|---|---|
| Pressure | (bara) | 5.7 |
| Temperature | (° C.) | 37 |
| Flow Rate | (Nm3/h) | 98,590 |
| Flow Rate | (m3/h) | 19,900 |
| O2 Input | (t/d) | 706 |
| Adsorbent Vessel Specifics | | |
| Diameter | (m) | 4.92 |
| Section | (m2) | 19.0 |
| Adsorbent Height | (m) | 2.804 |
| Activated Alumina Fibers | | |
| Fibers Diameter | (m) | 0.0012 |
| Layer Height | (m) | 1.324 |
| Volume | (m3) | 25.132 |
| Density | (kg/m3) | 770 |
| Mass | (kg) | 19,352 |
| 13X Fibers | | |
| Fibers Diameter | (m) | 0.00075 |
| Layer Height | (m) | 1.480 |
| Volume | (m3) | 28.093 |
| Density | (kg/m3) | 720 |
| Mass | (kg) | 20,227 |
| Total Vol of Ads | (m3) | 53.225 |
| Total Mass Ads | (kg) | 39,579 |
| Superficial Velocity | (m/s) | 0.29 |
| Bed Porosity | | 0.250 |
| Pressure Drop | | |
| ΔP_AA | (mbar) | 14 |
| ΔP_13X | (mbar) | 36 |
| Total ΔP (AA + 13X) | (mbar) | 50 |

Each adsorber is identical in dimensions/volume (calculated as the hydraulic cross-section of the bed multiplied by the height of the bed). Each adsorber includes two adsorbent layers. Specifically, considering an upwards flow, a first bottom layer of activated alumina mainly stops water while a second top layer of zeolite adsorbs other species, such as $CO_2$, that would otherwise condensate in the downstream cryogenic part of the air separation plant.

The first parallel fiber bed case, listed in Table 5, shows that, in comparison to the commercial case, the pressure drop associated with the first parallel fiber bed can be decreased by more than 50% by selecting appropriate ID for the fibers.

The second parallel fiber bed, listed in Table 6, shows that, in comparison to the commercial case, for a same adsorber volume and a same overall pressure drop, double the flow (i.e., double the superficial gas velocity) can be handled by a parallel fiber bed. This is advantageous, because doubling the flow for a same volume of adsorbent allows the cycle time to be decreased by 50%.

Considered another way, for a given pressure drop and output pressure, the bed diameter for a bed of parallel solid fibers made according to the invention can be significantly reduced while handling the same flow rate. Thus, the capital cost of the adsorbent bed is significantly reduced.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An adsorber, comprising an adsorbent bed structure containing an adsorbent bed of at least one elementary composite structure that comprises adsorbent particles in a polymer matrix, wherein the adsorber is adapted and configured to separate gas through adsorption and the adsorbent bed has a bed packing, $\rho_{bed}$, defined as a volume occupied by the at least one elementary composite structure, $V_{ecs}$, divided by a volume of the adsorbent bed structure $V_{bed}$, where $\rho_{bed}$ is greater than 0.60, wherein the at least one elementary composite polymer/adsorbent structure comprises a plurality of elementary composite polymer/adsorbent structures configured as beads or extrudates having an average major dimension $D_{maj}$ and an average minor dimension $D_{min}$, wherein a ratio of $D_{maj}:D_{min}$ is in the range of 1:1 to less than 20:1, wherein the adsorbent bed is configured as a radial adsorbent bed, the adsorber further comprising a cylindrical pressure vessel having an inlet and an outlet, a first annular porous grid concentrically disposed within the cylindrical pressure vessel, a second annular porous grid concentrically disposed within the first annular porous grid wherein a first annulus is formed between an inner surface of the cylindrical pressure vessel and an outer surface of the annular porous grid and a second annulus is formed between an inner surface of the first annular porous grid and an outer surface of the second annular porous grid, a gas-tight annular floor sealing a bottom of the second annulus in gas-tight fashion, and a gas-tight annular ceiling sealing a top of the second annulus in gas-tight fashion, wherein the adsorbent bed structure is comprised of the first and second porous annular grids, the gas-tight annular floor, and the gas-tight annular ceiling, and wherein the adsorber is adapted and configured such that:

feed gas comprising a first component and a second component that is fed to the inlet of the cylindrical pressure vessel flows into the first annulus, through the first annular porous grid, and into the plurality of elementary composite polymer/adsorbent structures configured as beads or extrudates where a first component of the feed gas is preferentially adsorbed by the at least one elementary composite structure compared to a second component of the feed gas; and a gas enriched in the second component and deficient in the first component compared to the feed gas flows through the second annular porous grid and out of the outlet of the cylindrical pressure vessel.

2. An adsorber, comprising an adsorbent bed structure containing an adsorbent bed of at least one elementary composite structure that comprises adsorbent particles in a polymer matrix, wherein the adsorber is adapted and configured to separate gas through adsorption and the adsorbent bed has a bed packing, $\rho_{bed}$, defined as a volume occupied by the at least one elementary composite structure, $V_{ecs}$ divided by a volume of the adsorbent bed structure $V_{bed}$, where $\rho_{bed}$ is greater than 0.60, wherein each of the at least one elementary composite polymer/adsorbent structure is configured as a fiber having a length L and a diameter D, wherein a ratio of L:D is at least 20:1, wherein the adsorbent bed is configured as a radial bed, the adsorber further comprising a cylindrical pressure vessel having an inlet and an outlet, a first annular porous grid concentrically disposed within the cylindrical pressure vessel, a second annular porous grid concentrically disposed within the first annular porous grid wherein a first annulus is formed between an inner surface of the cylindrical pressure vessel and an outer surface of the annular porous grid and a second annulus is formed between an inner surface of the first annular porous grid and an outer surface of the second annular porous grid, a gas-tight annular floor sealing a bottom of the second annulus in gas-tight fashion, and a gas-tight annular ceiling sealing a top of the second annulus in gas-tight fashion, wherein the adsorbent bed structure is comprised of the first and second porous annular grids, the gas-tight annular floor, and the gas-tight annular ceiling, and wherein the adsorber is adapted and configured such that:

feed gas comprising a first component and a second component that is fed to the inlet of the cylindrical pressure vessel flows into the first annulus, through the first annular porous grid, and into the plurality of elementary composite polymer/adsorbent structures configured as a fiber where a first component of the feed gas is preferentially adsorbed by the at least one elementary composite structure compared to a second component of the feed gas; and a gas enriched in the second component and deficient in the first component compared to the feed gas flows through the second annular porous grid and out of the outlet of the cylindrical pressure vessel.

3. The adsorber of claim 2, wherein said fiber comprises a plurality of fibers arranged in parallel to an axis of the adsorber.

4. The adsorber of claim 2, wherein said fiber comprises a length of fiber spirally wrapped around the second annular porous grid.

5. An adsorber, comprising an adsorbent bed structure containing an adsorbent bed of at least one elementary composite structure that comprises adsorbent particles in a polymer matrix, wherein the adsorber is adapted and configured to separate gas through adsorption and the adsorbent bed has a bed packing, $\rho_{bed}$, defined as a volume occupied by the at least one elementary composite structure, $V_{ecs}$ divided by a volume of the adsorbent bed structure $V_{bed}$, where $\rho_{bed}$ is greater than 0.60, wherein the at least one elementary composite polymer/adsorbent structure is configured as a fabric woven from warp and weft fibers each one of which has a length L and a diameter D, wherein a ratio of L:D is at least 20:1, wherein the adsorbent bed is configured as a radial bed, the adsorber further comprising a cylindrical pressure vessel having an inlet and an outlet, a first annular porous grid concentrically disposed within the cylindrical pressure vessel, a second annular porous grid concentrically disposed within the first annular porous grid wherein a first annulus is formed between an inner surface of the cylindrical pressure vessel and an outer surface of the annular porous grid and a second annulus is formed between an inner surface of the first annular porous grid and an outer surface of the second annular porous grid, a gas-tight annular floor sealing a bottom of the second annulus in gas-tight fashion, and a gas-tight annular ceiling sealing a top of the second annulus in gas-tight fashion, wherein the adsorbent bed structure is comprised of the first and second porous annular grids, the gas-tight annular floor, and the gas-tight annular ceiling, and wherein the adsorber is adapted and configured such that:

feed gas comprising a first component and a second component that is fed to the inlet of the cylindrical pressure vessel flows into the first annulus, through the first annular porous grid, and into the plurality of elementary composite polymer/adsorbent structures configured as a fiber where a first component of the feed gas is preferentially adsorbed by the at least one elementary composite structure compared to a second component of the feed gas; and a gas enriched in the second component and deficient in the first component compared to the feed gas flows through the second annular porous grid and out of the outlet of the cylindrical pressure vessel.

* * * * *